(12) United States Patent
Komiyama et al.

(10) Patent No.: US 11,796,767 B2
(45) Date of Patent: Oct. 24, 2023

(54) WIDE-ANGLE LENS INCLUDING SEVEN LENSES OF --+++-+ REFRACTIVE POWERS

(71) Applicant: NIDEC SANKYO CORPORATION, Nagano (JP)

(72) Inventors: Tadashi Komiyama, Nagano (JP); Yosuke Kanzaki, Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 442 days.

(21) Appl. No.: 17/117,079

(22) Filed: Dec. 9, 2020

(65) Prior Publication Data

US 2021/0181485 A1 Jun. 17, 2021

(30) Foreign Application Priority Data

Dec. 13, 2019 (CN) .......................... 201911281965.1

(51) Int. Cl.
G02B 13/00 (2006.01)
G02B 13/06 (2006.01)
G02B 9/64 (2006.01)

(52) U.S. Cl.
CPC ........... *G02B 13/0045* (2013.01); *G02B 9/64* (2013.01); *G02B 13/06* (2013.01)

(58) Field of Classification Search
CPC ....... G02B 13/0045; G02B 9/64; G02B 13/06
See application file for complete search history.

(56) References Cited

U.S. PATENT DOCUMENTS

2019/0324232 A1* 10/2019 Yang ........................ G02B 9/64

FOREIGN PATENT DOCUMENTS

JP 2018060153 4/2018

* cited by examiner

*Primary Examiner* — Wen Huang
(74) *Attorney, Agent, or Firm* — JCIPRNET

(57) ABSTRACT

Provided is a wide-angle lens, including a lens group and a diaphragm. Lenses in the lens group are sequentially arranged from an object side in a manner sandwiching the diaphragm. A maximum half field of view of the wide-angle lens as a whole is set to ω, 98°<ω<120° is satisfied. An effective focal length and an entrance pupil diameter of the wide-angle lens as a whole are set to f and HEP respectively, f/HEP<2.3 is satisfied. The lens group includes a first lens that is located closest to the object side and that is a negative lens with a concave surface facing an image side. An effective radius and a radius of curvature of an image side lens surface of the first lens are set to sd12 and R12 respectively, 0.890<sd12/R12<0.970 is satisfied.

10 Claims, 45 Drawing Sheets

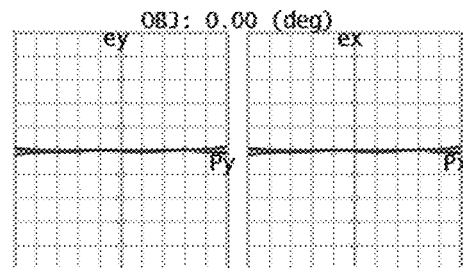
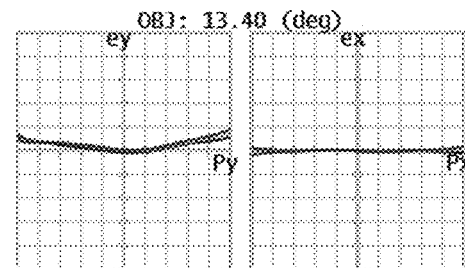
FIG. 16A  FIG. 16B
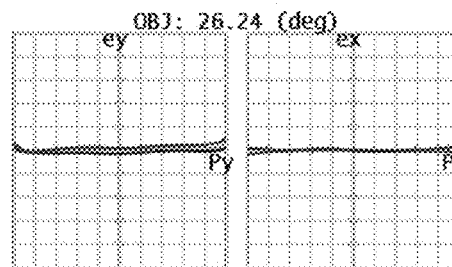
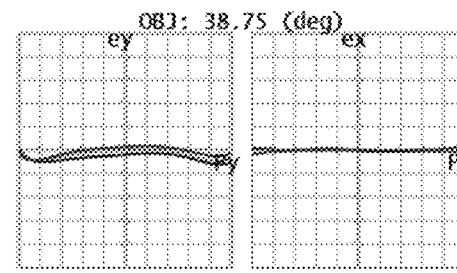
FIG. 16C  FIG. 16D
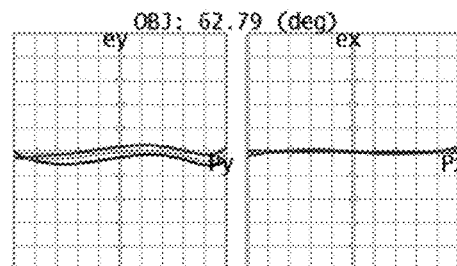
FIG. 16E  FIG. 16F
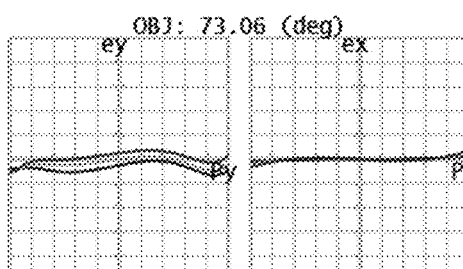
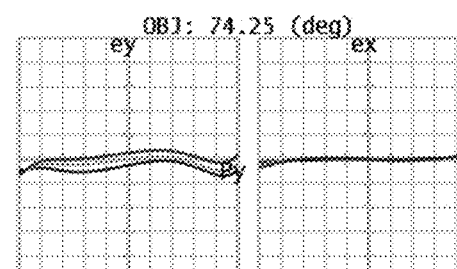
FIG. 16G  FIG. 16H

WIDE-ANGLE LENS INCLUDING SEVEN LENSES OF −−+++−+ REFRACTIVE POWERS

CROSS REFERENCE TO RELATED APPLICATIONS

The present invention claims priority under 35 U.S.C. § 119 to Chinese Application No. 201911281965.1 filed on Dec. 13, 2019, the entire content of which is incorporated herein by reference.

FIELD OF THE INVENTION

The disclosure relates to a wide-angle lens.

BACKGROUND

As a lens mounted in an in-vehicle camera or the like, there has conventionally been a wide-angle lens including, sequentially arranged from an object side, a first lens, a second lens, a third lens, a fourth lens, a diaphragm, a fifth lens, a sixth lens and a seventh lens. Among them, the sixth lens and the seventh lens constitute a cemented lens.

In practice, it is sometimes necessary to reduce the size of the in-vehicle camera equipped with the above-mentioned wide-angle lens, and in that case, the wide-angle lens needs to be miniaturized. However, the miniaturization of the wide-angle lens may reduce a maximum half field of view (HFOV) of the in-vehicle camera.

SUMMARY

An exemplary embodiment of the disclosure provides a wide-angle lens, including a lens group and a diaphragm. Multiple lenses in the lens group are sequentially arranged from an object side in a manner sandwiching the diaphragm. A maximum half field of view of the wide-angle lens as a whole is set to ω, 98°<ω<120° is satisfied. An effective focal length of the wide-angle lens as a whole is set to f, and an entrance pupil diameter of the wide-angle lens as a whole is set to HEP, f/HEP<2.3 is satisfied. The lens group includes a first lens that is located closest to the object side and that is a negative lens with a concave surface facing an image side. An effective radius of an image side lens surface of the first lens is set to sd12, and a radius of curvature of the image side lens surface of the first lens is set to R12, 0.890<sd12/R12<0.970 is satisfied.

The above and other elements, features, steps, characteristics and advantages of the present disclosure will become more apparent from the following detailed description of the preferred embodiments with reference to the attached drawings.

BRIEF DESCRIPTION OF THE DRAWINGS

FIG. 16A to FIG. 16L illustrate transverse aberration of the wide-angle lens according to Embodiment 4 of the disclosure.

DETAILED DESCRIPTION

Hereinafter, each embodiment of a wide-angle lens of the disclosure will be described with reference to the accompanying drawings. In the following description, in an extension direction of an optical axis L, an object side is denoted by L1, and an image side is denoted by L2.

Figure 1:
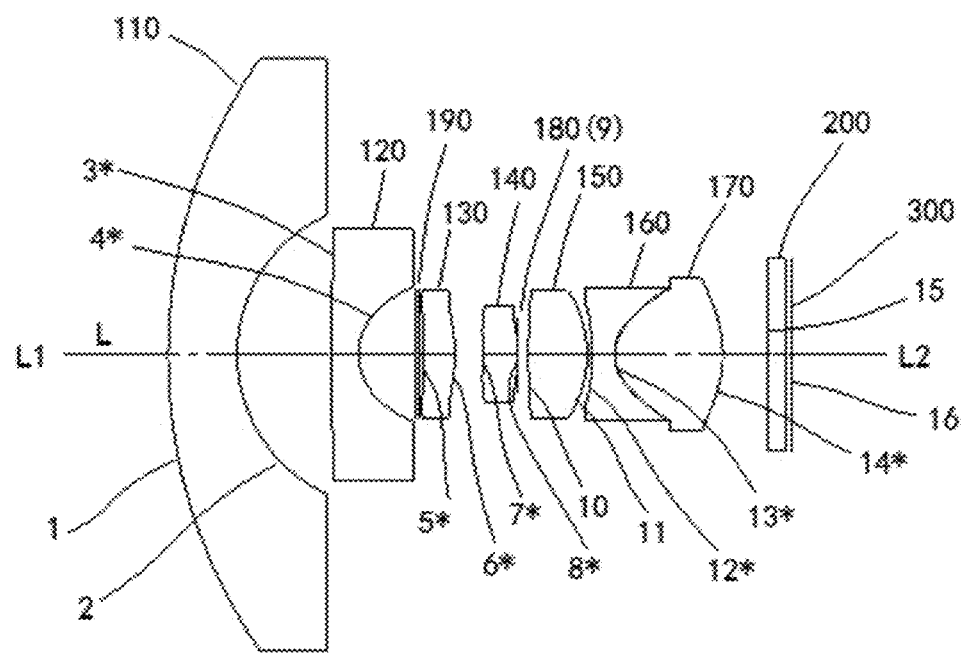
FIG. 1 illustrates a wide-angle lens according to Embodiment 1 of the disclosure.
Figure 2A:
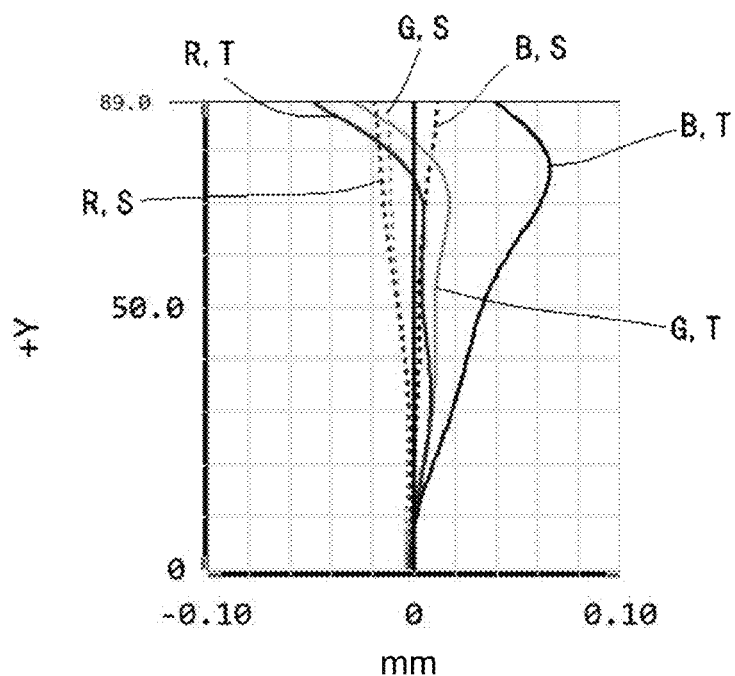
FIG. 2A illustrates curvature of field and distortion of the wide-angle lens according to Embodiment 1 of the disclosure.
Figure 2B:
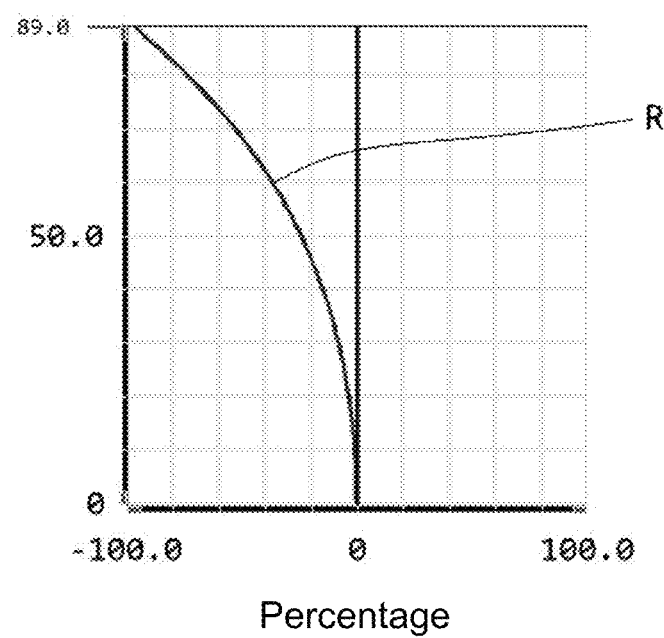
FIG. 2B illustrates curvature of field and distortion of the wide-angle lens according to Embodiment 1 of the disclosure.
Figure 3A:
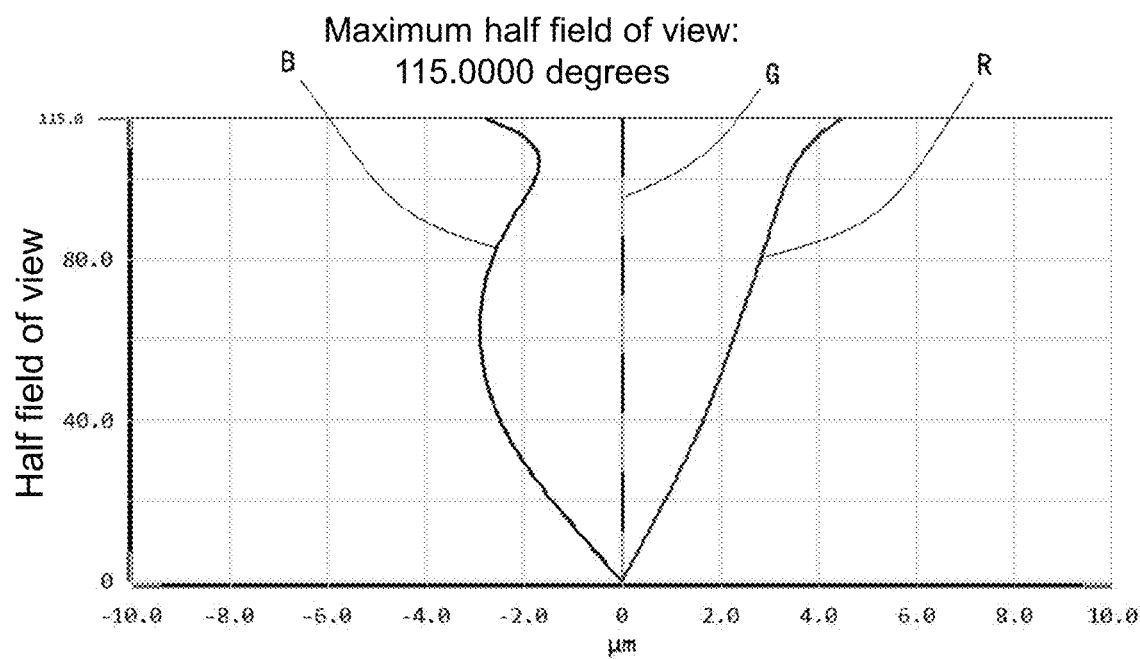
FIG. 3A illustrates lateral chromatic aberration (transverse chromatic aberration) of the wide-angle lens according to Embodiment 1 of the disclosure.
Figure 3B:
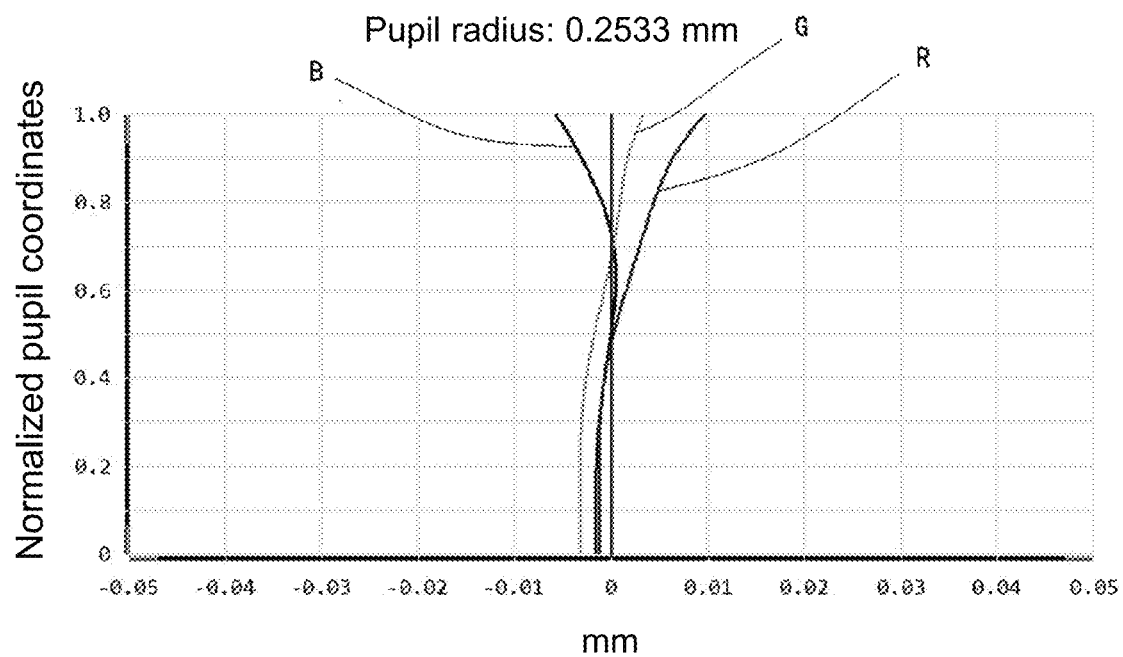
FIG. 3B illustrates spherical aberration (longitudinal aberration) of the wide-angle lens according to Embodiment 1 of the disclosure.
Figure 4A:
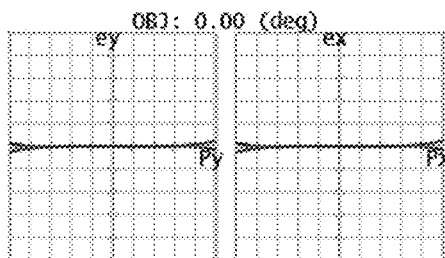
FIG. 4A to FIG. 4L illustrate transverse aberration of the wide-angle lens according to Embodiment 1 of the disclosure.
Figure 4B:
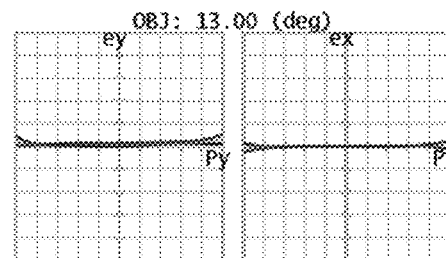
Figure 4C:
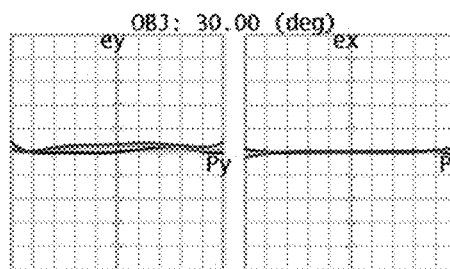
Figure 4D:
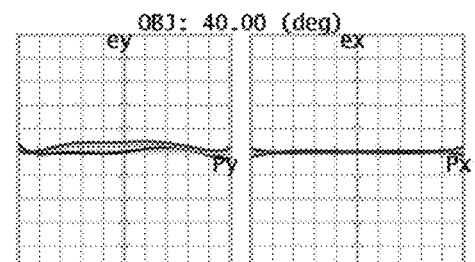
Figure 4E:
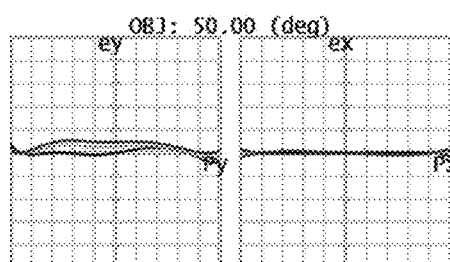
Figure 4F:
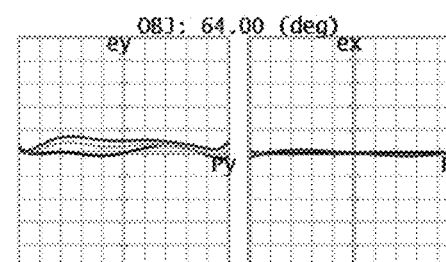
Figure 4G:
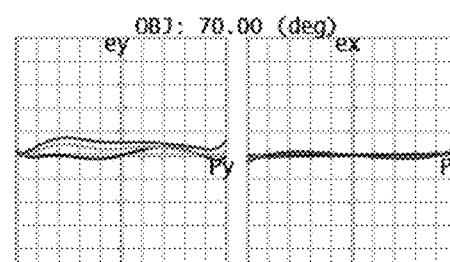
Figure 4H:
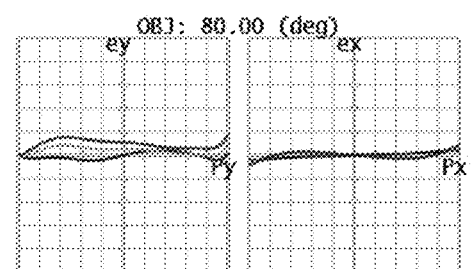
Figure 4I:
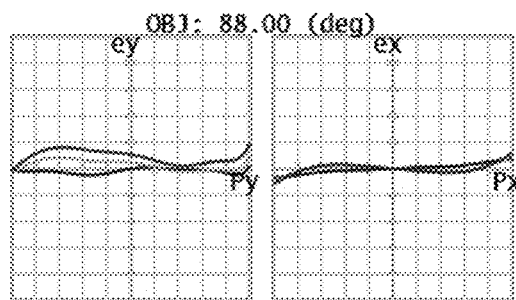
Figure 4J:
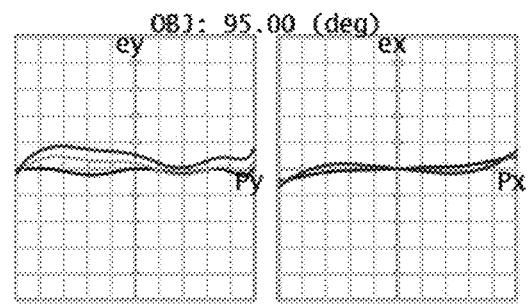
Figure 4K:
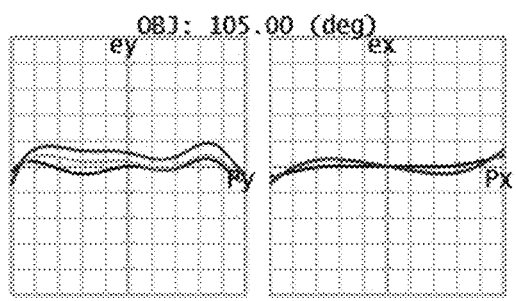
Figure 4L:
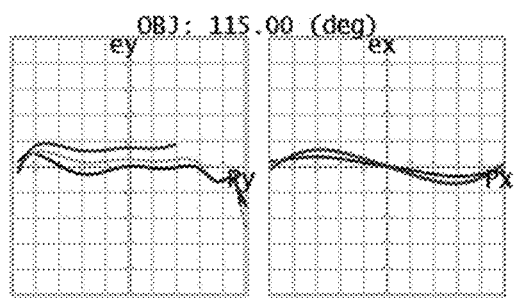

FIG. 1 illustrates a wide-angle lens according to Embodiment 1 of the disclosure. FIG. 2A illustrates curvature of field and distortion of the wide-angle lens according to Embodiment 1 of the disclosure. FIG. 2B illustrates curvature of field and distortion of the wide-angle lens according to Embodiment 1 of the disclosure. FIG. 3A illustrates lateral chromatic aberration (transverse chromatic aberration) of the wide-angle lens according to Embodiment 1 of the disclosure. FIG. 3B illustrates spherical aberration (longitudinal aberration) of the wide-angle lens according to Embodiment 1 of the disclosure. FIG. 4A to FIG. 4L illustrate transverse aberration of the wide-angle lens according to Embodiment 1 of the disclosure. Here, in FIG. 2A, FIG. 2B, FIG. 3A, FIG. 3B, and FIG. 4A to FIG. 4L, a correlation curve of red light R (having a wavelength of 656 nm) is denoted by R, a correlation curve of green light G (having a wavelength of 588 nm) is denoted by G, and a correlation curve of blue light B (having a wavelength of 486 nm) is denoted by B. T indicates being related to the meridian plane, and S indicates being related to the sagittal plane. Moreover, in FIG. 4A to FIG. 4L, a maximum scale of the longitudinal axis is ±50.000 µm.

As shown in FIG. 1, a wide-angle lens 1000 includes, sequentially arranged from the object side (L1 side), a first lens 110 (that is, the first lens 110 is located closest to the object side), a second lens 120 (that is, the second lens 120 is located on the image side of and adjacent to the first lens 110), a third lens 130, a fourth lens 140, a diaphragm 180, a fifth lens 150, a sixth lens 160 and a seventh lens 170. Among them, the sixth lens 160 and the seventh lens 170 are bonded together by an adhesive to constitute a cemented lens.

Here, the first lens 110 is a lens (simply referred to as negative lens) with negative refractive power, having a convex surface (first surface 1) facing the object side L1 and a concave surface (second surface 2) facing the image side L2. In this embodiment, the first lens 110 is a glass lens in which the first surface 1 and the second surface 2 are spherical surfaces.

The second lens 120 is a lens with negative refractive power, having a convex surface (third surface 3) facing the object side L1 and a concave surface (fourth surface 4) facing the image side L2. In this embodiment, the second lens 120 is a plastic lens in which the third surface 3 and the fourth surface 4 are aspherical surfaces.

The third lens 130 is a lens (simply referred to as positive lens) with positive refractive power, having a concave surface (fifth surface 5) facing the object side L1 and a convex surface (sixth surface 6) facing the image side L2. In this embodiment, the third lens 130 is a plastic lens in which the fifth surface 5 and the sixth surface 6 are aspherical surfaces.

The fourth lens 140 is a lens with positive refractive power, having a concave surface (seventh surface 7) facing the object side L1 and a convex surface (eighth surface 8) facing the image side L2. In this embodiment, the fourth lens 140 is a plastic lens in which the seventh surface 7 and the eighth surface 8 are aspherical surfaces.

The fifth lens 150 is a lens with positive refractive power, having a convex surface (tenth surface 10) facing the object side L1 and a convex surface (eleventh surface 11) facing the image side L2. In this embodiment, the fifth lens 150 is composed of a glass lens.

The sixth lens 160 is a lens with negative refractive power, having a concave surface (twelfth surface 12) facing the object side L1 and a concave surface (thirteenth surface 13) facing the image side L2. The sixth lens 160 constitutes a cemented lens with the seventh lens 170. In this embodiment, the sixth lens 160 is a plastic lens in which the twelfth surface 12 and the thirteenth surface 13 are aspherical surfaces.

The seventh lens 170 is a lens with positive refractive power, having a convex surface (thirteenth surface 13) facing the object side L1 and a convex surface (fourteenth surface 14) facing the image side L2. In this embodiment, the seventh lens 170 is a plastic lens in which the thirteenth surface 13 and the fourteenth surface 14 are aspherical surfaces.

In addition, in this embodiment, as shown in FIG. 1, a light-shielding sheet 190 is provided between the second lens 120 and the third lens 130, a filter 200 is arranged on the image side of the seventh lens 170, and an imaging element 300 is arranged on the image side of the filter 200.

In this embodiment, in the lens system as a whole, an effective focal length f is 1.023 mm, an object-to-image distance (total track) d is 13.611 mm, an F value (image space F/#) is 2.02, a maximum half field of view (HFOV) (maximum half field angle) is 115 degrees, and an entrance pupil diameter HEP is 0.507 mm.

Table 1 shows physical properties of each surface of the wide-angle lens 1000 of this embodiment. Table 2-1 and Table 2-2 show aspheric coefficients of each surface of the wide-angle lens 1000 of this embodiment.

TABLE 1

| Surface | Radius of curvature | Thickness | $N_d$ | $v_d$ | Effective focal length | Effective radius | Sag |
|---|---|---|---|---|---|---|---|
| 1 | 11.420 | 1.510 | 1.871 | 40.73 | −1.338 | 6.456 | 1.999 |
| 2 | 3.350 | 2.050 | | | | 3.055 | 1.974 |
| 3* | 40.687 | 0.600 | 1.544 | 56.4 | | 2.762 | 0.051 |
| 4* | 1.222 | 1.427 | | | | 1.461 | 1.176 |
| 5* | −11.789 | 0.689 | 1.544 | 56.4 | 3.122 | 1.396 | −0.028 |
| 6* | −2.855 | 0.597 | | | | 1.268 | −0.123 |
| 7* | −13.315 | 0.778 | 1.635 | 23.9 | | 1.068 | 0.060 |
| 8* | −2.589 | −0.039 | | | | 0.890 | −0.121 |
| 9 (diaphragm) | Infinite | 0.257 | | | | | |
| 10 | 15.150 | 1.288 | 1.697 | 55.46 | | 1.400 | 0.065 |
| 11 | −2.501 | 0.101 | | | | 1.400 | −0.428 |
| 12* | −5.143 | 0.500 | 1.635 | 23.9 | 13.449 | 1.180 | −0.158 |
| 13* | 1.018 | 2.362 | 1.544 | 56.4 | | 1.458 | 1.199 |
| 14* | −2.561 | 0.965 | | | | 1.657 | −0.456 |
| 15 | Infinite | 0.400 | | | | | |
| 16 | Infinite | 0.125 | | | | | |

In Table 1 above, the radius of curvature, thickness, effective focal length, effective radius, and sag are in units of mm. $N_d$ represents a refractive index for a ray of 587.56 nm. $V_d$ represents the Abbe number. * represents an aspheric surface.

TABLE 2-1

| Surface | c (1/radius of curvature) | K | A4 | A6 |
|---|---|---|---|---|
| 3 | 2.45778E−02 | 0.00000E+00 | −7.34647E−04 | 0.00000E+00 |
| 4 | 8.18649E−01 | −1.00000E+00 | 3.34909E−02 | 1.52429E−02 |
| 5 | −8.48284E−02 | 0.00000E+00 | −1.05901E−02 | 2.28744E−02 |
| 6 | −3.50286E−01 | 0.00000E+00 | 4.60516E−02 | 1.35719E−02 |
| 7 | −7.51052E−02 | 0.00000E+00 | 6.96916E−02 | 5.26973E−04 |
| 8 | −3.86206E−01 | 0.00000E+00 | 4.85130E−02 | 1.07658E−02 |
| 12 | −1.94439E−01 | 0.00000E+00 | 1.37213E−02 | −3.80723E−02 |
| 13 | 9.82404E−01 | −1.00000E+00 | 2.47704E−01 | −2.97167E−01 |
| 14 | −3.90445E−01 | 0.00000E+00 | 2.43790E−02 | −1.73998E−02 |

TABLE 2-2

| Surface | A8 | A10 | A12 | A14 | A16 |
|---|---|---|---|---|---|
| 3 | 0.00000E+00 | 0.00000E+00 | 0.00000E+00 | 0.00000E+00 | 0.00000E+00 |
| 4 | −3.29328E−03 | 2.82298E−03 | −4.88754E−04 | 0.00000E+00 | 0.00000E+00 |
| 5 | −5.12306E−03 | 0.00000E+00 | 0.00000E+00 | 0.00000E+00 | 0.00000E+00 |
| 6 | 0.00000E+00 | 0.00000E+00 | 0.00000E+00 | 0.00000E+00 | 0.00000E+00 |
| 7 | 4.37857E−03 | 2.92148E−03 | 0.00000E+00 | 0.00000E+00 | 0.00000E+00 |
| 8 | −5.94177E−03 | 1.11565E−02 | 0.00000E+00 | 0.00000E+00 | 0.00000E+00 |
| 12 | 1.79956E−02 | −7.87537E−04 | −1.30556E−03 | 0.00000E+00 | 0.00000E+00 |
| 13 | 1.73181E−01 | −4.77496E−02 | 4.65741E−03 | 0.00000E+00 | 0.00000E+00 |
| 14 | 1.34046E−02 | −4.35536E−03 | 5.73510E−04 | 0.00000E+00 | 0.00000E+00 |

In Table 2-1 and Table 2-2 above, in a case where a lens surface is a convex surface protruding toward the object side or a concave surface recessed toward the object side, its radius of curvature is set to a positive value; in a case where a lens surface is a convex surface protruding toward the image side or a concave surface recessed toward the image side, its radius of curvature is set to a negative value.

In addition, Table 2-1 and Table 2-2 above show the aspheric coefficients A4, A6, A8, A10, A12, A14 and A16 of each of the aspheric surfaces, which satisfy the following expression 1. In the following expression, Z represents sag (axis in an optical axis direction), r represents height (ray height) in a direction perpendicular to the optical axis, K represents the conic coefficient, and c represents the reciprocal of the radius of curvature.

$$Z = \frac{cr^2}{1 + \sqrt{1 - (1+K)c^2r^2}} + \sum_{n=2}^{5} A_{2n} r^{2n}$$ [Expression 1]

Here, as described above, the maximum HFOV ω of the wide-angle lens 1000 as a whole is 115 degrees, that is, the following condition 1-1 is satisfied:

98°<ω<120° (1-1)

In condition 1-1, the maximum HFOV ω is set to be greater than 98°, thereby expanding the maximum HFOV ω; the maximum HFOV ω is set to be less than 120°, thereby avoiding a situation that a peripheral portion of an image becomes dark due to a light quantity ratio at the periphery of the wide-angle lens 1000 being smaller than a light quantity ratio at the center of the wide-angle lens 1000. Further, the wide-angle lens 1000 is able to be miniaturized as a whole while the maximum HFOV ω of the wide-angle lens 1000 is expanded.

In addition, in the wide-angle lens 1000 as a whole, the effective focal length f is 1.023 mm and the entrance pupil diameter HEP is 0.507 mm. Therefore, the following condition 1-2 is satisfied:

f/HEP<2.3 (1-2)

In condition 1-2, a ratio of the effective focal length f to the entrance pupil diameter HEP of the wide-angle lens 1000 as a whole is set as f/HEP<2.3, thereby ensuring the brightness of the wide-angle lens 1000, and enabling use of the wide-angle lens 1000 in a high pixel imaging element.

In addition, as is clear from Table 1, an effective radius sd12 of an image side lens surface (that is, the second surface 2) of the first lens 110 is 3.055 mm, and a radius of curvature R12 of the second surface 2 of the first lens 110 is 3.350 mm. Therefore, the following condition 1-3 is satisfied:

0.890<sd12/R12<0.970 (1-3)

In condition 1-3, a ratio of the effective radius sd12 to the radius of curvature R12 of the second surface 2 of the first lens 110 is set to be greater than 0.890, thereby expanding the HFOV, in particular, to 98° or greater; the ratio of the effective radius sd12 to the radius of curvature R12 of the second surface 2 of the first lens 110 is set to be less than 0.970, thereby preventing an angle defined between a peripheral part of the second surface 2 of the first lens 110 made of glass and a tangent line from being excessively small, and further making it possible to perform a polishing process on the second surface 2 of the first lens 110.

In addition, as is clear from Table 1, a radius of curvature R11 of an object side lens surface (that is, the first surface 1) of the first lens 110 is 11.420 mm, and the radius of curvature R12 of the image side lens surface (that is, the second surface 2) of the first lens 110 is 3.350 mm. Therefore, the following condition 1-4 is satisfied:

1.300<(R11+R12)/(R11−R12)<1.900 (1-4)

Moreover, the following condition 1-5 is satisfied:

1.600<(R11+R12)/(R11−R12)<1.850 (1-5)

In condition 1-4, (R11+R12)/(R11−R12) is set to be greater than 1.300, thereby preventing the radius of curvature R12 of the image side lens surface (that is, the second surface 2) of the first lens 110 from being excessively small, thus facilitating the molding of the second surface 2 of the first lens 110. In another respect, the radius of curvature R11 of the object side lens surface (that is, the first surface 1) of the first lens 110 is able to be prevented from being excessively large, thereby avoiding an excessively large diameter of the first lens 110, thus miniaturizing the wide-angle lens 1000. In addition, (R11+R12)/(R11−R12) is set to be less than 1.900, thereby ensuring sufficient refractive power of the first lens 110, thus facilitating the expansion of the maximum HFOV ω of the first lens 110. Moreover, a sufficient thickness of the first lens 110 is able to be ensured, so as to prevent the first lens 110 from being damaged due to impact or the like.

In condition 1-5, (R11+R12)/(R11−R12) is further set to be greater than 1.600, thereby further preventing the radius of curvature R12 of the image side lens surface (that is, the second surface 2) of the first lens 110 from being excessively small, thus further facilitating the molding of the second surface 2 of the first lens 110. In another respect, the radius of curvature R11 of the object side lens surface (that is, the first surface 1) of the first lens 110 is able to be further prevented from being excessively large, thereby further avoiding an excessively large diameter of the first lens 110, thus further miniaturizing the wide-angle lens 1000. In addition, (R11+R12)/(R11−R12) is further set to be less than 1.850, thereby further ensuring sufficient refractive power of the first lens 110, thus further facilitating the expansion of the maximum HFOV ω of the first lens 110. Moreover, a sufficient thickness of the first lens 110 is able to be further ensured, so as to further prevent the first lens 110 from being damaged due to impact or the like.

In addition, as is clear from Table 1, a thickness T1 of the first lens 110 is 1.510 mm (the thickness T1 of the first lens 110 is defined as a distance between the object side lens surface (that is, the first surface 1) of the first lens 110 and the image side lens surface (that is, the second surface 2) of the first lens 110 in the optical axis direction), a sag Sag12 of the image side lens surface (that is, the second surface 2) of the first lens 110 is 1.974 mm. Therefore, the following condition 1-6 is satisfied:

$$0.700 < T1/Sag12 < 1.100 \quad (1\text{-}6)$$

In condition 1-6, a ratio of the thickness T1 of the first lens 110 to the sag Sag12 of the image side lens surface (that is, the second surface 2) of the first lens 110 is set to be greater than 0.700, thereby ensuring a sufficient thickness of the first lens 110 to prevent the first lens 110 from being damaged due to impact or the like; the ratio of the thickness T1 of the first lens 110 to the sag Sag12 of the image side lens surface (that is, the second surface 2) of the first lens 110 is set to be less than 1.100, thereby avoiding an excessively large thickness of the first lens 110, thus making it possible to achieve desired negative refractive power.

In addition, in the wide-angle lens 1000 of this embodiment, the object-to-image distance d of the wide-angle lens 1000 is 13.611 mm, and the effective focal length f of the wide-angle lens 1000 as a whole is 1.023 mm. Therefore, the following condition 1-7 is satisfied:

$$11.000 < d/f < 15.000 \quad (1\text{-}7)$$

In condition 1-7, a ratio of the object-to-image distance d of the wide-angle lens 1000 to the effective focal length f of the wide-angle lens 1000 as a whole is set to be greater than 11.000, thereby enabling appropriate correction to be easily made for various aberrations, thus making it easy to achieve good optical characteristics; the ratio of the object-to-image distance d of the wide-angle lens 1000 to the effective focal length f of the wide-angle lens 1000 as a whole is set to be less than 15.000, thereby preventing the wide-angle lens 1000 from becoming excessively large while avoiding an excessively large overall length of the wide-angle lens 1000.

In summary, in this embodiment, by configuring the wide-angle lens 1000 as above, as shown in FIG. 2A to FIG. 4L, appropriate correction is enabled for various aberrations such as curvature of field, chromatic aberration of magnification, and coma. Moreover, the miniaturization is able to be achieved while the maximum HFOV ω is expanded.

Figure 5:
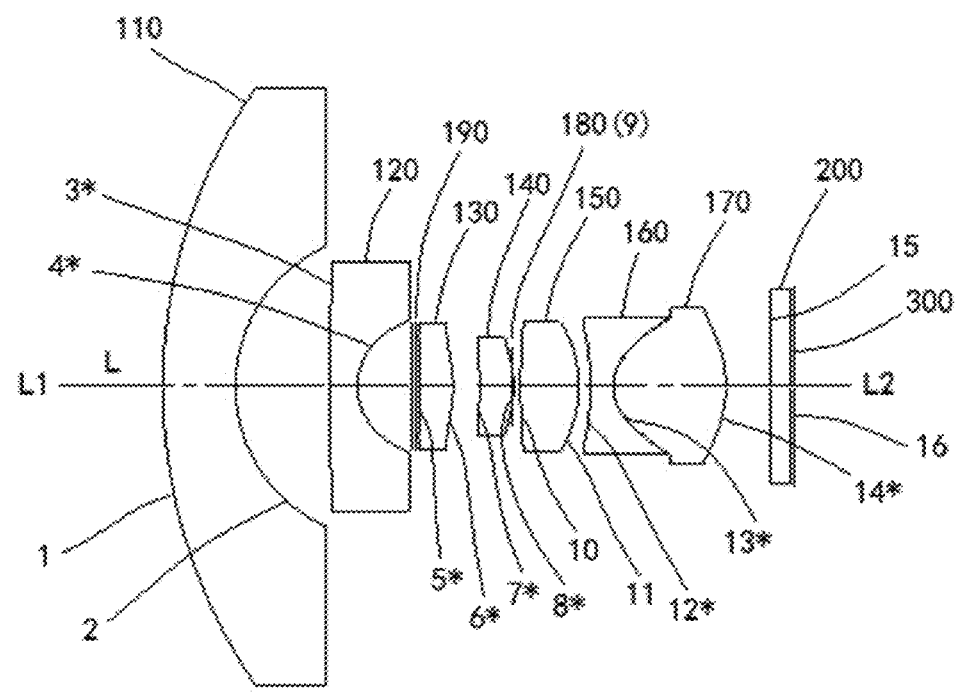
FIG. 5 illustrates a wide-angle lens according to Embodiment 2 of the disclosure.
Figure 6A:
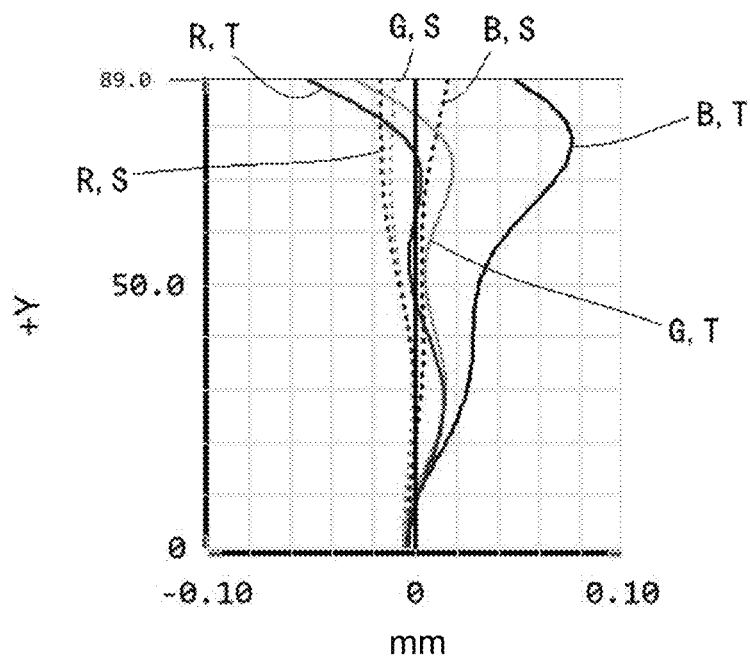
FIG. 6A illustrates curvature of field and distortion of the wide-angle lens according to Embodiment 2 of the disclosure.
Figure 6B:
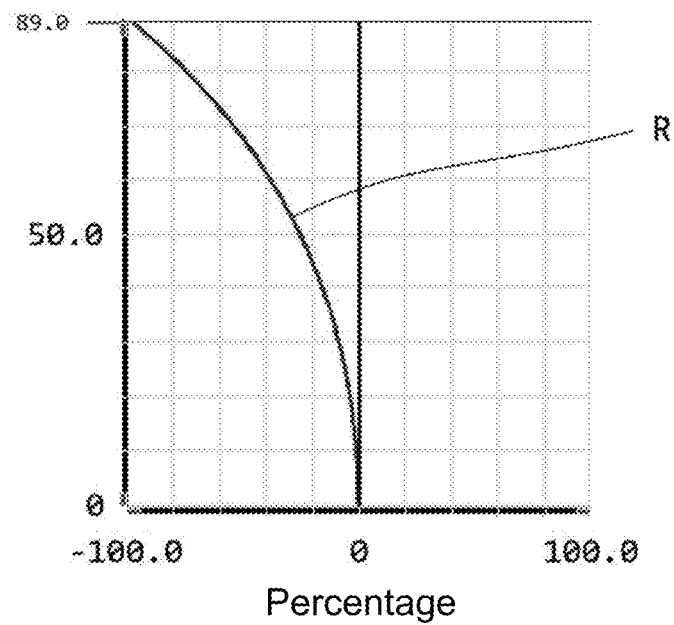
FIG. 6B illustrates curvature of field and distortion of the wide-angle lens according to Embodiment 2 of the disclosure.
Figure 7A:
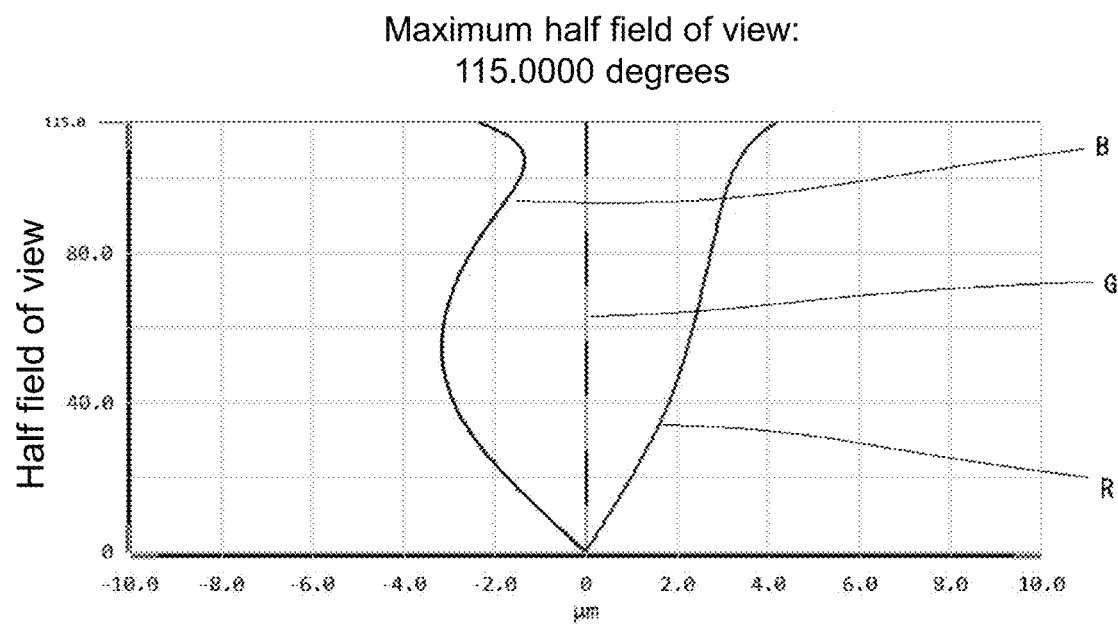
FIG. 7A illustrates lateral chromatic aberration (transverse chromatic aberration) of the wide-angle lens according to Embodiment 2 of the disclosure.
Figure 7B:
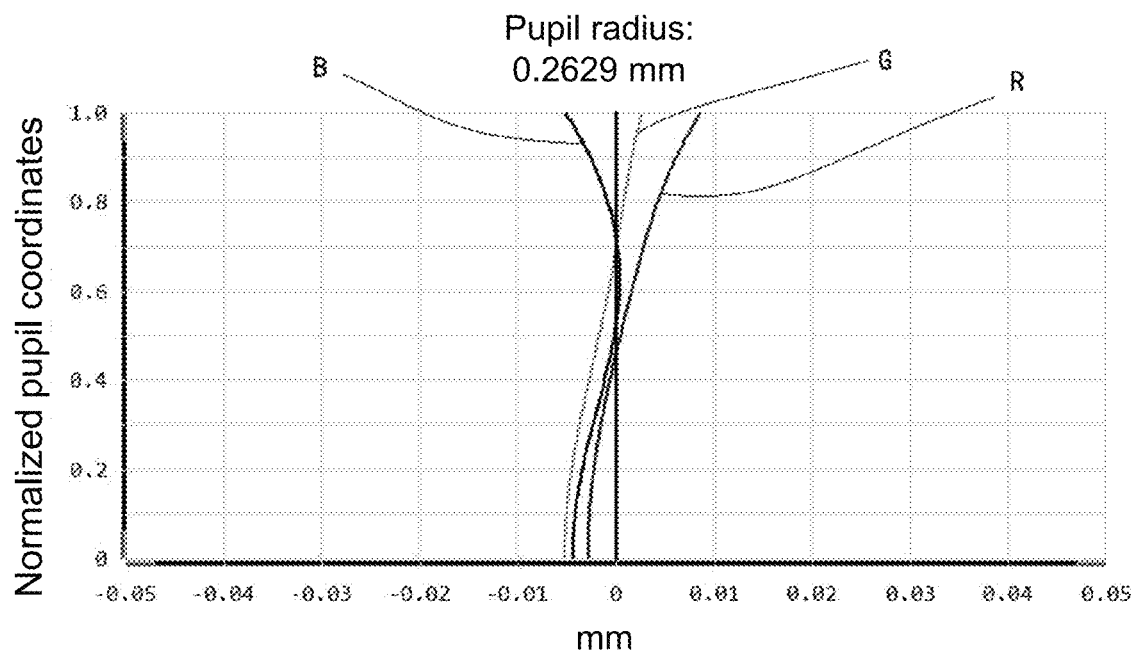
FIG. 7B illustrates spherical aberration (longitudinal aberration) of the wide-angle lens according to Embodiment 2 of the disclosure.
Figure 8A:
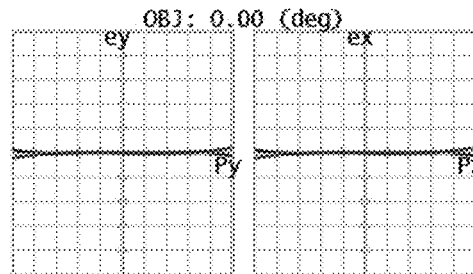
FIG. 8A to FIG. 8L illustrate transverse aberration of the wide-angle lens according to Embodiment 2 of the disclosure.
Figure 8B:
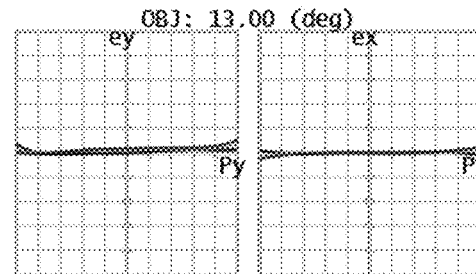
Figure 8C:
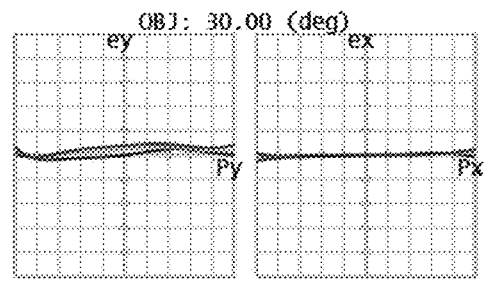
Figure 8D:
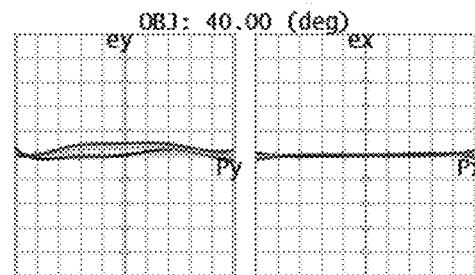
Figure 8E:
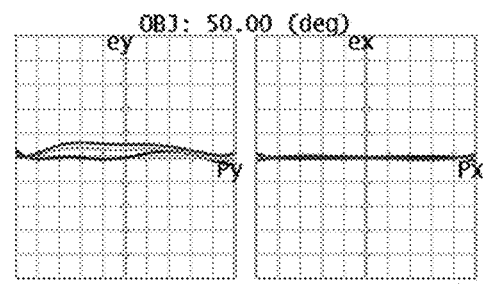
Figure 8F:
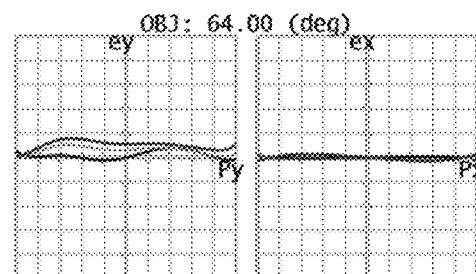
Figure 8G:
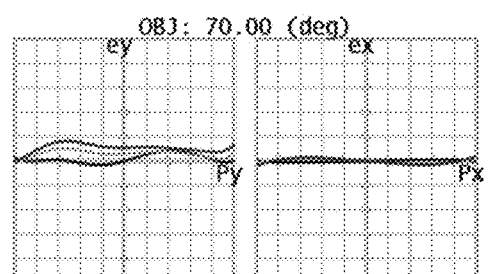
Figure 8H:
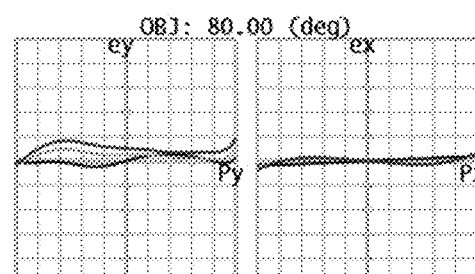
Figure 8I:
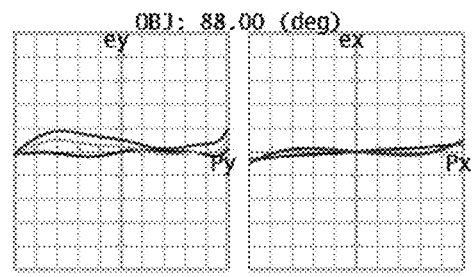
Figure 8J:
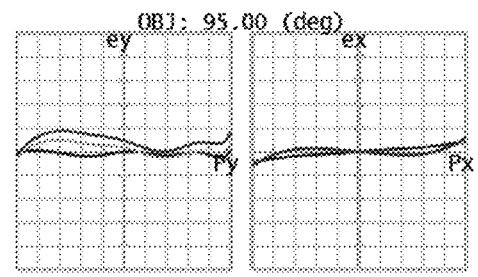
Figure 8K:
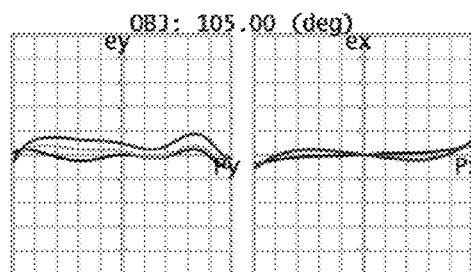
Figure 8L:
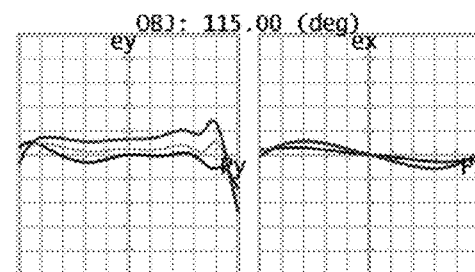

FIG. 5 illustrates a wide-angle lens according to Embodiment 2 of the disclosure. FIG. 6A illustrates curvature of field and distortion of the wide-angle lens according to Embodiment 2 of the disclosure. FIG. 6B illustrates curvature of field and distortion of the wide-angle lens according to Embodiment 2 of the disclosure. FIG. 7A illustrates lateral chromatic aberration (transverse chromatic aberration) of the wide-angle lens according to Embodiment 2 of the disclosure. FIG. 7B illustrates spherical aberration (longitudinal aberration) of the wide-angle lens according to Embodiment 2 of the disclosure. FIG. 8A to FIG. 8L illustrate transverse aberration of the wide-angle lens according to Embodiment 2 of the disclosure. Here, in FIG. 6A, FIG. 6B, FIG. 7A, FIG. 7B, and FIG. 8A to FIG. 8L, a correlation curve of red light R (having a wavelength of 656 nm) is denoted by R, a correlation curve of green light G (having a wavelength of 588 nm) is denoted by G, and a correlation curve of blue light B (having a wavelength of 486 nm) is denoted by B. T indicates being related to the meridian plane, and S indicates being related to the sagittal plane. Moreover, in FIG. 8A to FIG. 8L, the maximum scale of the longitudinal axis is ±50.000 μm.

As shown in FIG. 5, the wide-angle lens 1000 includes, sequentially arranged from the object side (L1 side), the first lens 110 (that is, the first lens 110 is located closest to the object side), the second lens 120 (that is, the second lens 120 is located on the image side of and adjacent to the first lens 110), the third lens 130, the fourth lens 140, the diaphragm 180, the fifth lens 150, the sixth lens 160 and the seventh lens 170. Among them, the sixth lens 160 and the seventh lens 170 are bonded together by an adhesive to constitute a cemented lens.

Here, the wide-angle lens 1000 in this embodiment has the same basic structure (that is, whether each of the first lens 110, the second lens 120, the third lens 130, the fourth lens 140, the fifth lens 150, the sixth lens 160 and the seventh lens 170 has positive refractive power or negative refractive power, whether each of these lenses is a glass lens or plastic lens, whether the object side surface and the image side surface of each of these lenses are convex surfaces or concave surfaces, and whether the object side surface and the image side surface are spherical surfaces or aspheric surfaces) as that of the wide-angle lens of Embodiment 1, and thus the details thereof will be omitted.

As shown in FIG. 5, similarly to Embodiment 1, the light-shielding sheet 190 is provided between the second lens 120 and the third lens 130, the filter 200 is arranged on the image side of the seventh lens 170, and the imaging element 300 is arranged on the image side of the filter 200.

In this embodiment, in the lens system as a whole, the effective focal length f is 1.062 mm, the object-to-image distance (total track) d is 13.610 mm, the F value (image space F/#) is 2.02, the maximum HFOV (maximum half field angle) is 115 degrees, and the entrance pupil diameter HEP is 0.526 mm.

Table 3 shows physical properties of each surface of the wide-angle lens 1000 of this embodiment. Table 4-1 and Table 4-2 show aspheric coefficients of each surface of the wide-angle lens 1000 of this embodiment.

TABLE 3

| Surface | Radius of curvature | Thickness | $N_d$ | $v_d$ | Effective focal length | Effective radius | Sag |
|---|---|---|---|---|---|---|---|
| 1 | 11.363 | 1.561 | 1.871 | 40.73 | −1.406 | 6.449 | 2.009 |
| 2 | 3.310 | 2.024 | | | | 3.013 | 1.940 |
| 3* | 45.562 | 0.600 | 1.544 | 56.4 | | 2.690 | 0.051 |
| 4* | 1.309 | 1.360 | | | | 1.418 | 1.106 |
| 5* | −9.695 | 0.703 | 1.544 | 56.4 | 3.380 | 1.353 | −0.030 |
| 6* | −2.596 | 0.565 | | | | 1.233 | −0.136 |
| 7* | −4.818 | 0.732 | 1.635 | 23.9 | | 1.052 | −0.022 |
| 8* | −2.244 | −0.043 | | | | 0.917 | −0.157 |

TABLE 3-continued

| Surface | Radius of curvature | Thickness | $N_d$ | $v_d$ | Effective focal length | Effective radius | Sag |
|---|---|---|---|---|---|---|---|
| 9 (diaphragm) | Infinite | 0.201 | | | | | |
| 10 | 16.738 | 1.245 | 1.697 | 55.46 | | 1.400 | 0.059 |
| 11 | −2.709 | 0.244 | | | | 1.400 | −0.390 |
| 12* | −6.978 | 0.500 | 1.635 | 23.9 | 8.893 | 1.202 | −0.115 |
| 13* | 1.029 | 2.426 | 1.544 | 56.4 | | 1.478 | 1.225 |
| 14* | −2.427 | 0.968 | | | | 1.679 | −0.492 |
| 15 | Infinite | 0.400 | | | | | |
| 16 | Infinite | 0.125 | | | | | |

In Table 3 above, the radius of curvature, thickness, effective focal length, effective radius, and sag are in units of mm. $N_d$ represents a refractive index for a ray of 587.56 nm. $V_d$ represents the Abbe number. * represents an aspheric surface.

TABLE 4-1

| Surface | c (1/radius of curvature) | K | A4 | A6 |
|---|---|---|---|---|
| 3 | 2.19479E−02 | 0.00000E+00 | −5.53459E−04 | 0.00000E+00 |
| 4 | 7.64121E−01 | −1.00000E+00 | 4.76939E−02 | 1.87020E−03 |
| 5 | −1.03144E−01 | 0.00000E+00 | −4.63672E−04 | 2.39479E−02 |
| 6 | −3.85243E−01 | 0.00000E+00 | 6.19526E−02 | 9.41258E−03 |
| 7 | −2.07563E−01 | 0.00000E+00 | 8.01905E−02 | −1.81445E−02 |
| 8 | −4.45687E−01 | 0.00000E+00 | 5.32792E−02 | −3.21513E−03 |
| 12 | −1.43308E−01 | 0.00000E+00 | 2.59200E−02 | −4.54679E−02 |
| 13 | 9.71678E−01 | −1.00000E+00 | 2.67381E−01 | −3.18917E−01 |
| 14 | −4.11994E−01 | 0.00000E+00 | 2.93182E−02 | −2.05884E−02 |

TABLE 4-2

| Surface | A8 | A10 | A12 | A14 | A16 |
|---|---|---|---|---|---|
| 3 | 0.00000E+00 | 0.00000E+00 | 0.00000E+00 | 0.00000E+00 | 0.00000E+00 |
| 4 | 1.18832E−02 | −3.21383E−03 | 7.23623E−04 | 0.00000E+00 | 0.00000E+00 |
| 5 | −7.11892E−03 | 0.00000E+00 | 0.00000E+00 | 0.00000E+00 | 0.00000E+00 |
| 6 | 0.00000E+00 | 0.00000E+00 | 0.00000E+00 | 0.00000E+00 | 0.00000E+00 |
| 7 | 1.48329E−02 | −9.20347E−04 | 0.00000E+00 | 0.00000E+00 | 0.00000E+00 |
| 8 | 3.16264E−03 | 4.17741E−03 | 0.00000E+00 | 0.00000E+00 | 0.00000E+00 |
| 12 | −7.44565E−04 | −1.42901E−03 | 0.00000E+00 | 0.00000E+00 | 0.00000E+00 |
| 13 | 1.80337E−01 | −4.80759E−02 | 4.57265E−03 | 0.00000E+00 | 0.00000E+00 |
| 14 | 1.50208E−02 | −4.69107E−03 | 5.90742E−04 | 0.00000E+00 | 0.00000E+00 |

In Table 4-1 and Table 4-2 above, in a case where a lens surface is a convex surface protruding toward the object side or a concave surface recessed toward the object side, its radius of curvature is set to a positive value; in a case where a lens surface is a convex surface protruding toward the image side or a concave surface recessed toward the image side, its radius of curvature is set to a negative value.

In addition, Table 4-1 and Table 4-2 above show the aspheric coefficients A4, A6, A8, A10, A12, A14 and A16 of each of the aspheric surfaces, which satisfy expression 1 above.

Here, as described above, the maximum HFOV co of the wide-angle lens 1000 as a whole is 115 degrees, that is, the following condition 2-1 is satisfied:

$$98° < \omega < 120° \qquad (2\text{-}1)$$

In condition 2-1, the maximum HFOV co is set to be greater than 98°, thereby expanding the maximum HFOV ω; the maximum HFOV co is set to be less than 120°, thereby avoiding a situation that a peripheral portion of an image becomes dark due to a light quantity ratio at the periphery of the wide-angle lens 1000 being smaller than a light quantity ratio at the center of the wide-angle lens 1000. Further, the wide-angle lens 1000 is able to be miniaturized as a whole while the maximum HFOV co of the wide-angle lens 1000 is expanded.

In addition, in the wide-angle lens 1000 as a whole, the effective focal length f is 1.023 mm and the entrance pupil diameter HEP is 0.526 mm. Therefore, the following condition 2-2 is satisfied:

$$f/HEP < 2.3 \qquad (2\text{-}2)$$

In condition 2-2, the ratio of the effective focal length f to the entrance pupil diameter HEP of the wide-angle lens 1000 as a whole is set as f/HEP<2.3, thereby ensuring the brightness of the wide-angle lens 1000, and enabling use of the wide-angle lens 1000 in a high pixel imaging element.

In addition, as is clear from Table 3, the effective radius sd12 of the image side lens surface (that is, the second surface 2) of the first lens 110 is 3.013 mm, and the radius of curvature R12 of the second surface 2 of the first lens 110 is 3.310 mm. Therefore, the following condition 2-3 is satisfied:

$$0.890 < sd12/R12 < 0.970 \qquad (2\text{-}3)$$

In condition 2-3, the ratio of the effective radius sd12 to the radius of curvature R12 of the second surface 2 of the first lens 110 is set to be greater than 0.890, thereby expanding the HFOV, in particular, to 98° or greater; the ratio of the effective radius sd12 to the radius of curvature R12 of the second surface 2 of the first lens 110 is set to be less than 0.970, thereby preventing the angle defined between the peripheral part of the second surface 2 of the first lens 110 made of glass and the tangent line from being excessively small, and further making it possible to perform a polishing process on the second surface 2 of the first lens 110.

In addition, as is clear from Table 3, the radius of curvature R11 of the object side lens surface (that is, the first surface 1) of the first lens 110 is 11.363 mm, and the radius of curvature R12 of the image side lens surface (that is, the second surface 2) of the first lens 110 is 3.310 mm. Therefore, the following condition 2-4 is satisfied:

$$1.300 < (R11+R12)/(R11-R12) < 1.900 \quad (2\text{-}4)$$

Moreover, the following condition 2-5 is satisfied:

$$1.600 < (R11+R12)/(R11-R12) < 1.850 \quad (2\text{-}5)$$

In condition 2-4, (R11+R12)/(R11−R12) is set to be greater than 1.300, thereby preventing the radius of curvature R12 of the image side lens surface (that is, the second surface 2) of the first lens 110 from being excessively small, thus facilitating the molding of the second surface 2 of the first lens 110. In another respect, the radius of curvature R11 of the object side lens surface (that is, the first surface 1) of the first lens 110 is able to be prevented from being excessively large, thereby avoiding an excessively large diameter of the first lens 110, thus miniaturizing the wide-angle lens 1000. In addition, (R11+R12)/(R11−R12) is set to be less than 1.900, thereby ensuring sufficient refractive power of the first lens 110, thus facilitating the expansion of the maximum HFOV co of the first lens 110. Moreover, a sufficient thickness of the first lens 110 is able to be ensured, so as to prevent the first lens 110 from being damaged due to impact or the like.

In condition 2-5, (R11+R12)/(R11−R12) is further set to be greater than 1.600, thereby further preventing the radius of curvature R12 of the image side lens surface (that is, the second surface 2) of the first lens 110 from being excessively small, thus further facilitating the molding of the second surface 2 of the first lens 110. In another respect, the radius of curvature R11 of the object side lens surface (that is, the first surface 1) of the first lens 110 is able to be further prevented from being excessively large, thereby further avoiding an excessively large diameter of the first lens 110, thus further miniaturizing the wide-angle lens 1000. In addition, (R11+R12)/(R11−R12) is further set to be less than 1.850, thereby further ensuring sufficient refractive power of the first lens 110, thus further facilitating the expansion of the maximum HFOV co of the first lens 110. Moreover, a sufficient thickness of the first lens 110 is able to be further ensured, so as to further prevent the first lens 110 from being damaged due to impact or the like.

In addition, as is clear from Table 3, the thickness T1 of the first lens 110 is 1.561 mm (the thickness T1 of the first lens 110 is defined as a distance between the object side lens surface (that is, the first surface 1) of the first lens 110 and the image side lens surface (that is, the second surface 2) of the first lens 110 in the optical axis direction), the sag Sag12 of the image side lens surface (that is, the second surface 2) of the first lens 110 is 1.940 mm. Therefore, the following condition 2-6 is satisfied:

$$0.700 < T1/Sag12 < 1.100 \quad (2\text{-}6)$$

In condition 2-6, the ratio of the thickness T1 of the first lens 110 to the sag Sag12 of the image side lens surface (that is, the second surface 2) of the first lens 110 is set to be greater than 0.700, thereby ensuring a sufficient thickness of the first lens 110 to prevent the first lens 110 from being damaged due to impact or the like; the ratio of the thickness T1 of the first lens 110 to the sag Sag12 of the image side lens surface (that is, the second surface 2) of the first lens 110 is set to be less than 1.100, thereby avoiding an excessively large thickness of the first lens 110, thus making it possible to achieve desired negative refractive power.

In addition, in the wide-angle lens 1000 of this embodiment, the object-to-image distance d of the wide-angle lens 1000 is 13.610 mm, and the effective focal length f of the wide-angle lens 1000 as a whole is 1.062 mm. Therefore, the following condition 2-7 is satisfied:

$$11.000 < d/f < 15.000 \quad (2\text{-}7)$$

In condition 2-7, the ratio of the object-to-image distance d of the wide-angle lens 1000 to the effective focal length f of the wide-angle lens 1000 as a whole is set to be greater than 11.000, thereby enabling appropriate correction to be easily made for various aberrations, thus making it easy to achieve good optical characteristics; the ratio of the object-to-image distance d of the wide-angle lens 1000 to the effective focal length f of the wide-angle lens 1000 as a whole is set to be less than 15.000, thereby preventing the wide-angle lens 1000 from becoming excessively large while avoiding an excessively large overall length of the wide-angle lens 1000.

In summary, in this embodiment, by configuring the wide-angle lens 1000 as above, as shown in FIG. 6A to FIG. 8L, appropriate correction is enabled for various aberrations such as curvature of field, chromatic aberration of magnification, and coma. Moreover, the miniaturization is able to be achieved while the maximum HFOV co is expanded.

Figure 9:
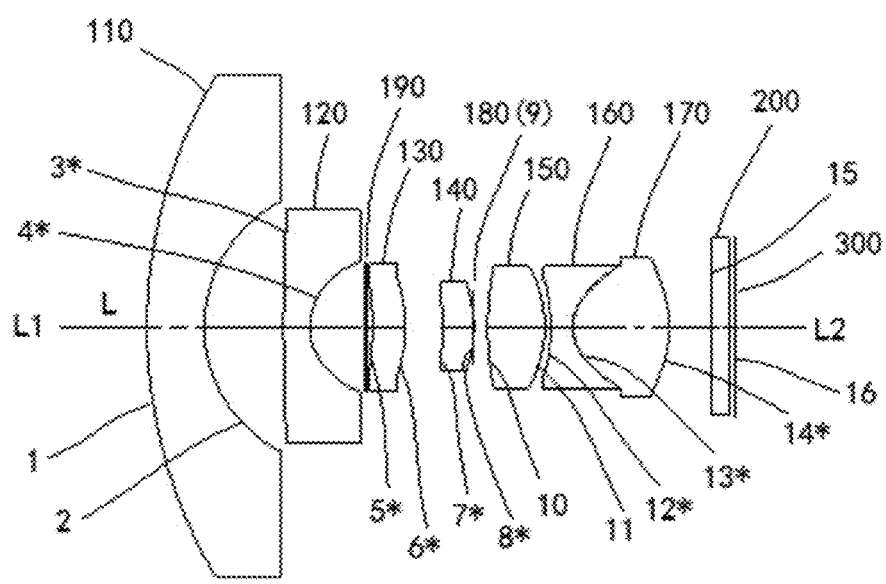
FIG. 9 illustrates a wide-angle lens according to Embodiment 3 of the disclosure.
Figure 10A:
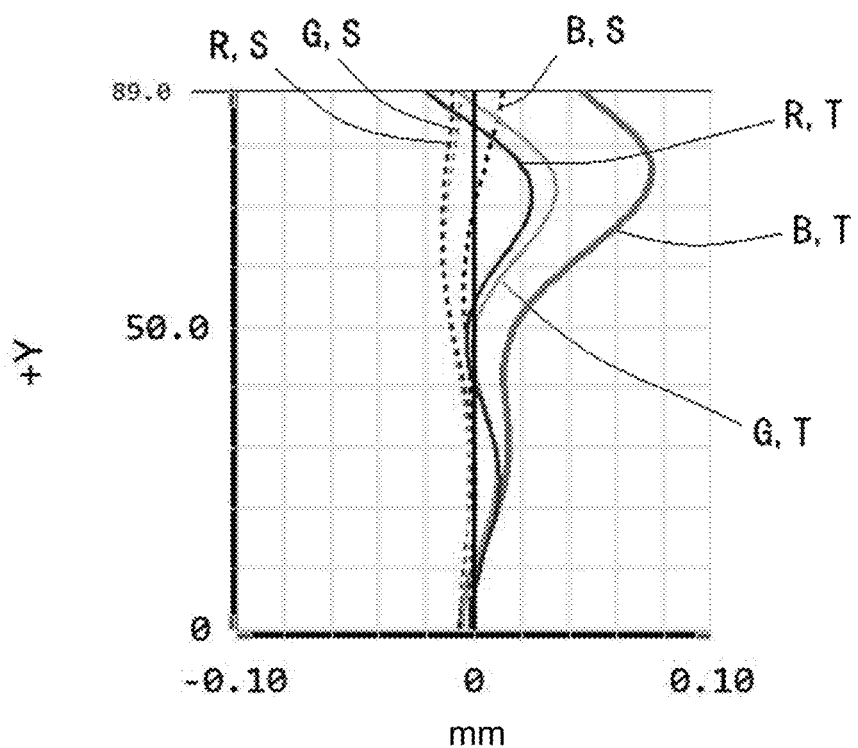
FIG. 10A illustrates curvature of field and distortion of the wide-angle lens according to Embodiment 3 of the disclosure.
Figure 10B:
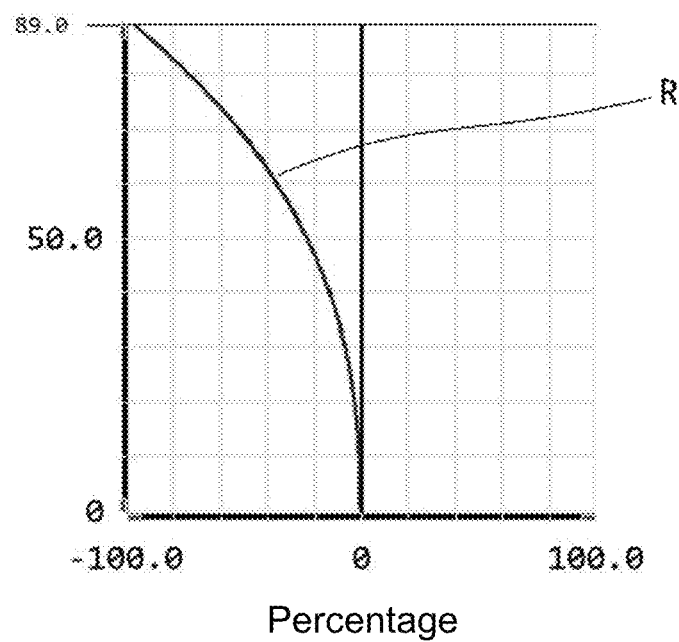
FIG. 10B illustrates curvature of field and distortion of the wide-angle lens according to Embodiment 3 of the disclosure.
Figure 11:
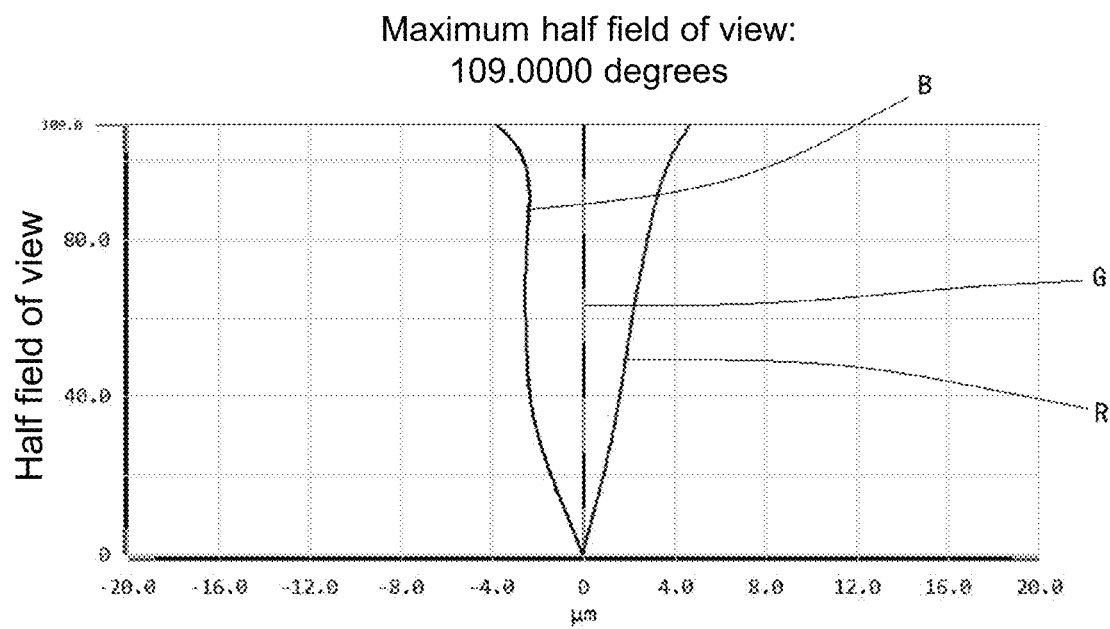
FIG. 11A illustrates lateral chromatic aberration (transverse chromatic aberration) of the wide-angle lens according to Embodiment 3 of the disclosure.
FIG. 11B illustrates spherical aberration (longitudinal aberration) of the wide-angle lens according to Embodiment 3 of the disclosure.
Figure 11B:
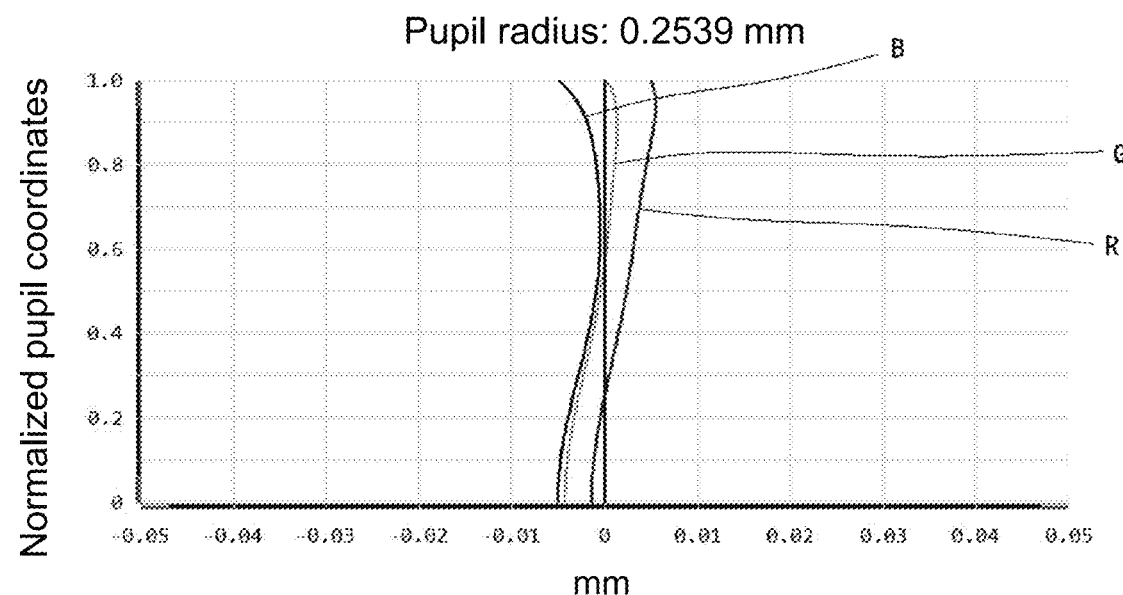
Figure 12A:
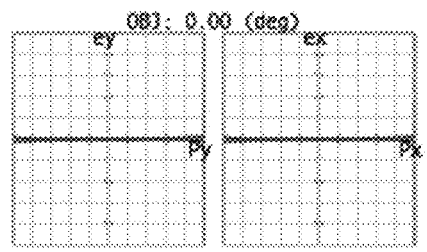
FIG. 12A to FIG. 12L illustrate transverse aberration of the wide-angle lens according to Embodiment 3 of the disclosure.
Figure 12B:
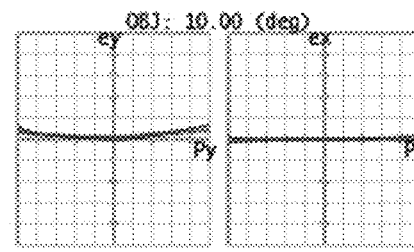
Figure 12C:
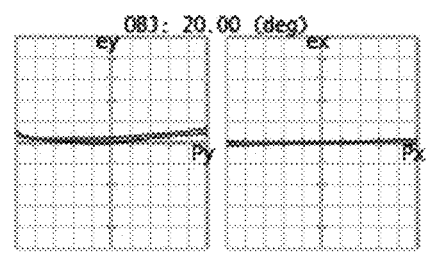
Figure 12D:
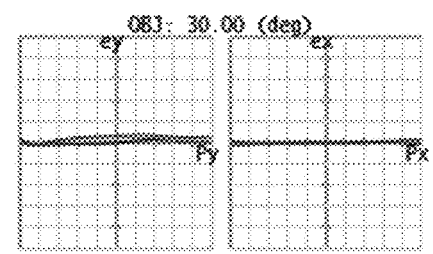
Figure 12E:
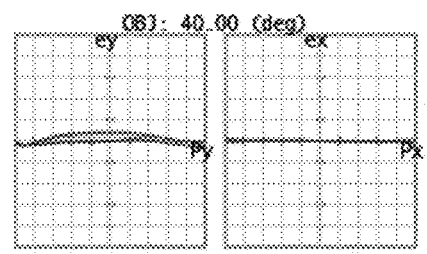
Figure 12F:
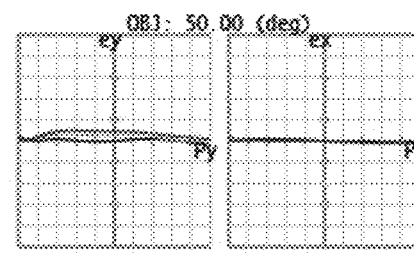
Figure 12G:
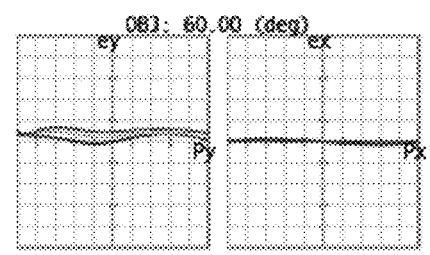
Figure 12H:
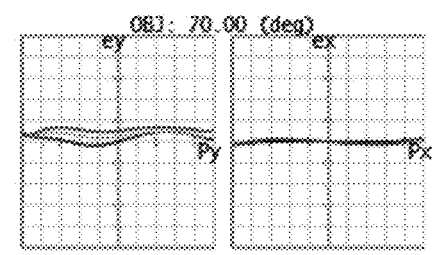
Figure 12I:
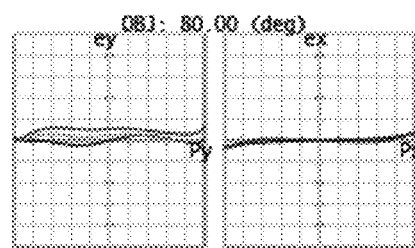
Figure 12J:
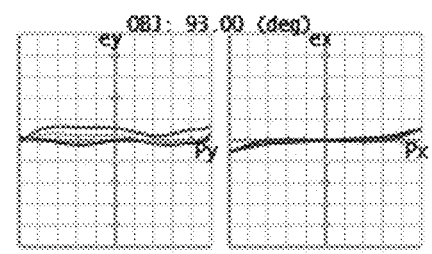
Figure 12K:
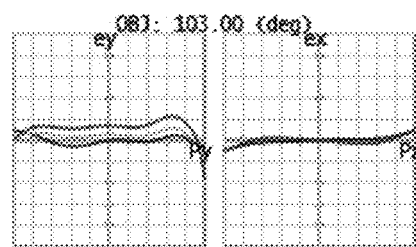
Figure 12L:
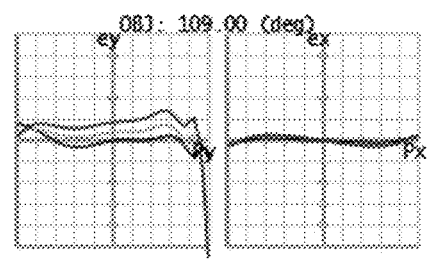

FIG. 9 illustrates a wide-angle lens according to Embodiment 3 of the disclosure. FIG. 10A illustrates curvature of field and distortion of the wide-angle lens according to Embodiment 3 of the disclosure. FIG. 10B illustrates curvature of field and distortion of the wide-angle lens according to Embodiment 3 of the disclosure. FIG. 11A illustrates lateral chromatic aberration (transverse chromatic aberration) of the wide-angle lens according to Embodiment 3 of the disclosure. FIG. 11B illustrates spherical aberration (longitudinal aberration) of the wide-angle lens according to Embodiment 3 of the disclosure. FIG. 12A to FIG. 12L illustrate transverse aberration of the wide-angle lens according to Embodiment 3 of the disclosure. Here, in FIG. 10A, FIG. 10B, FIG. 11A, FIG. 11B, and FIG. 12A to FIG. 12L, a correlation curve of red light R (having a wavelength of 656 nm) is denoted by R, a correlation curve of green light G (having a wavelength of 588 nm) is denoted by G, and a correlation curve of blue light B (having a wavelength of 486 nm) is denoted by B. T indicates being related to the meridian plane, and S indicates being related to the sagittal plane. Moreover, in FIG. 12A to FIG. 12L, the maximum scale of the longitudinal axis is ±50.000 μm.

As shown in FIG. 9, the wide-angle lens 1000 includes, sequentially arranged from the object side (L1 side), the first lens 110 (that is, the first lens 110 is located closest to the object side), the second lens 120 (that is, the second lens 120 is located on the image side of and adjacent to the first lens 110), the third lens 130, the fourth lens 140, the diaphragm 180, the fifth lens 150, the sixth lens 160 and the seventh lens 170. Among them, the sixth lens 160 and the seventh lens 170 are bonded together by an adhesive to constitute a cemented lens.

Here, the wide-angle lens 1000 in this embodiment has the same basic structure (that is, whether each of the first lens 110, the second lens 120, the third lens 130, the fourth lens 140, the fifth lens 150, the sixth lens 160 and the seventh lens 170 has positive refractive power or negative refractive power, whether each of these lenses is a glass lens or plastic lens, whether the object side surface and the image side surface of each of these lenses are convex surfaces or concave surfaces, and whether the object side surface and the image side surface are spherical surfaces or aspheric surfaces) as that of the wide-angle lens of Embodiment 1, and thus the details thereof will be omitted.

As shown in FIG. 9, similarly to Embodiment 1, the light-shielding sheet 190 is provided between the second lens 120 and the third lens 130, the filter 200 is arranged on the image side of the seventh lens 170, and the imaging element 300 is arranged on the image side of the filter 200.

In this embodiment, in the lens system as a whole, the effective focal length f is 1.026 mm, the object-to-image distance (total track) d is 13.403 mm, the F value (image space F/#) is 2.02, the maximum HFOV (maximum half field angle) is 109 degrees, and the entrance pupil diameter HEP is 0.508 mm.

Table 5 shows physical properties of each surface of the wide-angle lens 1000 of this embodiment. Table 6-1 and Table 6-2 show aspheric coefficients of each surface of the wide-angle lens 1000 of this embodiment.

TABLE 5

| Surface | Radius of curvature | Thickness | $N_d$ | $v_d$ | Effective focal length | Effective radius | Sag |
|---|---|---|---|---|---|---|---|
| 1 | 11.171 | 1.300 | 1.871 | 40.73 | −1.467 | 5.722 | 1.578 |
| 2 | 3.204 | 1.815 | | | | 2.863 | 1.766 |
| 3* | 35.057 | 0.600 | 1.544 | 56.4 | | 2.675 | 0.053 |
| 4* | 1.388 | 1.422 | | | | 1.498 | 1.147 |
| 5* | −5.882 | 0.763 | 1.544 | 56.4 | 3.456 | 1.463 | −0.052 |
| 6* | −2.425 | 0.839 | | | | 1.348 | −0.220 |
| 7* | −6.368 | 0.718 | 1.635 | 23.9 | | 1.032 | −0.026 |
| 8* | −2.397 | −0.037 | | | | 0.903 | −0.150 |
| 9 (diaphragm) | Infinite | 0.347 | | | | | |
| 10 | 7.103 | 1.300 | 1.697 | 55.46 | | 1.400 | 0.139 |
| 11 | −2.839 | 0.135 | | | | 1.400 | −0.369 |
| 12* | −4.077 | 0.500 | 1.635 | 23.9 | 11.542 | 1.173 | −0.184 |
| 13* | 1.068 | 2.213 | 1.544 | 56.4 | | 1.411 | 1.091 |
| 14* | −2.294 | 0.963 | | | | 1.597 | −0.422 |
| 15 | Infinite | 0.400 | | | | | |
| 16 | Infinite | 0.125 | | | | | |

In Table 5 above, the radius of curvature, thickness, effective focal length, effective radius, and sag are in units of mm. $N_d$ represents a refractive index for a ray of 587.56 nm. $V_d$ represents the Abbe number. * represents an aspheric surface.

TABLE 6-1

| Surface | c (1/radius of curvature) | K | A4 | A6 |
|---|---|---|---|---|
| 3 | 2.85248E−02 | 0.00000E+00 | −7.73953E−04 | −2.76248E−05 |
| 4 | 7.20578E−01 | −1.00000E+00 | 1.69157E−02 | 2.83585E−02 |
| 5 | −1.69997E−01 | 0.00000E+00 | 4.77013E−03 | 1.28269E−02 |
| 6 | −4.12314E−01 | 0.00000E+00 | 4.38590E−02 | 3.36563E−03 |
| 7 | −1.57044E−01 | 0.00000E+00 | 5.20793E−02 | −9.74604E−03 |
| 8 | −4.17218E−01 | 0.00000E+00 | 3.75209E−02 | −1.18387E−03 |
| 12 | −2.45256E−01 | 0.00000E+00 | 1.12258E−02 | −2.18878E−02 |
| 13 | 9.36158E−01 | −1.00000E+00 | 1.84892E−01 | −2.17248E−01 |
| 14 | −4.35910E−01 | 0.00000E+00 | 6.08264E−02 | −6.37284E−02 |

TABLE 6-2

| Surface | A8 | A10 | A12 | A14 | A16 |
|---|---|---|---|---|---|
| 3 | 0.00000E+00 | 0.00000E+00 | 0.00000E+00 | 0.00000E+00 | 0.00000E+00 |
| 4 | −1.08170E−02 | 3.74135E−03 | 0.00000E+00 | 0.00000E+00 | 0.00000E+00 |
| 5 | −6.95368E−04 | 2.73435E−05 | 0.00000E+00 | 0.00000E+00 | 0.00000E+00 |
| 6 | 2.29705E−03 | −1.23857E−05 | 0.00000E+00 | 0.00000E+00 | 0.00000E+00 |
| 7 | 8.85677E−03 | −7.73714E−05 | 0.00000E+00 | 0.00000E+00 | 0.00000E+00 |
| 8 | 4.43504E−03 | 9.66329E−04 | 0.00000E+00 | 0.00000E+00 | 0.00000E+00 |
| 12 | 3.37862E−04 | 9.82658E−03 | −3.53648E−03 | −1.65685E−04 | 0.00000E+00 |
| 13 | 1.49413E−01 | −7.49877E−02 | 2.96657E−02 | −5.71297E−03 | 0.00000E+00 |
| 14 | 5.78846E−02 | −2.66940E−02 | 6.28648E−03 | −5.86821E−04 | 0.00000E+00 |

In Table 6-1 and Table 6-2 above, in a case where a lens surface is a convex surface protruding toward the object side or a concave surface recessed toward the object side, its radius of curvature is set to a positive value; in a case where a lens surface is a convex surface protruding toward the image side or a concave surface recessed toward the image side, its radius of curvature is set to a negative value.

In addition, Table 6-1 and Table 6-2 above show the aspheric coefficients A4, A6, A8, A10, A12, A14 and A16 of each of the aspheric surfaces, which satisfy expression 1 above.

Here, as described above, the maximum HFOV ω of the wide-angle lens 1000 as a whole is 109 degrees, that is, the following condition 3-1 is satisfied:

$$98°<\omega<120° \tag{3-1}$$

In condition 3-1, the maximum HFOV ω is set to be greater than 98°, thereby expanding the maximum HFOV ω; the maximum HFOV ω is set to be less than 120°, thereby avoiding a situation that a peripheral portion of an image becomes dark due to a light quantity ratio at the periphery of the wide-angle lens 1000 being smaller than a light quantity ratio at the center of the wide-angle lens 1000. Further, the wide-angle lens 1000 is able to be miniaturized as a whole while the maximum HFOV ω of the wide-angle lens 1000 is expanded.

In addition, in the wide-angle lens 1000 as a whole, the effective focal length f is 1.026 mm and the entrance pupil diameter HEP is 0.508 mm. Therefore, the following condition 3-2 is satisfied:

$$f/HEP<2.3 \tag{3-2}$$

In condition 3-2, the ratio of the effective focal length f to the entrance pupil diameter HEP of the wide-angle lens 1000 as a whole is set as f/HEP<2.3, thereby ensuring the brightness of the wide-angle lens 1000, and enabling use of the wide-angle lens 1000 in a high pixel imaging element.

In addition, as is clear from Table 5, the effective radius sd12 of the image side lens surface (that is, the second surface 2) of the first lens 110 is 2.863 mm, and the radius of curvature R12 of the second surface 2 of the first lens 110 is 3.204 mm. Therefore, the following condition 3-3 is satisfied:

$$0.890<sd12/R12<0.970 \tag{3-3}$$

In condition 3-3, the ratio of the effective radius sd12 to the radius of curvature R12 of the second surface 2 of the first lens 110 is set to be greater than 0.890, thereby expanding the HFOV, in particular, to 98° or greater; the ratio of the effective radius sd12 to the radius of curvature R12 of the second surface 2 of the first lens 110 is set to be less than 0.970, thereby preventing the angle defined between the peripheral part of the second surface 2 of the first lens 110 made of glass and the tangent line from being excessively small, and further making it possible to perform a polishing process on the second surface 2 of the first lens 110.

In addition, as is clear from Table 5, the radius of curvature R11 of the object side lens surface (that is, the first surface 1) of the first lens 110 is 11.171 mm, and the radius of curvature R12 of the image side lens surface (that is, the second surface 2) of the first lens 110 is 3.204 mm. Therefore, the following condition 3-4 is satisfied:

$$1.300<(R11+R12)/(R11-R12)<1.900 \tag{3-4}$$

Moreover, the following condition 3-5 is satisfied:

$$1.600<(R11+R12)/(R11-R12)<1.850 \tag{3-5}$$

In condition 3-4, (R11+R12)/(R11−R12) is set to be greater than 1.300, thereby preventing the radius of curvature R12 of the image side lens surface (that is, the second surface 2) of the first lens 110 from being excessively small, thus facilitating the molding of the second surface 2 of the first lens 110. In another respect, the radius of curvature R11 of the object side lens surface (that is, the first surface 1) of the first lens 110 is able to be prevented from being excessively large, thereby avoiding an excessively large diameter of the first lens 110, thus miniaturizing the wide-angle lens 1000. In addition, (R11+R12)/(R11−R12) is set to be less than 1.900, thereby ensuring sufficient refractive power of the first lens 110, thus facilitating the expansion of the maximum HFOV ω of the first lens 110. Moreover, a sufficient thickness of the first lens 110 is able to be ensured, so as to prevent the first lens 110 from being damaged due to impact or the like.

In condition 3-5, (R11+R12)/(R11−R12) is further set to be greater than 1.600, thereby further preventing the radius of curvature R12 of the image side lens surface (that is, the second surface 2) of the first lens 110 from being excessively small, thus further facilitating the molding of the second surface 2 of the first lens 110. In another respect, the radius of curvature R11 of the object side lens surface (that is, the first surface 1) of the first lens 110 is able to be further prevented from being excessively large, thereby further avoiding an excessively large diameter of the first lens 110, thus further miniaturizing the wide-angle lens 1000. In addition, (R11+R12)/(R11−R12) is further set to be less than 1.850, thereby further ensuring sufficient refractive power of the first lens 110, thus further facilitating the expansion of the maximum HFOV ω of the first lens 110. Moreover, a sufficient thickness of the first lens 110 is able to be further ensured, so as to further prevent the first lens 110 from being damaged due to impact or the like.

In addition, as is clear from Table 5, the thickness T1 of the first lens 110 is 1.300 mm (the thickness T1 of the first lens 110 is defined as a distance between the object side lens surface (that is, the first surface 1) of the first lens 110 and the image side lens surface (that is, the second surface 2) of the first lens 110 in the optical axis direction), the sag Sag12 of the image side lens surface (that is, the second surface 2) of the first lens 110 is 1.766 mm. Therefore, the following condition 3-6 is satisfied:

$$0.700<T1/Sag12<1.100 \tag{3-6}$$

In condition 3-6, the ratio of the thickness T1 of the first lens 110 to the sag Sag12 of the image side lens surface (that is, the second surface 2) of the first lens 110 is set to be greater than 0.700, thereby ensuring a sufficient thickness of the first lens 110 to prevent the first lens 110 from being damaged due to impact or the like; the ratio of the thickness T1 of the first lens 110 to the sag Sag12 of the image side lens surface (that is, the second surface 2) of the first lens 110 is set to be less than 1.100, thereby avoiding an excessively large thickness of the first lens 110, thus making it possible to achieve desired negative refractive power.

In addition, in the wide-angle lens 1000 of this embodiment, the object-to-image distance d of the wide-angle lens 1000 is 13.403 mm, and the effective focal length f of the wide-angle lens 1000 as a whole is 1.026 mm. Therefore, the following condition 3-7 is satisfied:

$$11.000<d/f<15.000 \tag{3-7}$$

In condition 3-7, the ratio of the object-to-image distance d of the wide-angle lens 1000 to the effective focal length f of the wide-angle lens 1000 as a whole is set to be greater than 11.000, thereby enabling appropriate correction to be easily made for various aberrations, thus making it easy to achieve good optical characteristics; the ratio of the object-to-image distance d of the wide-angle lens 1000 to the effective focal length f of the wide-angle lens 1000 as a whole is set to be less than 15.000, thereby preventing the wide-angle lens 1000 from becoming excessively large while avoiding an excessively large overall length of the wide-angle lens 1000.

In summary, in this embodiment, by configuring the wide-angle lens 1000 as above, as shown in FIG. 10A to FIG. 12L, appropriate correction is enabled for various aberrations such as curvature of field, chromatic aberration of magnification, and coma. Moreover, the miniaturization is able to be achieved while the maximum HFOV ω is expanded.

Figure 13:
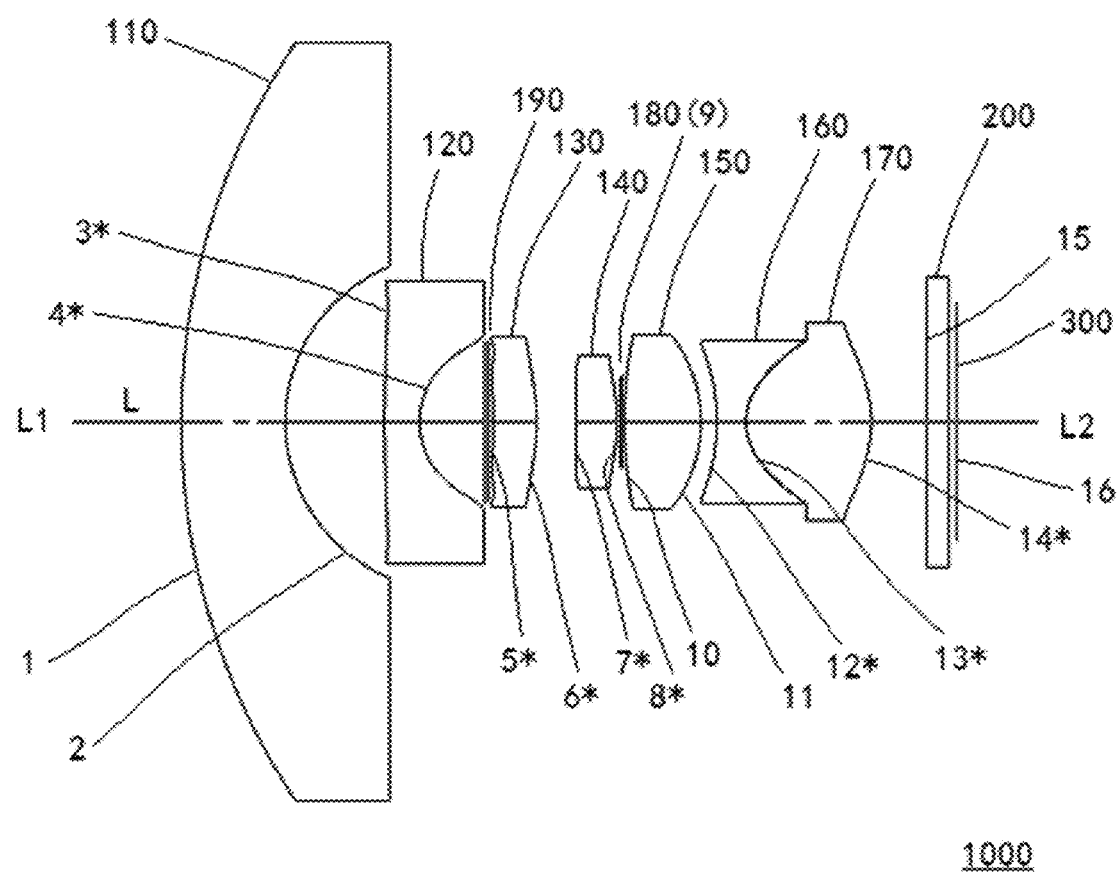
FIG. 13 illustrates a wide-angle lens according to Embodiment 4 of the disclosure.
Figure 14A:
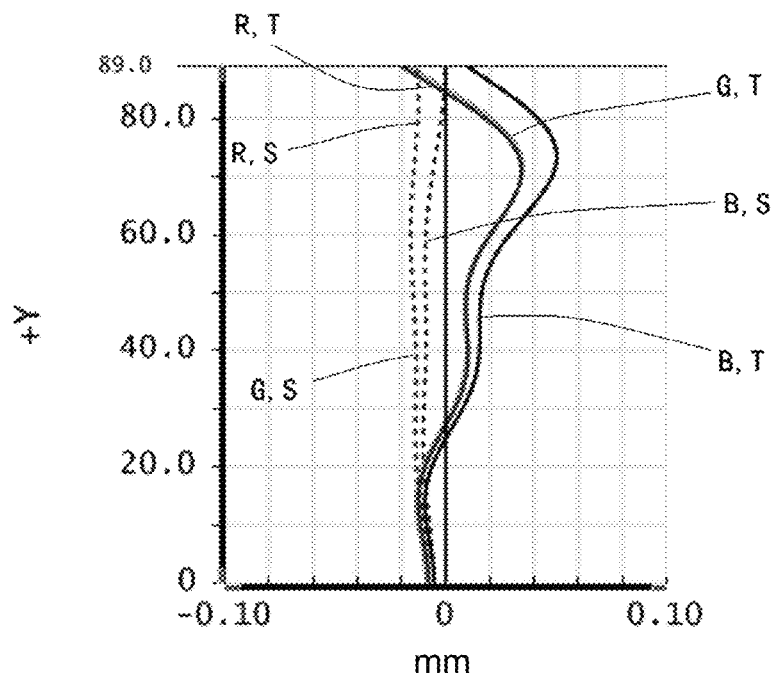
FIG. 14A illustrates curvature of field and distortion of the wide-angle lens according to Embodiment 4 of the disclosure.
Figure 14B:
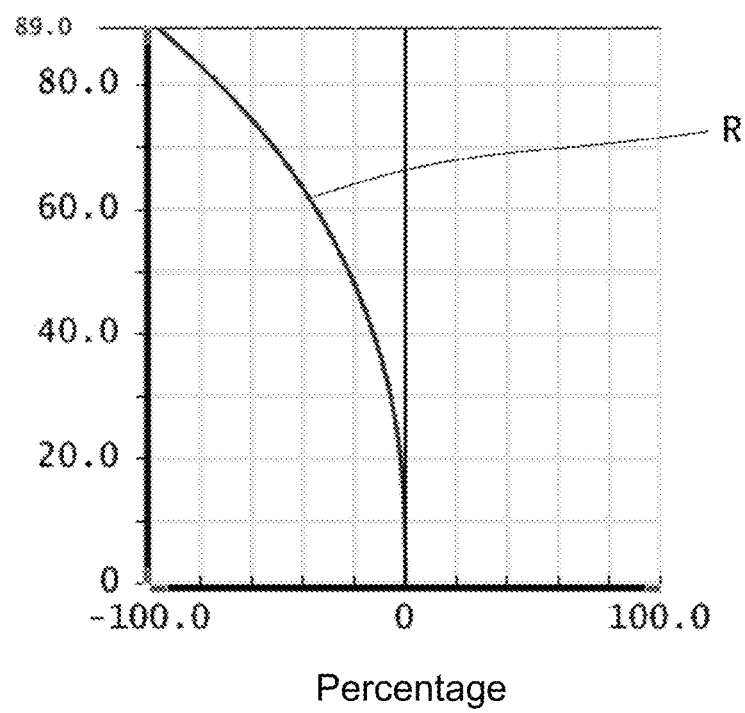
FIG. 14B illustrates curvature of field and distortion of the wide-angle lens according to Embodiment 4 of the disclosure.
Figure 15A:
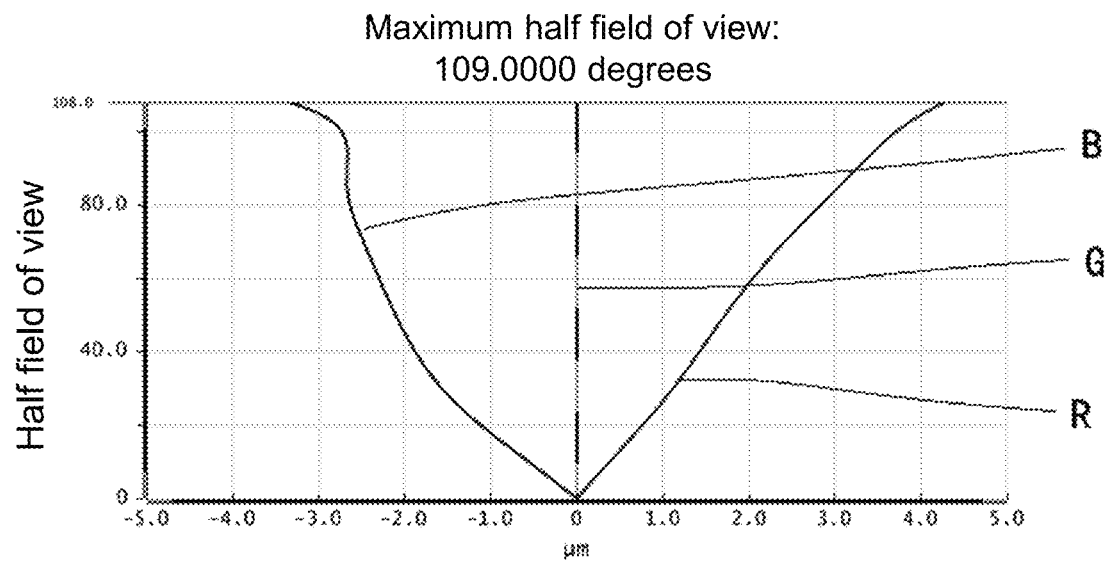
FIG. 15A illustrates lateral chromatic aberration (transverse chromatic aberration) of the wide-angle lens according to Embodiment 4 of the disclosure.
Figure 15B:
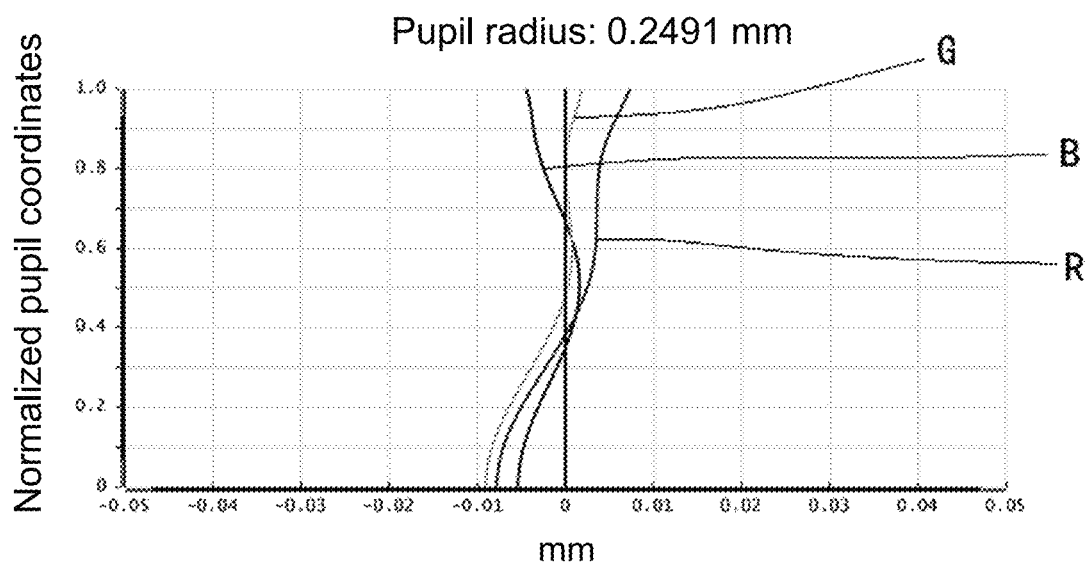
FIG. 15B illustrates spherical aberration (longitudinal aberration) of the wide-angle lens according to Embodiment 4 of the disclosure.
Figure 16I:
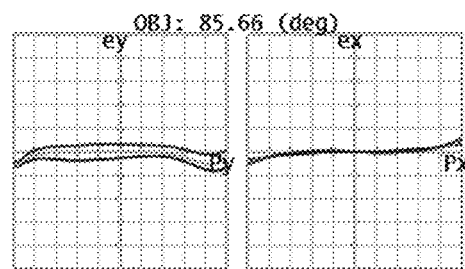
Figure 16J:
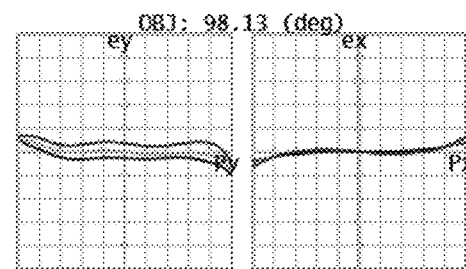
Figure 16K:
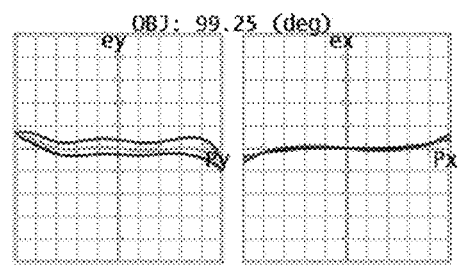
Figure 16L:
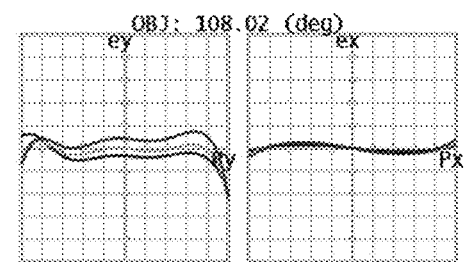

FIG. 13 illustrates a wide-angle lens according to Embodiment 4 of the disclosure. FIG. 14A illustrates curvature of field and distortion of the wide-angle lens according to Embodiment 4 of the disclosure. FIG. 14B illustrates curvature of field and distortion of the wide-angle lens according to Embodiment 4 of the disclosure. FIG. 15A illustrates lateral chromatic aberration (transverse chromatic aberration) of the wide-angle lens according to Embodiment 4 of the disclosure. FIG. 15B illustrates spherical aberration (longitudinal aberration) of the wide-angle lens according to Embodiment 4 of the disclosure. FIG. 16A to FIG. 16L illustrate transverse aberration of the wide-angle lens according to Embodiment 4 of the disclosure. Here, in FIG. 14A, FIG. 14B, FIG. 15A, FIG. 15B, and FIG. 16A to FIG. 16L, a correlation curve of red light R (having a wavelength of 656 nm) is denoted by R, a correlation curve of green light G (having a wavelength of 588 nm) is denoted by G, and a correlation curve of blue light B (having a wavelength of 486 nm) is denoted by B. T indicates being related to the meridian plane, and S indicates being related to the sagittal plane. Moreover, in FIG. 16A to FIG. 16L, the maximum scale of the longitudinal axis is ±50.000 μm.

As shown in FIG. 13, the wide-angle lens 1000 includes, sequentially arranged from the object side (L1 side), the first lens 110 (that is, the first lens 110 is located closest to the object side), the second lens 120 (that is, the second lens 120 is located on the image side of and adjacent to the first lens 110), the third lens 130, the fourth lens 140, the diaphragm 180, the fifth lens 150, the sixth lens 160 and the seventh lens 170. Among them, the sixth lens 160 and the seventh lens 170 are bonded together by an adhesive to constitute a cemented lens.

Here, the wide-angle lens 1000 in this embodiment has the same basic structure (that is, whether each of the first lens 110, the second lens 120, the third lens 130, the fourth lens 140, the fifth lens 150, the sixth lens 160 and the seventh lens 170 has positive refractive power or negative refractive power, whether each of these lenses is a glass lens or plastic lens, whether the object side surface and the image side surface of each of these lenses are convex surfaces or concave surfaces, and whether the object side surface and the image side surface are spherical surfaces or aspheric surfaces) as that of the wide-angle lens of Embodiment 1, and thus the details thereof will be omitted.

As shown in FIG. 13, similarly to Embodiment 1, the light-shielding sheet 190 is provided between the second lens 120 and the third lens 130, the filter 200 is arranged on the image side of the seventh lens 170, and the imaging element 300 is arranged on the image side of the filter 200.

In this embodiment, in the lens system as a whole, the effective focal length f is 1.011 mm, the object-to-image distance (total track) d is 13.404 mm, the F value (image space F/#) is 2.03, the maximum HFOV (maximum half field angle) is 109 degrees, and the entrance pupil diameter HEP is 0.498 mm.

Table 7 shows physical properties of each surface of the wide-angle lens 1000 of this embodiment. Table 8-1 and Table 8-2 show aspheric coefficients of each surface of the wide-angle lens 1000 of this embodiment.

TABLE 7

| Surface | Radius of curvature | Thickness | $N_d$ | $v_d$ | Effective focal length | Effective radius | Sag |
|---|---|---|---|---|---|---|---|
| 1 | 11.850 | 1.800 | 1.871 | 40.73 | −1.347 | 6.043 | 1.658 |
| 2 | 2.910 | 1.717 | | | | 2.623 | 1.649 |
| 3* | 23.043 | 0.600 | 1.544 | 56.4 | | 2.444 | 0.033 |
| 4* | 1.291 | 1.276 | | | | 1.435 | 1.058 |
| 5* | −13.541 | 0.750 | 1.544 | 56.4 | 3.614 | 1.355 | −0.010 |
| 6* | −3.273 | 0.679 | | | | 1.286 | −0.155 |
| 7* | −20.063 | 0.710 | 1.635 | 23.9 | | 1.034 | 0.029 |
| 8* | −3.188 | 0.056 | | | | 0.886 | −0.100 |
| 9 (diaphragm) | Infinite | 0.076 | | | | | |
| 10 | 7.740 | 1.320 | 1.697 | 55.46 | | 1.500 | 0.147 |
| 11 | −2.450 | 0.271 | | | | 1.500 | −0.513 |
| 12* | −4.136 | 0.500 | 1.635 | 23.9 | 8.497 | 1.083 | −0.170 |
| 13* | 0.946 | 2.180 | 1.544 | 56.4 | | 1.342 | 0.954 |
| 14* | −2.056 | 0.944 | | | | 1.566 | −0.443 |
| 15 | Infinite | 0.400 | | | | | |
| 16 | Infinite | 0.125 | | | | | |

In Table 7 above, the radius of curvature, thickness, effective focal length, effective radius, and sag are in units of mm. $N_d$ represents a refractive index for a ray of 587.56 nm. $V_d$ represents the Abbe number. * represents an aspheric surface.

TABLE 8-1

| Surface | c (1/radius of curvature) | K | A4 | A6 |
|---|---|---|---|---|
| 3 | 4.33971E−02 | 0.00000E+00 | −6.82448E−03 | 3.73911E−03 |
| 4 | 7.74346E−01 | −5.39587E+00 | 2.32631E−01 | −1.17492E−01 |
| 5 | −7.38477E−02 | 0.00000E+00 | 2.29113E−02 | 4.37979E−03 |
| 6 | −3.05528E−01 | 0.00000E+00 | 4.74057E−02 | −5.28192E−03 |
| 7 | −4.98442E−02 | 0.00000E+00 | 4.27102E−02 | −4.22032E−04 |
| 8 | −3.13660E−01 | 0.00000E+00 | 3.38907E−02 | 3.26534E−03 |
| 12 | −2.41789E−01 | 0.00000E+00 | −3.09436E−02 | 3.41185E−02 |
| 13 | 1.05668E+00 | −1.00000E+00 | 5.66189E−04 | −1.14232E−02 |
| 14 | −4.86390E−01 | 0.00000E+00 | 7.16605E−02 | −6.17165E−02 |

TABLE 8-2

| Surface | A8 | A10 | A12 | A14 | A16 |
|---|---|---|---|---|---|
| 3 | −1.15147E−03 | 1.50789E−04 | −7.30801E−06 | 0.00000E+00 | 0.00000E+00 |
| 4 | 7.01048E−02 | −7.98133E−03 | −4.17335E−03 | 0.00000E+00 | 0.00000E+00 |
| 5 | 1.21716E−02 | −8.91664E−03 | 0.00000E+00 | 0.00000E+00 | 0.00000E+00 |
| 6 | 2.05279E−02 | −2.11693E−02 | 5.41203E−03 | 0.00000E+00 | 0.00000E+00 |
| 7 | 6.15517E−03 | 0.00000E+00 | 0.00000E+00 | 0.00000E+00 | 0.00000E+00 |
| 8 | 8.49340E−03 | 3.83965E−03 | −2.61241E−03 | 0.00000E+00 | 0.00000E+00 |
| 12 | −5.25642E−02 | 5.03801E−02 | −2.60337E−02 | 5.67639E−03 | 0.00000E+00 |
| 13 | 1.93193E−02 | −2.02628E−02 | 1.27147E−02 | −3.03203E−03 | 0.00000E+00 |
| 14 | 5.37377E−02 | −2.41958E−02 | 5.72598E−03 | −5.29799E−04 | 0.00000E+00 |

In Table 8-1 and Table 8-2 above, in a case where a lens surface is a convex surface protruding toward the object side or a concave surface recessed toward the object side, its radius of curvature is set to a positive value; in a case where a lens surface is a convex surface protruding toward the image side or a concave surface recessed toward the image side, its radius of curvature is set to a negative value.

In addition, Table 8-1 and Table 8-2 above show the aspheric coefficients A4, A6, A8, A10, A12, A14 and A16 of each of the aspheric surfaces, which satisfy expression 1 above.

Here, as described above, the maximum HFOV ω of the wide-angle lens 1000 as a whole is 109 degrees, that is, the following condition 4-1 is satisfied:

$$98° < \omega < 120° \quad (4\text{-}1)$$

In condition 4-1, the maximum HFOV ω is set to be greater than 98°, thereby expanding the maximum HFOV ω; the maximum HFOV ω is set to be less than 120°, thereby avoiding a situation that a peripheral portion of an image becomes dark due to a light quantity ratio at the periphery of the wide-angle lens 1000 being smaller than a light quantity ratio at the center of the wide-angle lens 1000. Further, the wide-angle lens 1000 is able to be miniaturized as a whole while the maximum HFOV ω of the wide-angle lens 1000 is expanded.

In addition, in the wide-angle lens 1000 as a whole, the effective focal length f is 1.011 mm and the entrance pupil diameter HEP is 0.498 mm. Therefore, the following condition 4-2 is satisfied:

$$f/HEP < 2.3 \quad (4\text{-}2)$$

In condition 4-2, the ratio of the effective focal length f to the entrance pupil diameter HEP of the wide-angle lens 1000 as a whole is set as f/HEP<2.3, thereby ensuring the brightness of the wide-angle lens 1000, and enabling use of the wide-angle lens 1000 in a high pixel imaging element.

In addition, as is clear from Table 7, the effective radius sd12 of the image side lens surface (that is, the second surface 2) of the first lens 110 is 2.623 mm, and the radius of curvature R12 of the second surface 2 of the first lens 110 is 2.910 mm. Therefore, the following condition 4-3 is satisfied:

$$0.890 < sd12/R12 < 0.970 \quad (4\text{-}3)$$

In condition 4-3, the ratio of the effective radius sd12 to the radius of curvature R12 of the second surface 2 of the first lens 110 is set to be greater than 0.890, thereby expanding the HFOV, in particular, to 98° or greater; the ratio of the effective radius sd12 to the radius of curvature R12 of the second surface 2 of the first lens 110 is set to be less than 0.970, thereby preventing the angle defined between the peripheral part of the second surface 2 of the first lens 110 made of glass and the tangent line from being excessively small, and further making it possible to perform a polishing process on the second surface 2 of the first lens 110.

In addition, as is clear from Table 7, the radius of curvature R11 of the object side lens surface (that is, the first surface 1) of the first lens 110 is 11.850 mm, and the radius of curvature R12 of the image side lens surface (that is, the second surface 2) of the first lens 110 is 2.910 mm. Therefore, the following condition 4-4 is satisfied:

$$1.300 < (R11+R12)/(R11−R12) < 1.900 \quad (4\text{-}4)$$

Moreover, the following condition 4-5 is satisfied:

$$1.600 < (R11+R12)/(R11−R12) < 1.850 \quad (4\text{-}5)$$

In condition 4-4, (R11+R12)/(R11−R12) is set to be greater than 1.300, thereby preventing the radius of curvature R12 of the image side lens surface (that is, the second surface 2) of the first lens 110 from being excessively small, thus facilitating the molding of the second surface 2 of the first lens 110. In another respect, the radius of curvature R11 of the object side lens surface (that is, the first surface 1) of the first lens 110 is able to be prevented from being excessively large, thereby avoiding an excessively large diameter of the first lens 110, thus miniaturizing the wide-angle lens 1000. In addition, (R11+R12)/(R11−R12) is set to be less than 1.900, thereby ensuring sufficient refractive power of the first lens 110, thus facilitating the expansion of the maximum HFOV co of the first lens 110. Moreover, a sufficient thickness of the first lens 110 is able to be ensured, so as to prevent the first lens 110 from being damaged due to impact or the like.

In condition 4-5, (R11+R12)/(R11−R12) is further set to be greater than 1.600, thereby further preventing the radius of curvature R12 of the image side lens surface (that is, the second surface 2) of the first lens 110 from being excessively small, thus further facilitating the molding of the second surface 2 of the first lens 110. In another respect, the radius of curvature R11 of the object side lens surface (that is, the first surface 1) of the first lens 110 is able to be further prevented from being excessively large, thereby further avoiding an excessively large diameter of the first lens 110, thus further miniaturizing the wide-angle lens 1000. In addition, (R11+R12)/(R11−R12) is further set to be less than 1.850, thereby further ensuring sufficient refractive power of the first lens 110, thus further facilitating the expansion of the maximum HFOV co of the first lens 110. Moreover, a sufficient thickness of the first lens 110 is able to be further ensured, so as to further prevent the first lens 110 from being damaged due to impact or the like.

In addition, as is clear from Table 7, the thickness T1 of the first lens 110 is 1.800 mm (the thickness T1 of the first lens 110 is defined as a distance between the object side lens surface (that is, the first surface 1) of the first lens 110 and the image side lens surface (that is, the second surface 2) of the first lens 110 in the optical axis direction), the sag Sag12 of the image side lens surface (that is, the second surface 2) of the first lens 110 is 1.649 mm. Therefore, the following condition 4-6 is satisfied:

$$0.700 < T1/Sag12 < 1.100 \quad (4\text{-}6)$$

In condition 4-6, the ratio of the thickness T1 of the first lens 110 to the sag Sag12 of the image side lens surface (that is, the second surface 2) of the first lens 110 is set to be greater than 0.700, thereby ensuring a sufficient thickness of the first lens 110 to prevent the first lens 110 from being damaged due to impact or the like; the ratio of the thickness T1 of the first lens 110 to the sag Sag12 of the image side lens surface (that is, the second surface 2) of the first lens 110 is set to be less than 1.100, thereby avoiding an excessively large thickness of the first lens 110, thus making it possible to achieve desired negative refractive power.

In addition, in the wide-angle lens 1000 of this embodiment, the object-to-image distance d of the wide-angle lens 1000 is 13.404 mm, and the effective focal length f of the wide-angle lens 1000 as a whole is 1.011 mm. Therefore, the following condition 4-7 is satisfied:

$$11.000 < d/f < 15.000 \quad (4\text{-}7)$$

In condition 4-7, the ratio of the object-to-image distance d of the wide-angle lens 1000 to the effective focal length f of the wide-angle lens 1000 as a whole is set to be greater than 11.000, thereby enabling appropriate correction to be easily made for various aberrations, thus making it easy to achieve good optical characteristics; the ratio of the object-to-image distance d of the wide-angle lens 1000 to the effective focal length f of the wide-angle lens 1000 as a whole is set to be less than 15.000, thereby preventing the wide-angle lens 1000 from becoming excessively large while avoiding an excessively large overall length of the wide-angle lens 1000.

In summary, in this embodiment, by configuring the wide-angle lens 1000 as above, as shown in FIG. 14A to FIG. 16L, appropriate correction is enabled for various aberrations such as curvature of field, chromatic aberration of magnification, and coma. Moreover, the miniaturization is able to be achieved while the maximum HFOV co is expanded.

Figure 17:
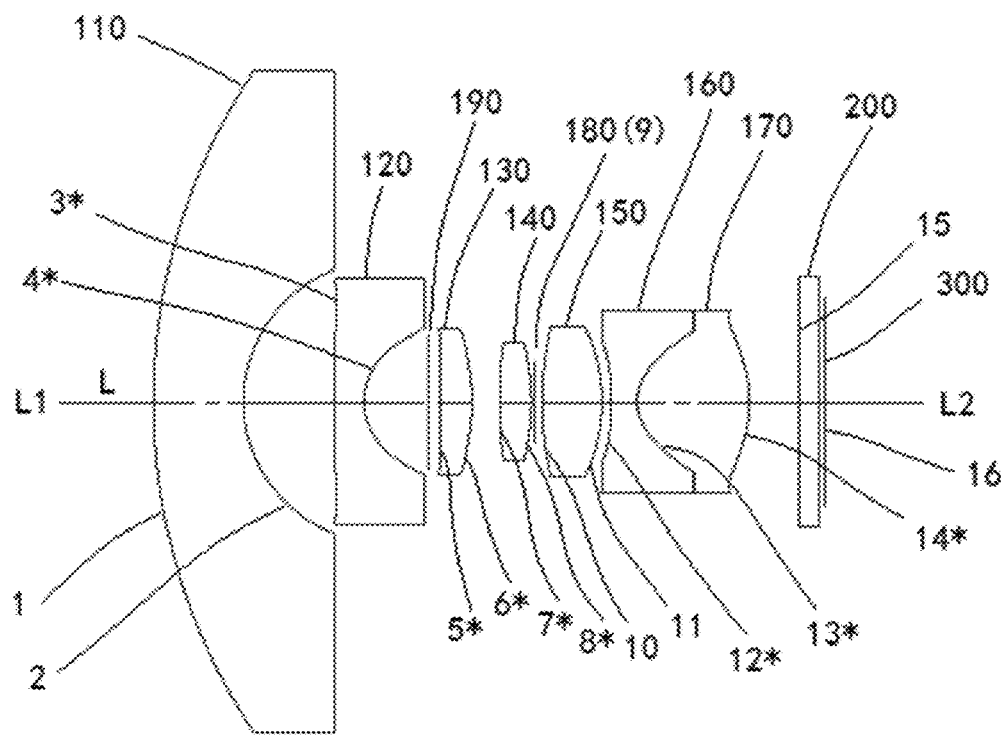
FIG. 17 illustrates a wide-angle lens according to Embodiment 5 of the disclosure.
Figure 18A:
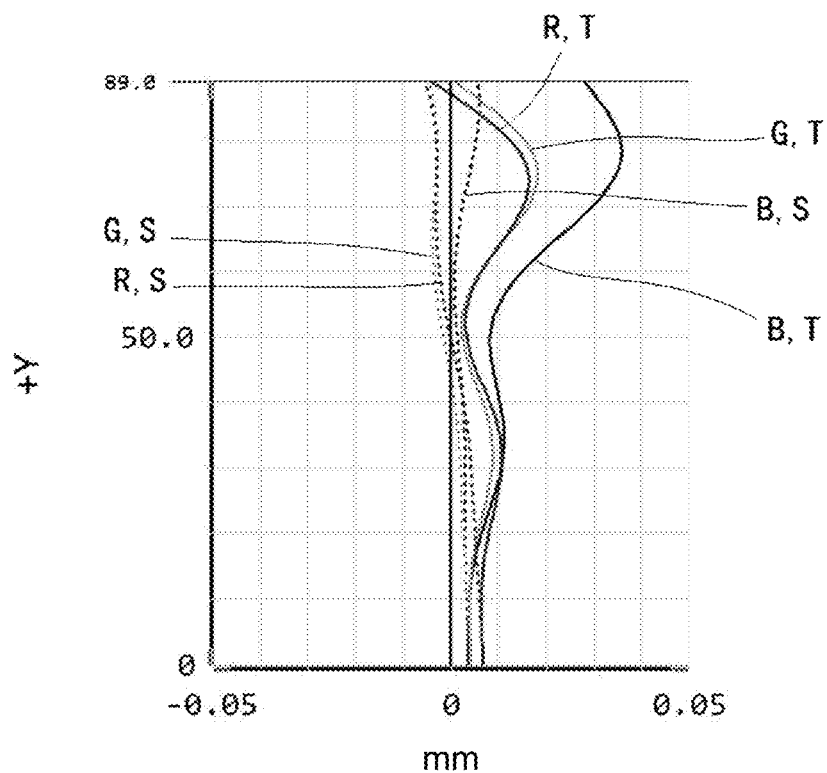
FIG. 18A illustrates curvature of field and distortion of the wide-angle lens according to Embodiment 5 of the disclosure.
Figure 18B:
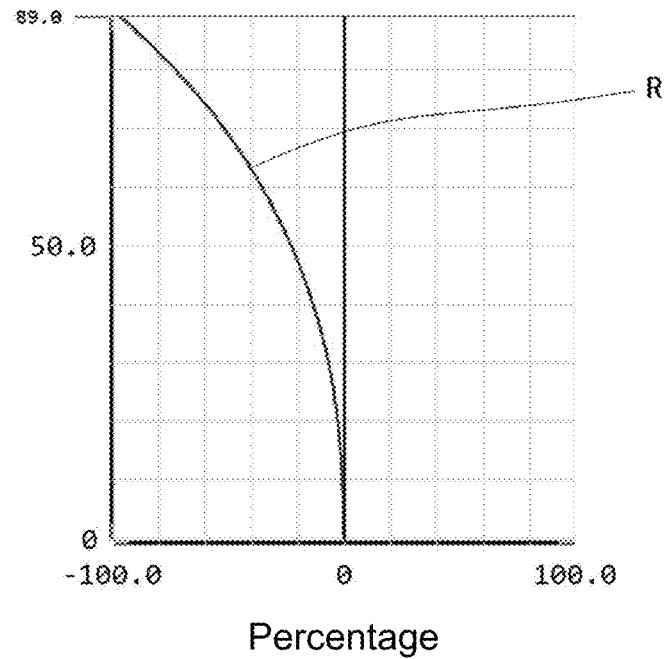
FIG. 18B illustrates curvature of field and distortion of the wide-angle lens according to Embodiment 5 of the disclo
Figure 19A:
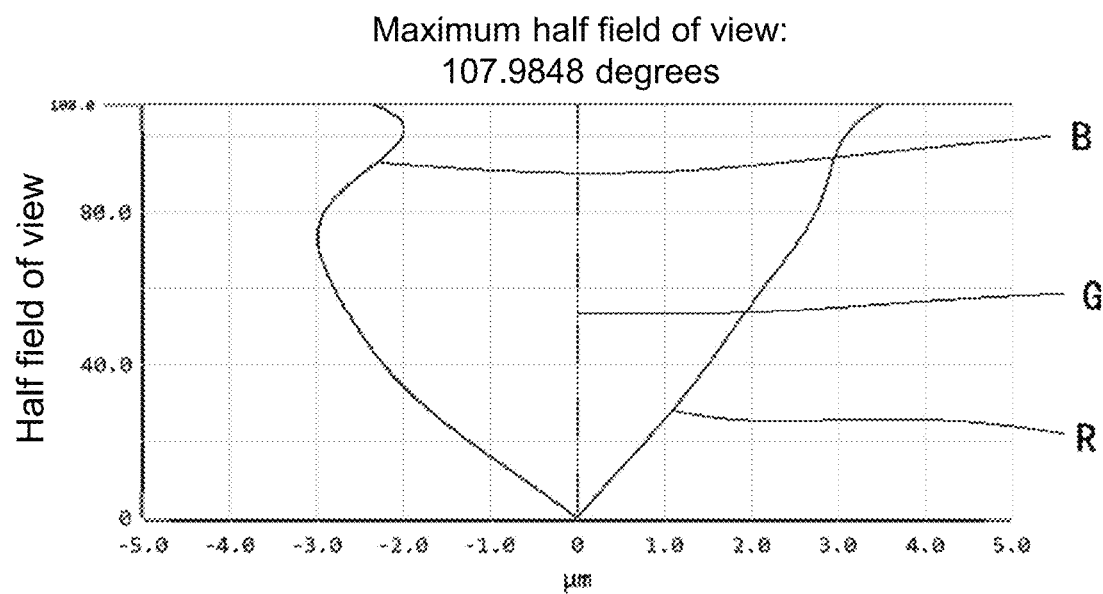
- FIG. 19A illustrates lateral chromatic aberration (transverse chromatic aberration) of the wide-angle lens according to Embodiment 5 of the disclosure.
Figure 19B:
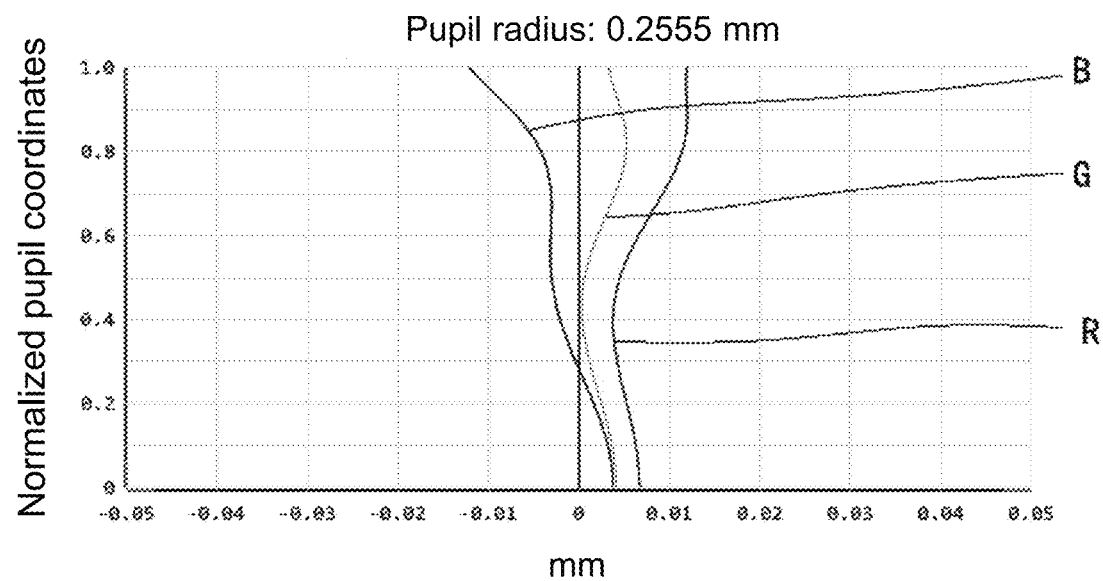
FIG. 19B illustrates spherical aberration (longitudinal aberration) of the wide-angle lens according to Embodiment 5 of the disclosure.
Figure 20A:
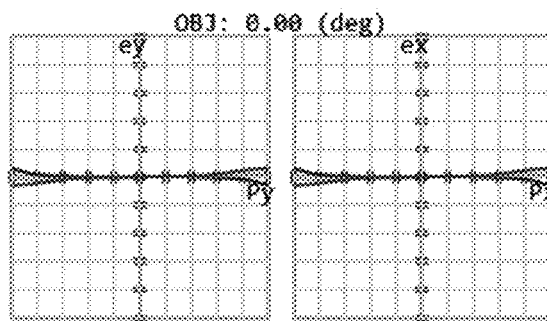
FIG. 20A to FIG. 20L illustrate transverse aberration of the wide-angle lens according to Embodiment 5 of the disclosure.
Figure 20B:
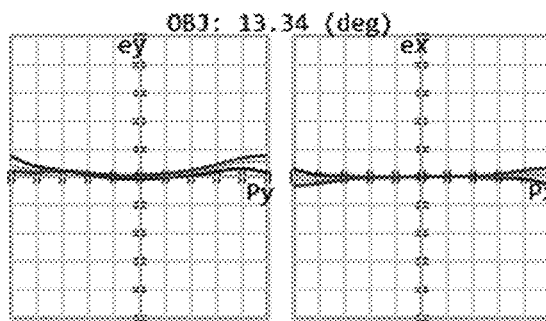
Figure 20C:
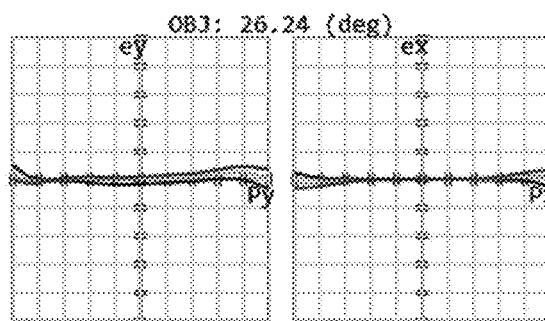
Figure 20D:
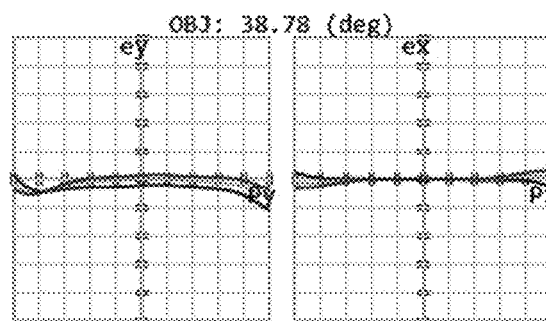
Figure 20E:
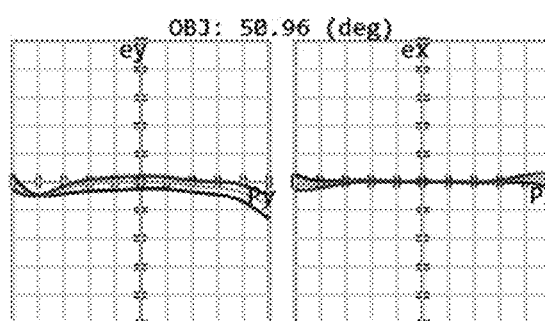
Figure 20F:
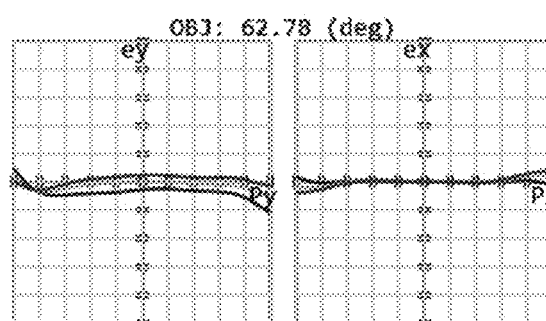
Figure 20G:
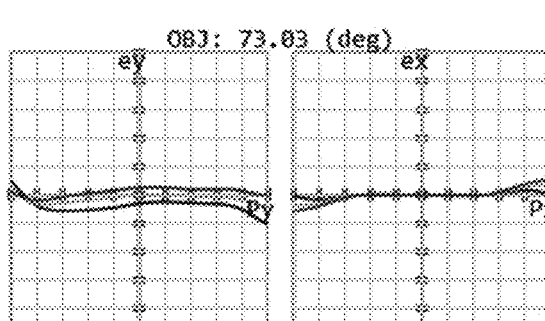
Figure 20H:
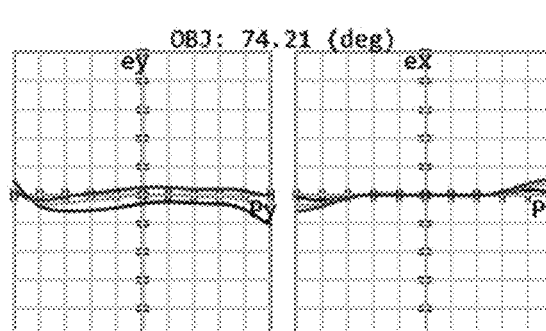
Figure 20I:
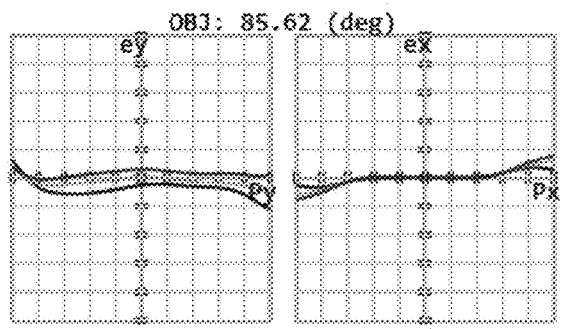
Figure 20J:
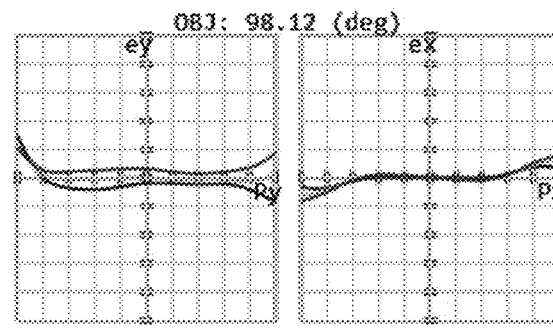
Figure 20K:
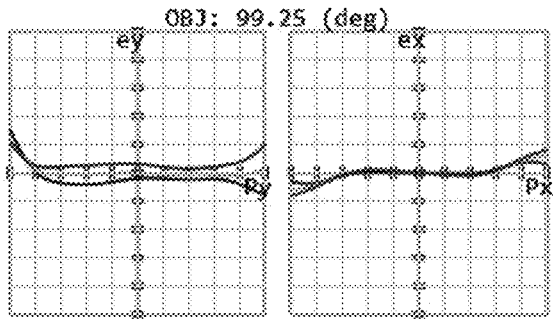
Figure 20L:
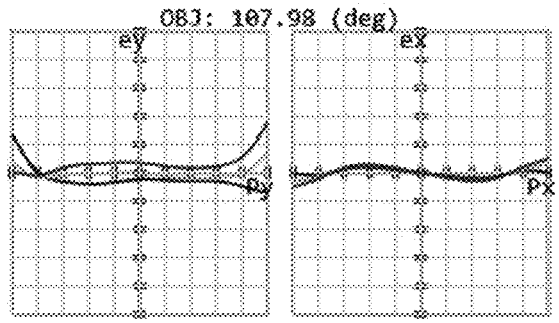

FIG. 17 illustrates a wide-angle lens according to Embodiment 5 of the disclosure. FIG. 18A illustrates curvature of field and distortion of the wide-angle lens according to Embodiment 5 of the disclosure. FIG. 18B illustrates curvature of field and distortion of the wide-angle lens according to Embodiment 5 of the disclosure. FIG. 19A illustrates lateral chromatic aberration (transverse chromatic aberration) of the wide-angle lens according to Embodiment 5 of the disclosure. FIG. 19B illustrates spherical aberration (longitudinal aberration) of the wide-angle lens according to Embodiment 5 of the disclosure. FIG. 20A to FIG. 20L illustrate transverse aberration of the wide-angle lens according to Embodiment 5 of the disclosure. Here, in FIG. 18A, FIG. 18B, FIG. 19A, FIG. 19B, and FIG. 20A to FIG. 20L, a correlation curve of red light R (having a wavelength of 656 nm) is denoted by R, a correlation curve of green light G (having a wavelength of 588 nm) is denoted by G, and a correlation curve of blue light B (having a wavelength of 486 nm) is denoted by B. T indicates being related to the meridian plane, and S indicates being related to the sagittal plane. Moreover, in FIG. 20A to FIG. 20L, the maximum scale of the longitudinal axis is ±50.000 µm.

As shown in FIG. 17, the wide-angle lens 1000 includes, sequentially arranged from the object side (L1 side), the first lens 110 (that is, the first lens 110 is located closest to the object side), the second lens 120 (that is, the second lens 120 is located on the image side of and adjacent to the first lens 110), the third lens 130, the fourth lens 140, the diaphragm 180, the fifth lens 150, the sixth lens 160 and the seventh lens 170. Among them, the sixth lens 160 and the seventh lens 170 are bonded together by an adhesive to constitute a cemented lens.

Here, the wide-angle lens 1000 in this embodiment has the same basic structure (that is, whether each of the first lens 110, the second lens 120, the third lens 130, the fourth lens 140, the fifth lens 150, the sixth lens 160 and the seventh lens 170 has positive refractive power or negative refractive power, whether each of these lenses is a glass lens or plastic lens, whether the object side surface and the image side surface of each of these lenses are convex surfaces or concave surfaces, and whether the object side surface and the image side surface are spherical surfaces or aspheric surfaces) as that of the wide-angle lens of Embodiment 1, and thus the details thereof will be omitted.

As shown in FIG. 17, similarly to Embodiment 1, the light-shielding sheet 190 is provided between the second lens 120 and the third lens 130, the filter 200 is arranged on the image side of the seventh lens 170, and the imaging element 300 is arranged on the image side of the filter 200.

In this embodiment, in the lens system as a whole, the effective focal length f is 1.021 mm, the object-to-image distance (total track) d is 13.398 mm, the F value (image space F/#) is 2, the maximum HFOV (maximum half field angle) is 108 degrees, and the entrance pupil diameter HEP is 0.511 mm.

Table 9 shows physical properties of each surface of the wide-angle lens 1000 of this embodiment. Table 10-1 and Table 10-2 show aspheric coefficients of each surface of the wide-angle lens 1000 of this embodiment.

TABLE 9

| Surface | Radius of curvature | Thickness | $N_d$ | $v_d$ | Effective focal length | Effective radius | Sag |
|---|---|---|---|---|---|---|---|
| 1 | 11.850 | 1.800 | 1.871 | 40.73 | −1.258 | 6.600 | 2.008 |
| 2 | 2.810 | 1.790 | | | | 2.623 | 1.802 |
| 3* | 21.109 | 0.610 | 1.544 | 56.4 | | 2.450 | 0.024 |
| 4* | 1.226 | 1.511 | | | | 1.460 | 1.206 |
| 5* | −41.052 | 0.645 | 1.544 | 56.4 | 3.259 | 1.450 | −0.041 |
| 6* | −3.608 | 0.559 | | | | 1.410 | −0.234 |
| 7* | 35.384 | 0.625 | 1.635 | 23.9 | | 1.170 | 0.082 |
| 8* | −3.636 | 0.050 | | | | 1.100 | −0.133 |
| 9 (diaphragm) | Infinite | 0.157 | | | | | |
| 10 | 6.330 | 1.200 | 1.697 | 55.46 | | 1.500 | 0.180 |
| 11 | −3.350 | 0.180 | | | | 1.500 | −0.355 |
| 12* | −5.730 | 0.510 | 1.635 | 23.9 | 9.670 | 1.250 | −0.186 |
| 13* | 0.910 | 2.250 | 1.544 | 56.4 | | 1.410 | 1.136 |
| 14* | −2.306 | 0.986 | | | | 1.820 | −0.375 |
| 15 | Infinite | 0.400 | | | | | |
| 16 | Infinite | 0.125 | | | | | |

In Table 9 above, the radius of curvature, thickness, effective focal length, effective radius, and sag are in units of mm. $N_d$ represents a refractive index for a ray of 587.56 nm. $V_d$ represents the Abbe number. * represents an aspheric surface.

TABLE 10-1

| Surface | c (1/radius of curvature) | K | A4 | A6 |
|---|---|---|---|---|
| 3 | 4.73738E−02 | 0.00000E+00 | −5.16461E−03 | 2.97096E−03 |
| 4 | 8.15727E−01 | −3.85594E+00 | 2.02517E−01 | −7.83664E−02 |
| 5 | −2.43593E−02 | 0.00000E+00 | 7.18080E−04 | 1.54312E−02 |
| 6 | −2.77185E−01 | 0.00000E+00 | 1.27000E−02 | 1.84355E−02 |
| 7 | 2.82614E−02 | 0.00000E+00 | 1.29430E−02 | 2.83444E−02 |
| 8 | −2.75058E−01 | 0.00000E+00 | 5.20665E−03 | 2.87756E−02 |
| 12 | −1.74511E−01 | 0.00000E+00 | −2.22912E−02 | −2.24026E−04 |
| 13 | 1.09890E+00 | −1.00000E+00 | 5.45916E−02 | −8.55229E−02 |
| 14 | −4.33708E−01 | 0.00000E+00 | 5.56964E−02 | −4.87201E−02 |

TABLE 10-2

| Surface | A8 | A10 | A12 | A14 | A16 |
|---|---|---|---|---|---|
| 3 | −1.12779E−03 | 1.69605E−04 | −9.24708E−06 | 0.00000E+00 | 0.00000E+00 |
| 4 | 5.54759E−02 | −1.43828E−02 | −3.40212E−05 | 0.00000E+00 | 0.00000E+00 |
| 5 | 4.27755E−03 | −5.97392E−03 | 0.00000E+00 | 0.00000E+00 | 0.00000E+00 |
| 6 | 1.27283E−03 | −1.01399E−02 | 2.46941E−03 | 0.00000E+00 | 0.00000E+00 |
| 7 | −2.19533E−02 | 8.91100E−03 | 0.00000E+00 | 0.00000E+00 | 0.00000E+00 |
| 8 | −2.59952E−02 | 1.31396E−02 | 0.00000E+00 | 0.00000E+00 | 0.00000E+00 |
| 12 | −5.53989E−03 | 2.10400E−02 | −2.03506E−02 | 6.17103E−03 | 0.00000E+00 |
| 13 | 7.91865E−02 | −3.44941E−02 | 3.84031E−03 | 7.90842E−04 | 0.00000E+00 |
| 14 | 4.18221E−02 | −1.79457E−02 | 3.88481E−03 | −3.05248E−04 | 0.00000E+00 |

In Table 10-1 and Table 10-2 above, in a case where a lens surface is a convex surface protruding toward the object side or a concave surface recessed toward the object side, its radius of curvature is set to a positive value; in a case where a lens surface is a convex surface protruding toward the image side or a concave surface recessed toward the image side, its radius of curvature is set to a negative value.

In addition, Table 10-1 and Table 10-2 above show the aspheric coefficients A4, A6, A8, A10, A12, A14 and A16 of each of the aspheric surfaces, which satisfy expression 1 above.

Here, as described above, the maximum HFOV ω of the wide-angle lens 1000 as a whole is 108 degrees, that is, the following condition 5-1 is satisfied:

$$98° < \omega < 120° \qquad (5\text{-}1)$$

In condition 5-1, the maximum HFOV ω is set to be greater than 98°, thereby expanding the maximum HFOV ω; the maximum HFOV ω is set to be less than 120°, thereby avoiding a situation that a peripheral portion of an image becomes dark due to a light quantity ratio at the periphery of the wide-angle lens 1000 being smaller than a light quantity ratio at the center of the wide-angle lens 1000. Further, the wide-angle lens 1000 is able to be miniaturized as a whole while the maximum HFOV ω of the wide-angle lens 1000 is expanded.

In addition, in the wide-angle lens 1000 as a whole, the effective focal length f is 1.021 mm and the entrance pupil diameter HEP is 0.511 mm. Therefore, the following condition 5-2 is satisfied:

$$f/HEP<2.3 \quad (5\text{-}2)$$

In condition 5-2, the ratio of the effective focal length f to the entrance pupil diameter HEP of the wide-angle lens 1000 as a whole is set as f/HEP<2.3, thereby ensuring the brightness of the wide-angle lens 1000, and enabling use of the wide-angle lens 1000 in a high pixel imaging element.

In addition, as is clear from Table 9, the effective radius sd12 of the image side lens surface (that is, the second surface 2) of the first lens 110 is 2.623 mm, and the radius of curvature R12 of the second surface 2 of the first lens 110 is 2.810 mm. Therefore, the following condition 5-3 is satisfied:

$$0.890<sd12/R12<0.970 \quad (5\text{-}3)$$

In condition 5-3, the ratio of the effective radius sd12 to the radius of curvature R12 of the second surface 2 of the first lens 110 is set to be greater than 0.890, thereby expanding the HFOV, in particular, to 98° or greater; the ratio of the effective radius sd12 to the radius of curvature R12 of the second surface 2 of the first lens 110 is set to be less than 0.970, thereby preventing the angle defined between the peripheral part of the second surface 2 of the first lens 110 made of glass and the tangent line from being excessively small, and further making it possible to perform a polishing process on the second surface 2 of the first lens 110.

In addition, as is clear from Table 9, the radius of curvature R11 of the object side lens surface (that is, the first surface 1) of the first lens 110 is 11.850 mm, and the radius of curvature R12 of the image side lens surface (that is, the second surface 2) of the first lens 110 is 2.810 mm. Therefore, the following condition 5-4 is satisfied:

$$1.300<(R11+R12)/(R11-R12)<1.900 \quad (5\text{-}4)$$

Moreover, the following condition 5-5 is satisfied:

$$1.600<(R11+R12)/(R11-R12)<1.850 \quad (5\text{-}5)$$

In condition 5-4, (R11+R12)/(R11−R12) is set to be greater than 1.300, thereby preventing the radius of curvature R12 of the image side lens surface (that is, the second surface 2) of the first lens 110 from being excessively small, thus facilitating the molding of the second surface 2 of the first lens 110. In another respect, the radius of curvature R11 of the object side lens surface (that is, the first surface 1) of the first lens 110 is able to be prevented from being excessively large, thereby avoiding an excessively large diameter of the first lens 110, thus miniaturizing the wide-angle lens 1000. In addition, (R11+R12)/(R11−R12) is set to be less than 1.900, thereby ensuring sufficient refractive power of the first lens 110, thus facilitating the expansion of the maximum HFOV ω of the first lens 110. Moreover, a sufficient thickness of the first lens 110 is able to be ensured, so as to prevent the first lens 110 from being damaged due to impact or the like.

In condition 5-5, (R11+R12)/(R11−R12) is further set to be greater than 1.600, thereby further preventing the radius of curvature R12 of the image side lens surface (that is, the second surface 2) of the first lens 110 from being excessively small, thus further facilitating the molding of the second surface 2 of the first lens 110. In another respect, the radius of curvature R11 of the object side lens surface (that is, the first surface 1) of the first lens 110 is able to be further prevented from being excessively large, thereby further avoiding an excessively large diameter of the first lens 110, thus further miniaturizing the wide-angle lens 1000. In addition, (R11+R12)/(R11−R12) is further set to be less than 1.850, thereby further ensuring sufficient refractive power of the first lens 110, thus further facilitating the expansion of the maximum HFOV ω of the first lens 110. Moreover, a sufficient thickness of the first lens 110 is able to be further ensured, so as to further prevent the first lens 110 from being damaged due to impact or the like.

In addition, as is clear from Table 9, the thickness T1 of the first lens 110 is 1.800 mm (the thickness T1 of the first lens 110 is defined as a distance between the object side lens surface (that is, the first surface 1) of the first lens 110 and the image side lens surface (that is, the second surface 2) of the first lens 110 in the optical axis direction), the sag Sag12 of the image side lens surface (that is, the second surface 2) of the first lens 110 is 1.802 mm. Therefore, the following condition 5-6 is satisfied:

$$0.700<T1/Sag12<1.100 \quad (5\text{-}6)$$

In condition 5-6, the ratio of the thickness T1 of the first lens 110 to the sag Sag12 of the image side lens surface (that is, the second surface 2) of the first lens 110 is set to be greater than 0.700, thereby ensuring a sufficient thickness of the first lens 110 to prevent the first lens 110 from being damaged due to impact or the like; the ratio of the thickness T1 of the first lens 110 to the sag Sag12 of the image side lens surface (that is, the second surface 2) of the first lens 110 is set to be less than 1.100, thereby avoiding an excessively large thickness of the first lens 110, thus making it possible to achieve desired negative refractive power.

In addition, in the wide-angle lens 1000 of this embodiment, the object-to-image distance d of the wide-angle lens 1000 is 13.398 mm, and the effective focal length f of the wide-angle lens 1000 as a whole is 1.021 mm. Therefore, the following condition 5-7 is satisfied:

$$11.000<d/f<15.000 \quad (5\text{-}7)$$

In condition 5-7, the ratio of the object-to-image distance d of the wide-angle lens 1000 to the effective focal length f of the wide-angle lens 1000 as a whole is set to be greater than 11.000, thereby enabling appropriate correction to be easily made for various aberrations, thus making it easy to achieve good optical characteristics; the ratio of the object-to-image distance d of the wide-angle lens 1000 to the effective focal length f of the wide-angle lens 1000 as a whole is set to be less than 15.000, thereby preventing the wide-angle lens 1000 from becoming excessively large while avoiding an excessively large overall length of the wide-angle lens 1000.

In summary, in this embodiment, by configuring the wide-angle lens 1000 as above, as shown in FIG. 18A to FIG. 20L, appropriate correction is enabled for various aberrations such as curvature of field, chromatic aberration of magnification, and coma. Moreover, the miniaturization is able to be achieved while the maximum HFOV ω is expanded.

Figure 21:
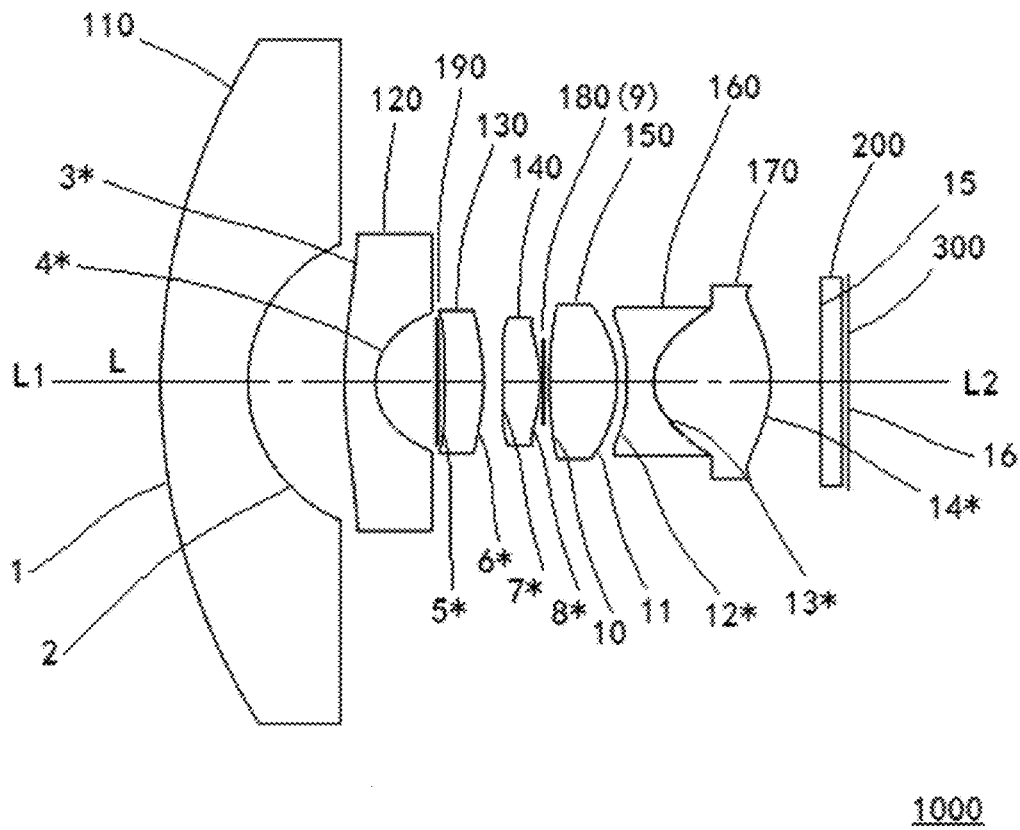
FIG. 21 illustrates a wide-angle lens according to Embodiment 6 of the disclosure.
Figure 22A:
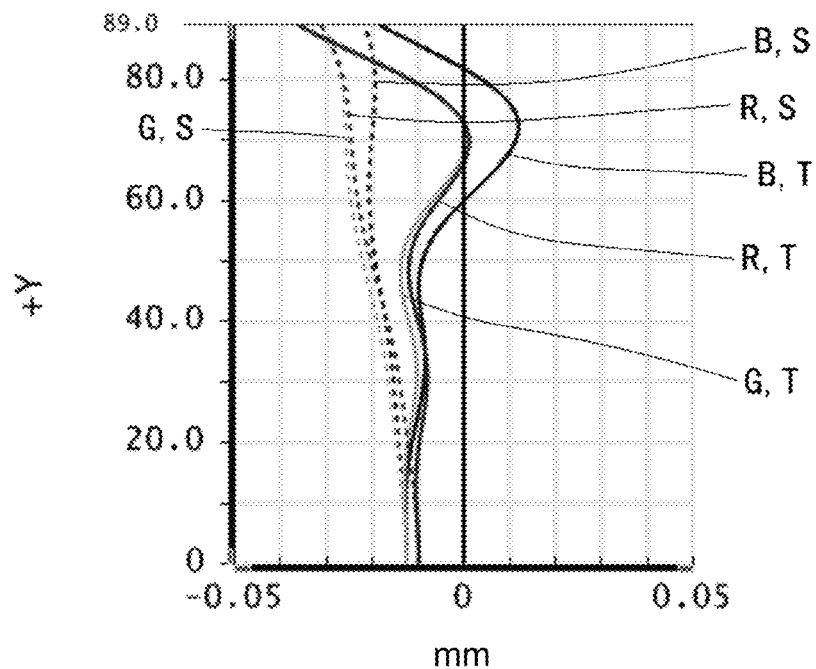
FIG. 22A illustrates curvature of field and distortion of the wide-angle lens according to Embodiment 6 of the disclosure.
Figure 22B:
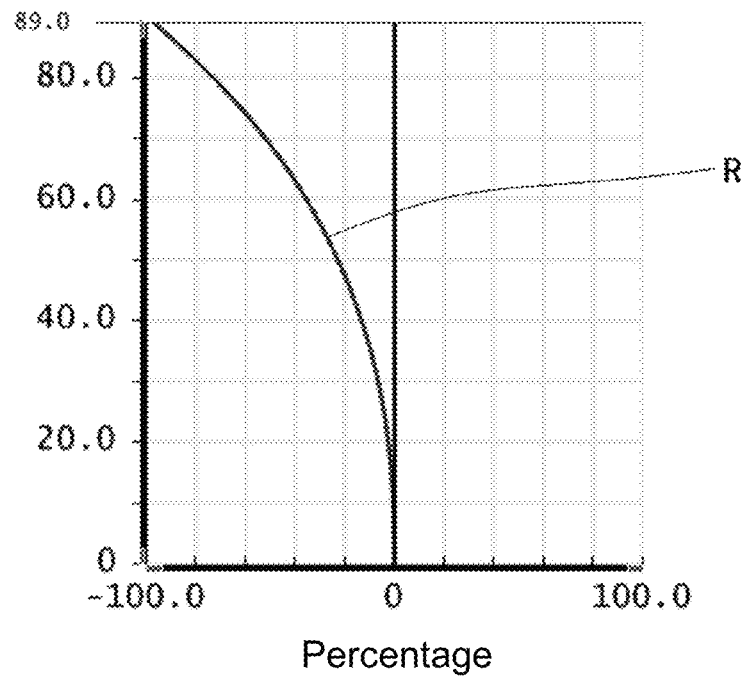
FIG. 22B illustrates curvature of field and distortion of the wide-angle lens according to Embodiment 6 of the disclosure.
Figure 23A:
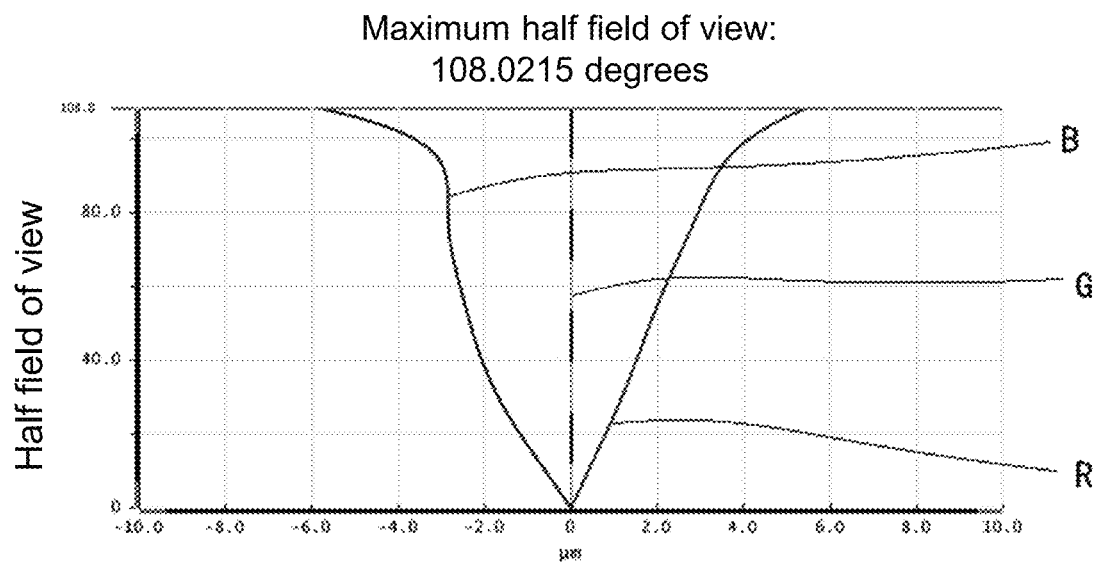
FIG. 23A illustrates lateral chromatic aberration (transverse chromatic aberration) of the wide-angle lens according to Embodiment 6 of the disclosure.
Figure 23B:
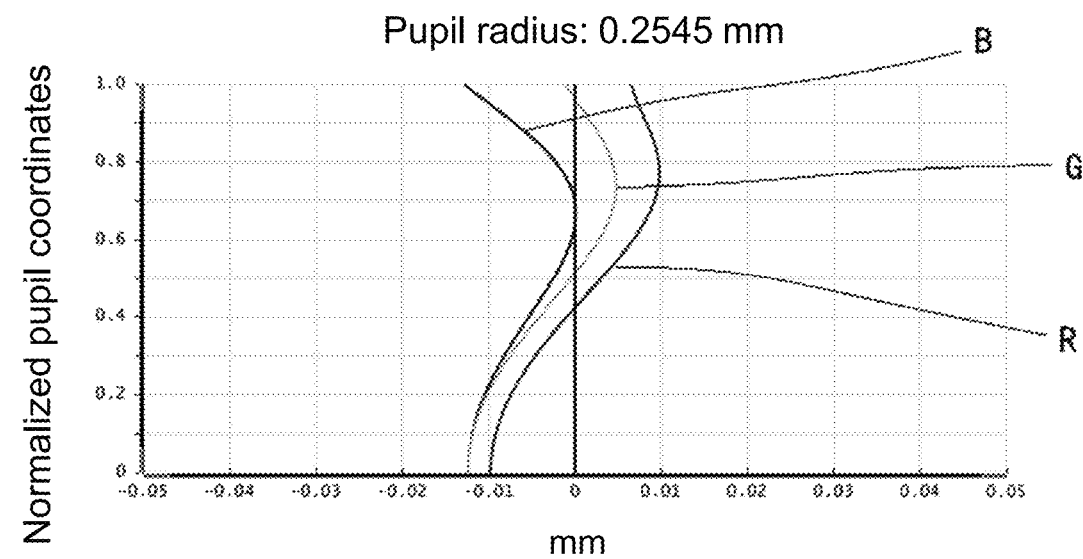
FIG. 23B illustrates spherical aberration (longitudinal aberration) of the wide-angle lens according to Embodiment 6 of the disclosure.
Figure 24A:
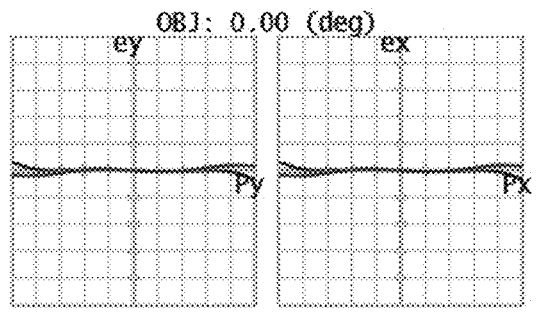
FIG. 24A to FIG. 24L illustrate transverse aberration of the wide-angle lens according to Embodiment 6 of the disclosure.
Figure 24B:
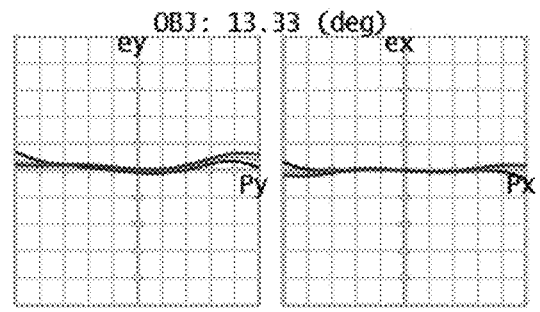
Figure 24C:
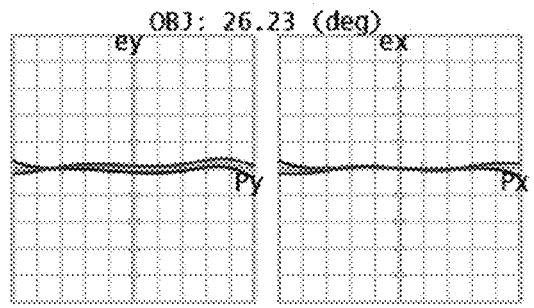
Figure 24D:
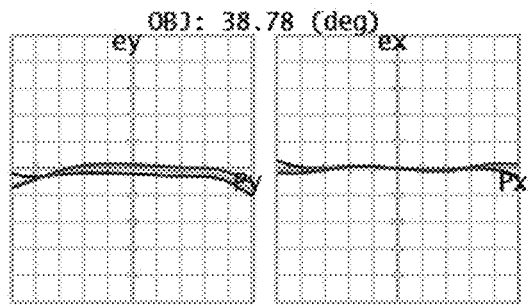
Figure 24E:
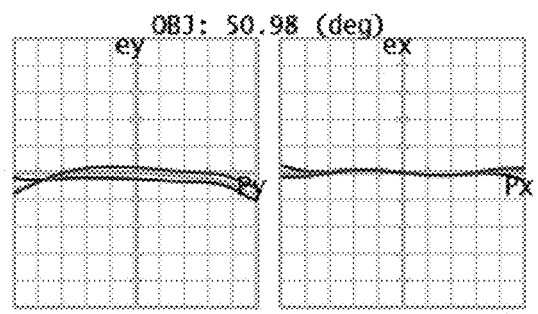
Figure 24F:
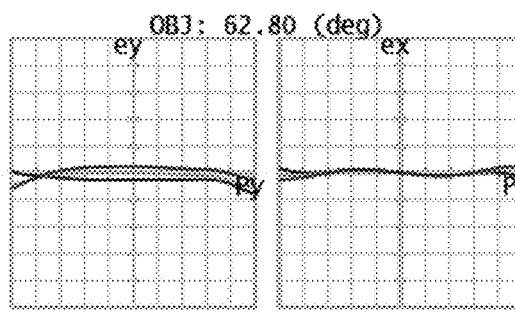
Figure 24G:
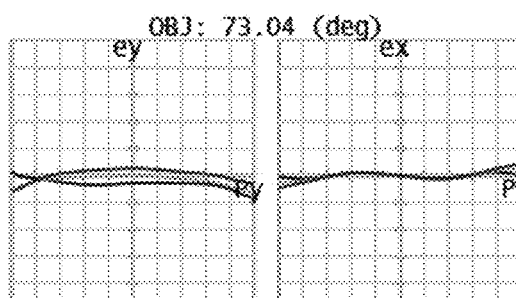
Figure 24H:
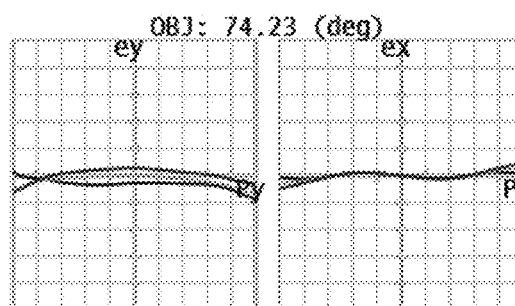
Figure 24I:
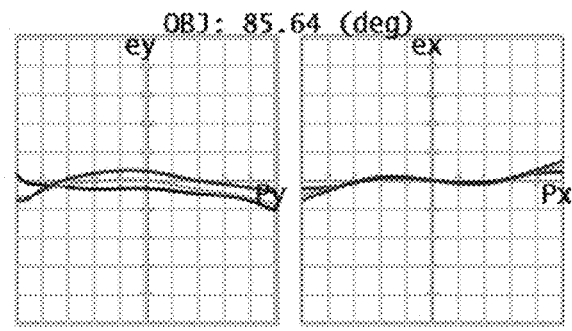
Figure 24J:
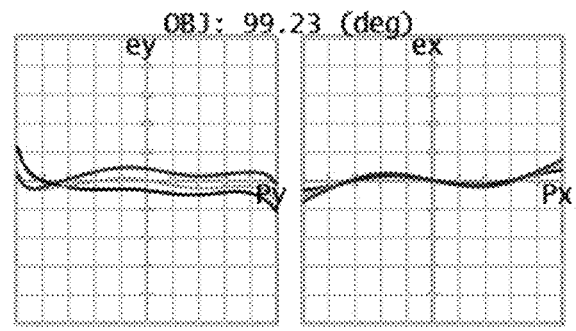
Figure 24K:
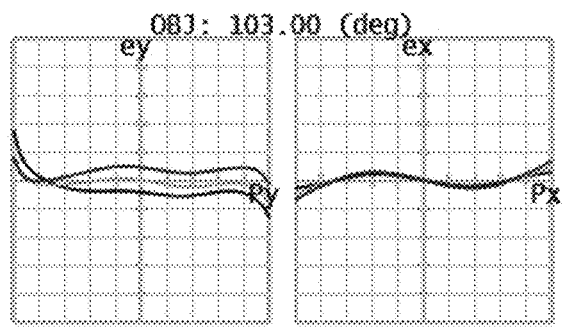
Figure 24L:
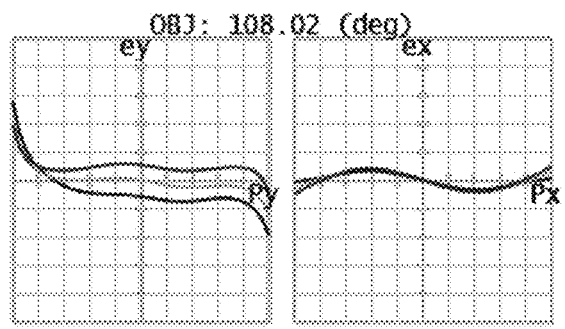

FIG. 21 illustrates a wide-angle lens according to Embodiment 6 of the disclosure. FIG. 22A illustrates curvature of field and distortion of the wide-angle lens according to Embodiment 6 of the disclosure. FIG. 22B illustrates curvature of field and distortion of the wide-angle lens according to Embodiment 6 of the disclosure. FIG. 23A illustrates lateral chromatic aberration (transverse chromatic aberration) of the wide-angle lens according to Embodiment 6 of the disclosure. FIG. 23B illustrates spherical aberration (longitudinal aberration) of the wide-angle lens according to Embodiment 6 of the disclosure. FIG. 24A to FIG. 24L illustrate transverse aberration of the wide-angle lens according to Embodiment 6 of the disclosure. Here, in FIG. 22A, FIG. 22B, FIG. 23A, FIG. 23B, and FIG. 24A to FIG. 24L, a correlation curve of red light R (having a wavelength of 656 nm) is denoted by R, a correlation curve of green light G (having a wavelength of 588 nm) is denoted by G, and a correlation curve of blue light B (having a wavelength of 486 nm) is denoted by B. T indicates being related to the meridian plane, and S indicates being related to the sagittal plane. Moreover, in FIG. 24A to FIG. 24L, the maximum scale of the longitudinal axis is ±50.000 μm.

As shown in FIG. 21, the wide-angle lens 1000 includes, sequentially arranged from the object side (L1 side), the first lens 110 (that is, the first lens 110 is located closest to the object side), the second lens 120 (that is, the second lens 120 is located on the image side of and adjacent to the first lens 110), the third lens 130, the fourth lens 140, the diaphragm 180, the fifth lens 150, the sixth lens 160 and the seventh lens 170. Among them, the sixth lens 160 and the seventh lens 170 are bonded together by an adhesive to constitute a cemented lens.

Here, the wide-angle lens 1000 in this embodiment has the same basic structure (that is, whether each of the first lens 110, the second lens 120, the third lens 130, the fourth lens 140, the fifth lens 150, the sixth lens 160 and the seventh lens 170 has positive refractive power or negative refractive power, whether each of these lenses is a glass lens or plastic lens, whether the object side surface and the image side surface of each of these lenses are convex surfaces or concave surfaces, and whether the object side surface and the image side surface are spherical surfaces or aspheric surfaces) as that of the wide-angle lens of Embodiment 1, and thus the details thereof will be omitted.

As shown in FIG. 21, similarly to Embodiment 1, the light-shielding sheet 190 is provided between the second lens 120 and the third lens 130, the filter 200 is arranged on the image side of the seventh lens 170, and the imaging element 300 is arranged on the image side of the filter 200.

In this embodiment, in the lens system as a whole, the effective focal length f is 1.018 mm, the object-to-image distance (total track) d is 13.383 mm, the F value (image space F/#) is 2, the maximum HFOV (maximum half field angle) is 108 degrees, and the entrance pupil diameter HEP is 0.509 mm.

Table 11 shows physical properties of each surface of the wide-angle lens 1000 of this embodiment. Table 12-1 and Table 12-2 show aspheric coefficients of each surface of the wide-angle lens 1000 of this embodiment.

TABLE 11

| Surface | Radius of curvature | Thickness | $N_d$ | $v_d$ | Effective focal length | Effective radius | Sag |
|---|---|---|---|---|---|---|---|
| 1 | 12.500 | 1.700 | 1.871 | 40.73 | −1.310 | 6.660 | 1.922 |
| 2 | 2.910 | 1.880 | 1.000 | | | 2.691 | 1.803 |
| 3* | 9.149 | 0.600 | 1.544 | 56.4 | | 2.900 | 0.244 |
| 4* | 1.191 | 1.354 | 1.000 | | | 1.350 | 1.100 |
| 5* | −14.140 | 0.750 | 1.544 | 56.4 | 3.338 | 1.350 | −0.120 |
| 6* | −3.818 | 0.381 | 1.000 | | | 1.391 | −0.200 |
| 7* | −22.250 | 0.722 | 1.635 | 23.9 | | 1.229 | 0.100 |
| 8* | −2.713 | 0.050 | 1.000 | | | 1.235 | −0.150 |
| 9 (diaphragm) | Infinite | 0.130 | 1.000 | | | | |
| 10 | 7.740 | 1.320 | 1.697 | 55.46 | | 1.500 | 0.147 |
| 11 | −2.450 | 0.199 | 1.000 | | | 1.500 | −0.513 |
| 12* | −3.600 | 0.510 | 1.635 | 23.9 | 10.463 | 1.250 | −0.259 |
| 13* | 0.963 | 2.282 | 1.544 | 56.4 | | 1.441 | 1.123 |
| 14* | −2.141 | 0.980 | 1.000 | | | 1.883 | −0.360 |
| 15 | Infinite | 0.400 | | | | | |
| 16 | Infinite | 0.125 | | | | | |

In Table 11 above, the radius of curvature, thickness, effective focal length, effective radius, and sag are in units of mm. $N_d$ represents a refractive index for a ray of 587.56 nm. $V_d$ represents the Abbe number. * represents an aspheric surface.

TABLE 12-1

| Surface | c (1/radius of curvature) | K | A4 | A6 |
|---|---|---|---|---|
| 3 | 1.09306E−01 | 0.00000E+00 | −4.51092E−03 | 2.92728E−03 |
| 4 | 8.39842E−01 | −3.71100E+00 | 2.15910E−01 | −7.58275E−02 |
| 5 | −7.07214E−02 | 0.00000E+00 | −5.47555E−03 | 1.09203E−02 |
| 6 | −2.61938E−01 | 0.00000E+00 | 1.43606E−02 | 2.26240E−02 |
| 7 | −4.49438E−02 | 0.00000E+00 | 1.40010E−02 | 4.01310E−02 |
| 8 | −3.68664E−01 | 0.00000E+00 | 1.66786E−02 | 2.21644E−02 |
| 12 | −2.77778E−01 | 0.00000E+00 | −2.23667E−02 | 7.48072E−03 |
| 13 | 1.03842E+00 | −1.00000E+00 | 4.72309E−02 | −6.05266E−02 |
| 14 | −4.67071E−01 | 0.00000E+00 | 5.78738E−02 | −4.73130E−02 |

TABLE 12-2

| Surface | A8 | A10 | A12 | A14 | A16 |
|---|---|---|---|---|---|
| 3 | −1.14938E−03 | 1.63223E−04 | −7.82147E−06 | 0.00000E+00 | 0.00000E+00 |
| 4 | 5.61909E−02 | −1.28652E−02 | −3.10366E−04 | 0.00000E+00 | 0.00000E+00 |
| 5 | 2.71037E−03 | −6.63668E−03 | 0.00000E+00 | 0.00000E+00 | 0.00000E+00 |
| 6 | −3.16016E−03 | −9.85165E−03 | 2.97746E−03 | 0.00000E+00 | 0.00000E+00 |
| 7 | −1.96461E−02 | 8.38631E−03 | 0.00000E+00 | 0.00000E+00 | 0.00000E+00 |
| 8 | −1.03312E−02 | 1.03923E−02 | 0.00000E+00 | 0.00000E+00 | 0.00000E+00 |
| 12 | −8.59213E−03 | 1.81642E−02 | −1.67818E−02 | 5.17215E−03 | 0.00000E+00 |
| 13 | 5.15225E−02 | −2.02257E−02 | 1.88707E−03 | 3.30690E−04 | 0.00000E+00 |
| 14 | 4.12895E−02 | −1.76625E−02 | 3.69776E−03 | −2.59955E−04 | 0.00000E+00 |

In Table 12-1 and Table 12-2 above, in a case where a lens surface is a convex surface protruding toward the object side or a concave surface recessed toward the object side, its radius of curvature is set to a positive value; in a case where a lens surface is a convex surface protruding toward the image side or a concave surface recessed toward the image side, its radius of curvature is set to a negative value.

In addition, Table 12-1 and Table 12-2 above show the aspheric coefficients A4, A6, A8, A10, A12, A14 and A16 of each of the aspheric surfaces, which satisfy expression 1 above.

Here, as described above, the maximum HFOV ω of the wide-angle lens 1000 as a whole is 108 degrees, that is, the following condition 6-1 is satisfied:

$$98° < \omega < 120° \quad (6\text{-}1)$$

In condition 6-1, the maximum HFOV ω is set to be greater than 98°, thereby expanding the maximum HFOV ω; the maximum HFOV ω is set to be less than 120°, thereby avoiding a situation that a peripheral portion of an image becomes dark due to a light quantity ratio at the periphery of the wide-angle lens 1000 being smaller than a light quantity ratio at the center of the wide-angle lens 1000. Further, the wide-angle lens 1000 is able to be miniaturized as a whole while the maximum HFOV ω of the wide-angle lens 1000 is expanded.

In addition, in the wide-angle lens 1000 as a whole, the effective focal length f is 1.018 mm and the entrance pupil diameter HEP is 0.509 mm. Therefore, the following condition 6-2 is satisfied:

$$f/HEP < 2.3 \quad (6\text{-}2)$$

In condition 6-2, the ratio of the effective focal length f to the entrance pupil diameter HEP of the wide-angle lens 1000 as a whole is set as f/HEP<2.3, thereby ensuring the brightness of the wide-angle lens 1000, and enabling use of the wide-angle lens 1000 in a high pixel imaging element.

In addition, as is clear from Table 11, the effective radius sd12 of the image side lens surface (that is, the second surface 2) of the first lens 110 is 2.691 mm, and the radius of curvature R12 of the second surface 2 of the first lens 110 is 2.910 mm. Therefore, the following condition 6-3 is satisfied:

$$0.890 < sd12/R12 < 0.970 \quad (6\text{-}3)$$

In condition 6-3, the ratio of the effective radius sd12 to the radius of curvature R12 of the second surface 2 of the first lens 110 is set to be greater than 0.890, thereby expanding the HFOV, in particular, to 98° or greater; the ratio of the effective radius sd12 to the radius of curvature R12 of the second surface 2 of the first lens 110 is set to be less than 0.970, thereby preventing the angle defined between the peripheral part of the second surface 2 of the first lens 110 made of glass and the tangent line from being excessively small, and further making it possible to perform a polishing process on the second surface 2 of the first lens 110.

In addition, as is clear from Table 11, the radius of curvature R11 of the object side lens surface (that is, the first surface 1) of the first lens 110 is 12.500 mm, and the radius of curvature R12 of the image side lens surface (that is, the second surface 2) of the first lens 110 is 2.910 mm. Therefore, the following condition 6-4 is satisfied:

$$1.300 < (R11+R12)/(R11-R12) < 1.900 \quad (6\text{-}4)$$

Moreover, the following condition 6-5 is satisfied:

$$1.600 < (R11+R12)/(R11-R12) < 1.850 \quad (6\text{-}5)$$

In condition 6-4, (R11+R12)/(R11−R12) is set to be greater than 1.300, thereby preventing the radius of curvature R12 of the image side lens surface (that is, the second surface 2) of the first lens 110 from being excessively small, thus facilitating the molding of the second surface 2 of the first lens 110. In another respect, the radius of curvature R11 of the object side lens surface (that is, the first surface 1) of the first lens 110 is able to be prevented from being excessively large, thereby avoiding an excessively large diameter of the first lens 110, thus miniaturizing the wide-angle lens 1000. In addition, (R11+R12)/(R11−R12) is set to be less than 1.900, thereby ensuring sufficient refractive power of the first lens 110, thus facilitating the expansion of the maximum HFOV ω of the first lens 110. Moreover, a sufficient thickness of the first lens 110 is able to be ensured, so as to prevent the first lens 110 from being damaged due to impact or the like.

In condition 6-5, (R11+R12)/(R11−R12) is further set to be greater than 1.600, thereby further preventing the radius of curvature R12 of the image side lens surface (that is, the second surface 2) of the first lens 110 from being excessively small, thus further facilitating the molding of the second surface 2 of the first lens 110. In another respect, the radius of curvature R11 of the object side lens surface (that is, the first surface 1) of the first lens 110 is able to be further prevented from being excessively large, thereby further avoiding an excessively large diameter of the first lens 110, thus further miniaturizing the wide-angle lens 1000. In addition, (R11+R12)/(R11−R12) is further set to be less than 1.850, thereby further ensuring sufficient refractive power of the first lens 110, thus further facilitating the expansion of the maximum HFOV ω of the first lens 110. Moreover, a sufficient thickness of the first lens 110 is able to be further ensured, so as to further prevent the first lens 110 from being damaged due to impact or the like.

In addition, as is clear from Table 11, the thickness T1 of the first lens 110 is 1.700 mm (the thickness T1 of the first lens 110 is defined as a distance between the object side lens surface (that is, the first surface 1) of the first lens 110 and the image side lens surface (that is, the second surface 2) of the first lens 110 in the optical axis direction), the sag Sag12 of the image side lens surface (that is, the second surface 2) of the first lens 110 is 1.803 mm. Therefore, the following condition 6-6 is satisfied:

$$0.700 < T1/Sag12 < 1.100 \quad (6\text{-}6)$$

In condition 6-6, the ratio of the thickness T1 of the first lens 110 to the sag Sag12 of the image side lens surface (that is, the second surface 2) of the first lens 110 is set to be greater than 0.700, thereby ensuring a sufficient thickness of the first lens 110 to prevent the first lens 110 from being damaged due to impact or the like; the ratio of the thickness T1 of the first lens 110 to the sag Sag12 of the image side lens surface (that is, the second surface 2) of the first lens 110 is set to be less than 1.100, thereby avoiding an excessively large thickness of the first lens 110, thus making it possible to achieve desired negative refractive power. In addition, in the wide-angle lens 1000 of this embodiment, the object-to-image distance d of the wide-angle lens 1000 is 13.383 mm, and the effective focal length f of the wide-angle lens 1000 as a whole is 1.018 mm. Therefore, the following condition 6-7 is satisfied:

$$11.000 < d/f < 15.000 \quad (6\text{-}7)$$

In condition 6-7, the ratio of the object-to-image distance d of the wide-angle lens 1000 to the effective focal length f of the wide-angle lens 1000 as a whole is set to be greater than 11.000, thereby enabling appropriate correction to be easily made for various aberrations, thus making it easy to achieve good optical characteristics; the ratio of the object-to-image distance d of the wide-angle lens 1000 to the effective focal length f of the wide-angle lens 1000 as a whole is set to be less than 15.000, thereby preventing the wide-angle lens 1000 from becoming excessively large while avoiding an excessively large overall length of the wide-angle lens 1000.

In summary, in this embodiment, by configuring the wide-angle lens 1000 as above, as shown in FIG. 22A to FIG. 24L, appropriate correction is enabled for various aberrations such as curvature of field, chromatic aberration of magnification, and coma. Moreover, the miniaturization is able to be achieved while the maximum HFOV ω is expanded.

Figure 25:
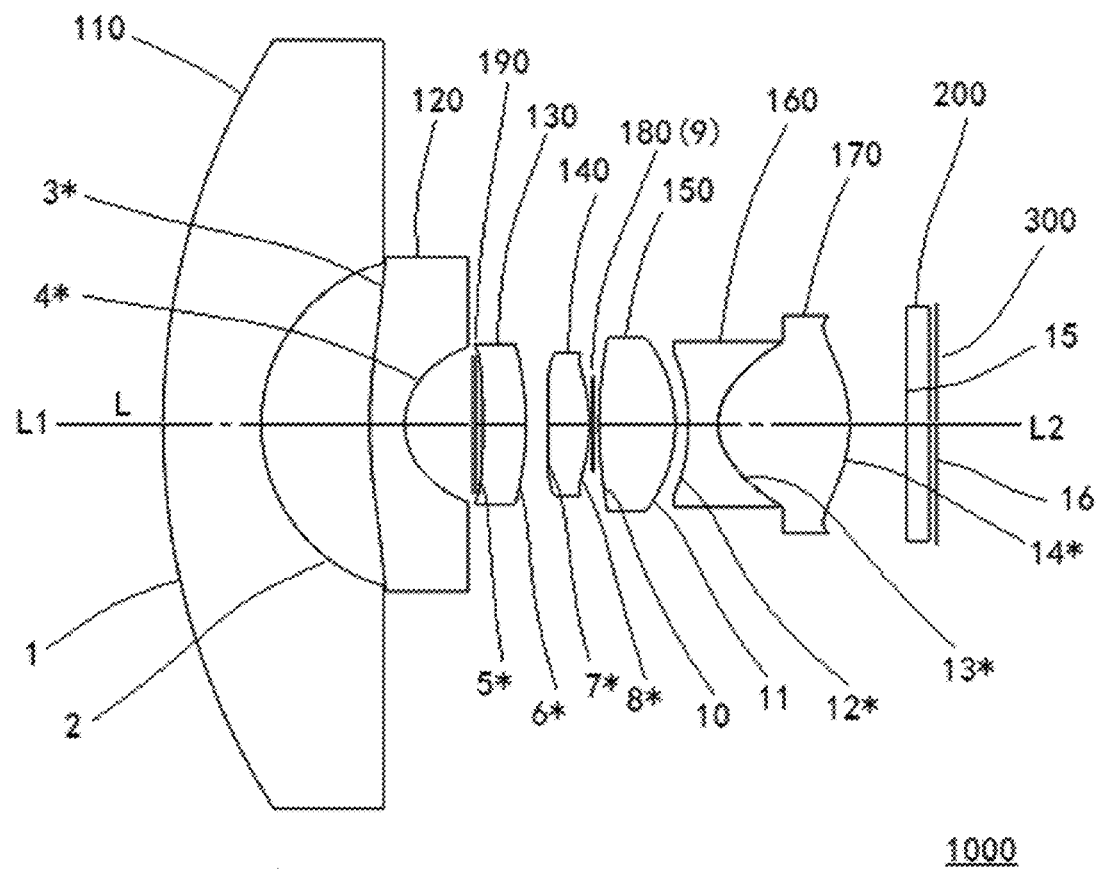
FIG. 25 illustrates a wide-angle lens according to Embodiment 7 of the disclosure.
Figure 26A:
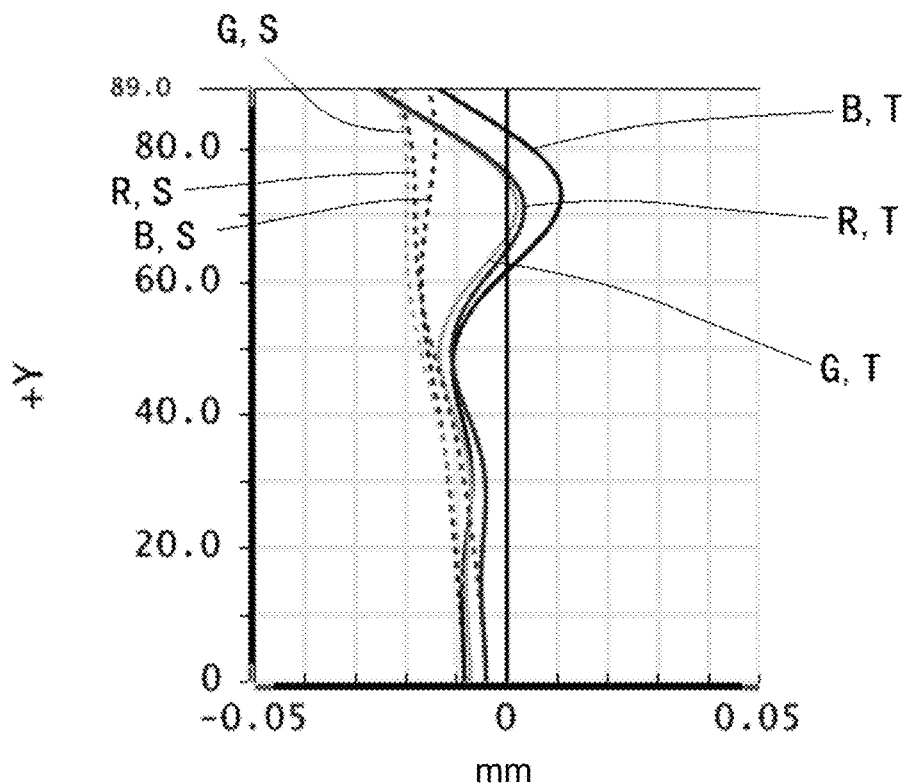
FIG. 26A illustrates curvature of field and distortion of the wide-angle lens according to Embodiment 7 of the disclosure.
Figure 26B:
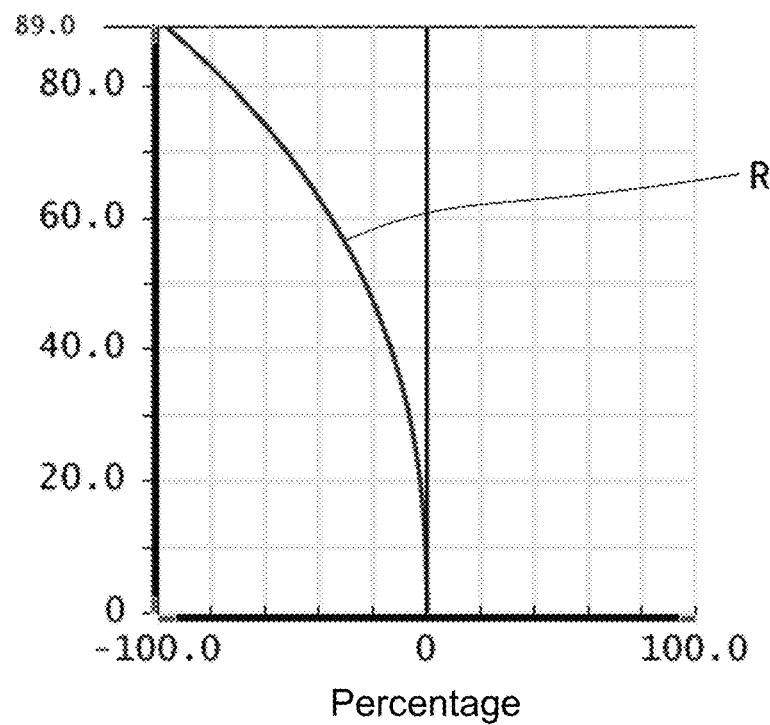
FIG. 26B illustrates curvature of field and distortion of the wide-angle lens according to Embodiment 7 of the disclosure.
Figure 27A:
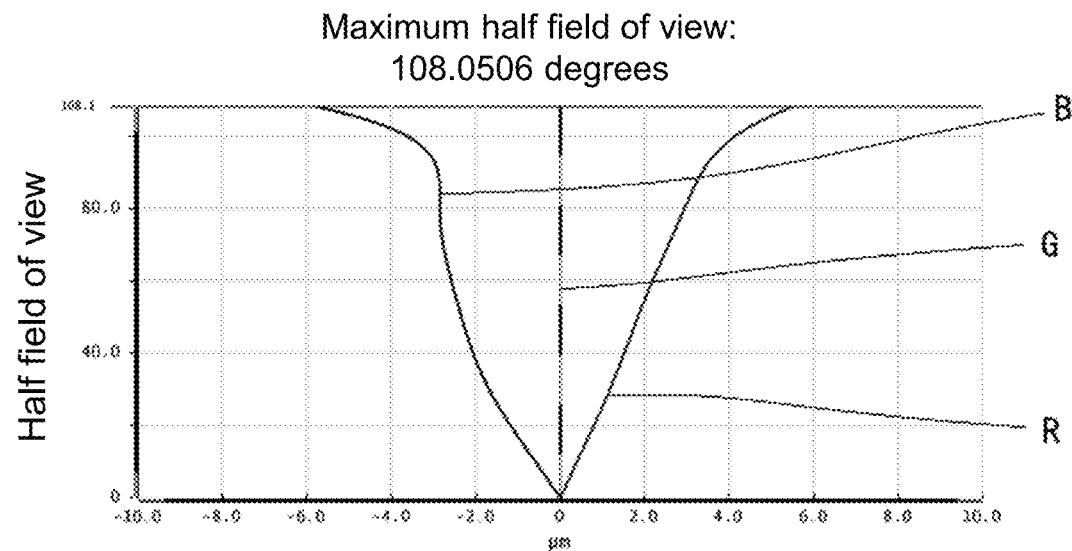
FIG. 27A illustrates lateral chromatic aberration (transverse chromatic aberration) of the wide-angle lens according to Embodiment 7 of the disclosure.
Figure 27B:
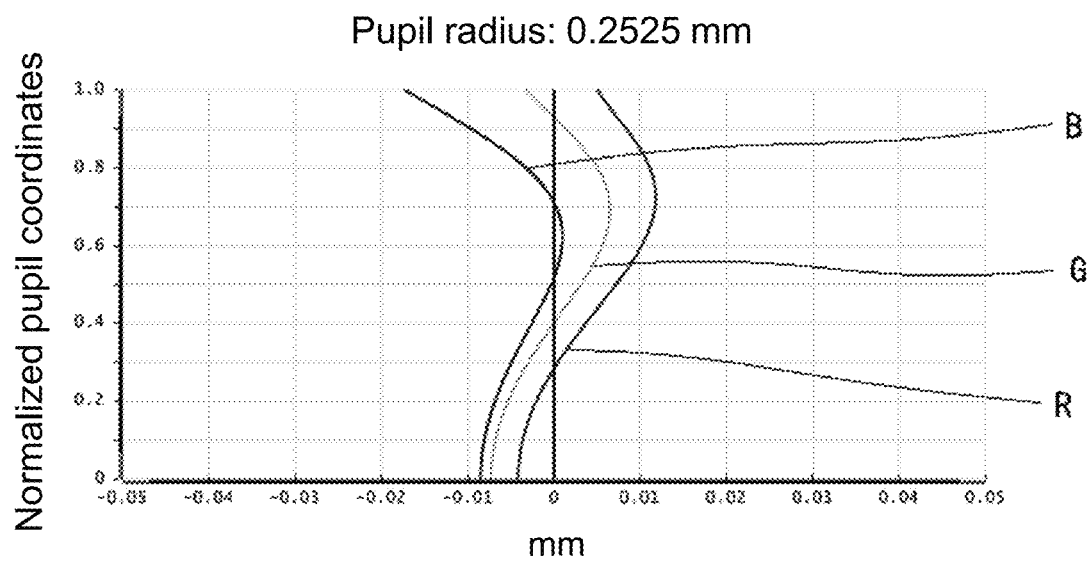
FIG. 27B illustrates spherical aberration (longitudinal aberration) of the wide-angle lens according to Embodiment 7 of the disclosure.
Figure 28A:
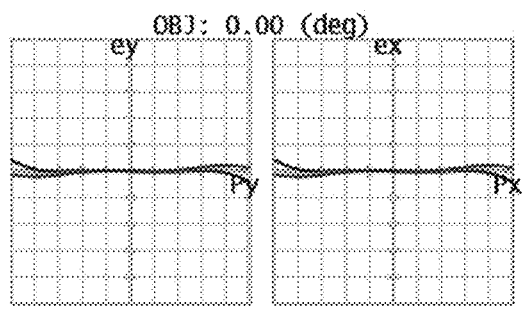
FIG. 28A to FIG. 28L illustrate transverse aberration of the wide-angle lens according to Embodiment 7 of the disclosure.
Figure 28B:
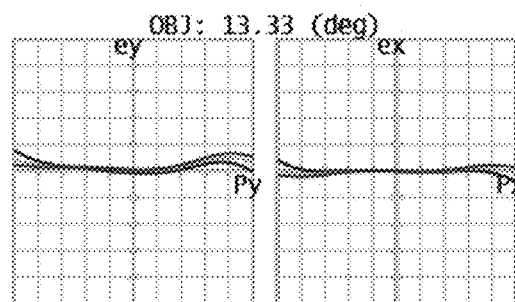
Figure 28C:
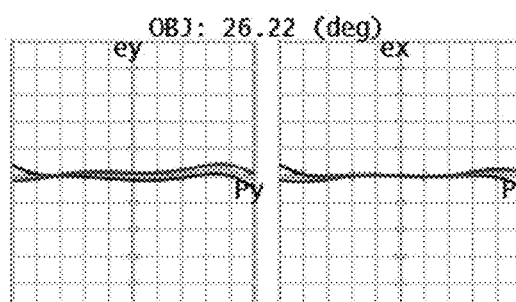
Figure 28D:
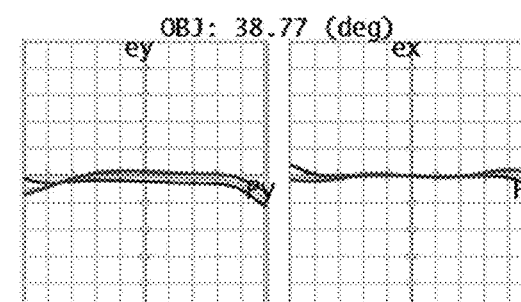
Figure 28E:
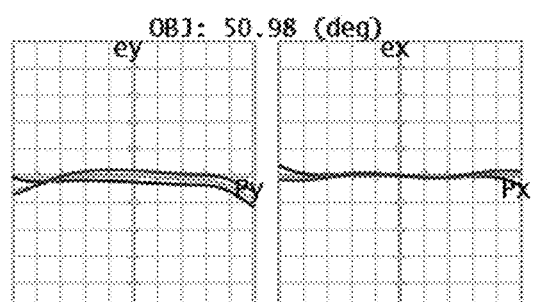
Figure 28F:
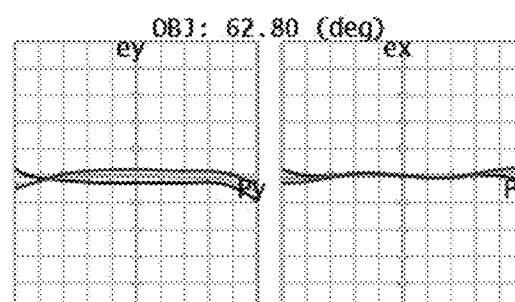
Figure 28G:
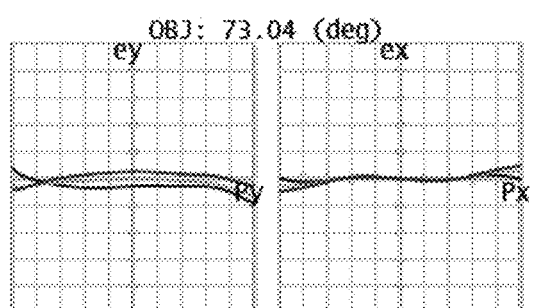
Figure 28H:
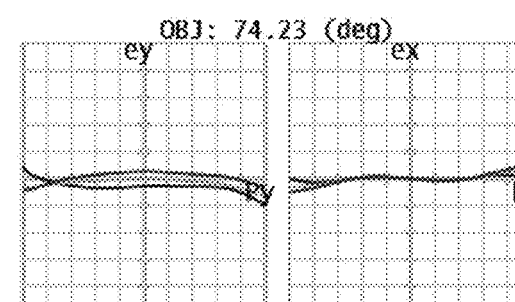
Figure 28I:
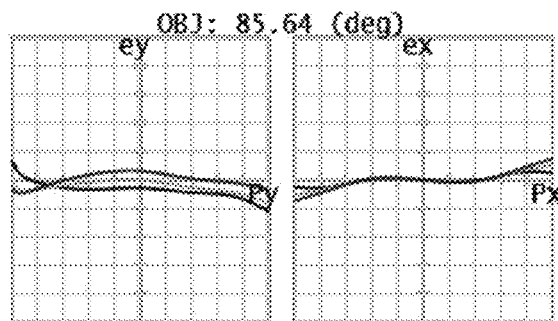
Figure 28J:
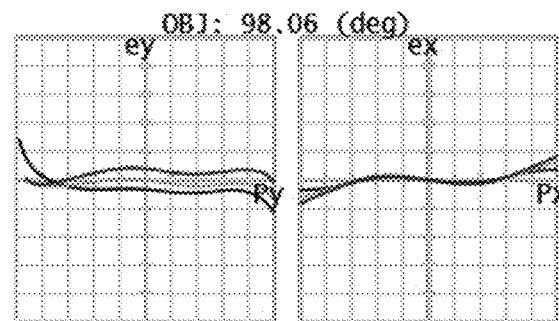
Figure 28K:
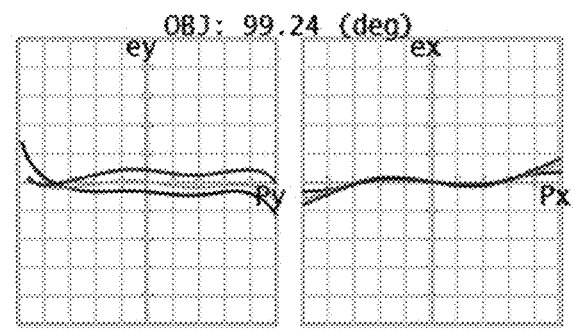
Figure 28L:
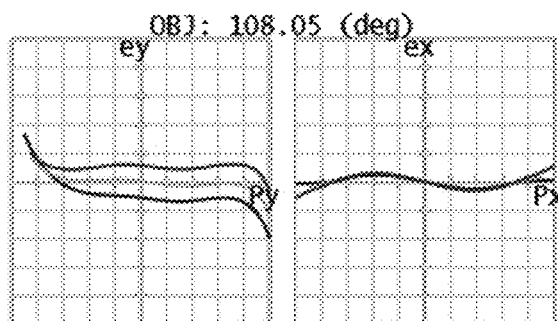

FIG. 25 illustrates a wide-angle lens according to Embodiment 7 of the disclosure. FIG. 26A illustrates curvature of field and distortion of the wide-angle lens according to Embodiment 7 of the disclosure. FIG. 26B illustrates curvature of field and distortion of the wide-angle lens according to Embodiment 7 of the disclosure. FIG. 27A illustrates lateral chromatic aberration (transverse chromatic aberration) of the wide-angle lens according to Embodiment 7 of the disclosure. FIG. 27B illustrates spherical aberration (longitudinal aberration) of the wide-angle lens according to Embodiment 7 of the disclosure. FIG. 28A to FIG. 28L illustrate transverse aberration of the wide-angle lens according to Embodiment 7 of the disclosure. Here, in FIG. 26A, FIG. 26B, FIG. 27A, FIG. 27B, and FIG. 28A to FIG. 28L, a correlation curve of red light R (having a wavelength of 656 nm) is denoted by R, a correlation curve of green light G (having a wavelength of 588 nm) is denoted by G, and a correlation curve of blue light B (having a wavelength of 486 nm) is denoted by B. T indicates being related to the meridian plane, and S indicates being related to the sagittal plane. Moreover, in FIG. 28A to FIG. 28L, a maximum scale of the longitudinal axis is ±50.000 μm.

As shown in FIG. 25, the wide-angle lens 1000 includes, sequentially arranged from the object side (L1 side), the first lens 110, the second lens 120, the third lens 130, the fourth lens 140, the diaphragm 180, the fifth lens 150, the sixth lens 160 and the seventh lens 170. Among them, the sixth lens 160 and the seventh lens 170 are bonded together by an adhesive to constitute a cemented lens.

Here, the wide-angle lens 1000 in this embodiment has the same basic structure (that is, whether each of the first lens 110 (located closest to the object side), the second lens 120 (located on the image side of and adjacent to the first lens 110), the third lens 130, the fourth lens 140, the fifth lens 150, the sixth lens 160 and the seventh lens 170 has positive refractive power or negative refractive power, whether each of these lenses is a glass lens or plastic lens, whether the object side surface and the image side surface of each of these lenses are convex surfaces or concave surfaces, and whether the object side surface and the image side surface are spherical surfaces or aspheric surfaces) as that of the wide-angle lens of Embodiment 1, and thus the details thereof will be omitted.

As shown in FIG. 25, similarly to Embodiment 1, the light-shielding sheet 190 is provided between the second lens 120 and the third lens 130, the filter 200 is arranged on the image side of the seventh lens 170, and the imaging element 300 is arranged on the image side of the filter 200.

In this embodiment, in the lens system as a whole, the effective focal length f is 1.019 mm, the object-to-image distance (total track) d is 13.381 mm, the F value (image space F/#) is 2.0163, the maximum HFOV (maximum half field angle) is 108 degrees, and the entrance pupil diameter HEP is 0.505 mm.

Table 13 shows physical properties of each surface of the wide-angle lens 1000 of this embodiment. Table 14-1 and Table 14-2 show aspheric coefficients of each surface of the wide-angle lens 1000 of this embodiment.

TABLE 13

| Surface | Radius of curvature | Thickness | $N_d$ | $v_d$ | Effective focal length | Effective radius | Sag |
|---|---|---|---|---|---|---|---|
| 1 | 12.500 | 1.700 | 1.871 | 40.73 | −1.310 | 6.660 | 1.922 |
| 2 | 2.910 | 1.880 | | | | 2.800 | 2.117 |
| 3* | 9.138 | 0.600 | 1.544 | 56.4 | | 2.900 | 0.268 |
| 4* | 1.191 | 1.354 | | | | 1.350 | 1.100 |
| 5* | −11.789 | 0.750 | 1.544 | 56.4 | 3.394 | 1.350 | −0.141 |
| 6* | −3.818 | 0.381 | | | | 1.391 | −0.200 |
| 7* | −22.250 | 0.710 | 1.635 | 23.9 | | 1.229 | 0.100 |
| 8* | −2.713 | 0.050 | | | | 1.235 | −0.150 |
| 9 (diaphragm) | Infinite | 0.116 | | | | | |
| 10 | 7.740 | 1.320 | 1.697 | 55.46 | | 1.500 | 0.147 |
| 11 | −2.450 | 0.225 | | | | 1.500 | −0.513 |

TABLE 13-continued

| Surface | Radius of curvature | Thickness | $N_d$ | $v_d$ | Effective focal length | Effective radius | Sag |
|---|---|---|---|---|---|---|---|
| 12* | −3.600 | 0.510 | 1.635 | 23.9 | 10.463 | 1.250 | −0.259 |
| 13* | 0.963 | 2.282 | 1.544 | 56.4 | | 1.441 | 1.123 |
| 14* | −2.141 | 0.978 | | | | 1.883 | −0.363 |
| 15 | Infinite | 0.400 | | | | | |
| 16 | Infinite | 0.125 | | | | | |

In Table 11 above, the radius of curvature, thickness, effective focal length, effective radius, and sag are in units of mm. $N_d$ represents a refractive index for a ray of 587.56 nm. $V_d$ represents the Abbe number. * represents an aspheric surface.

TABLE 14-1

| Surface | c (1/radius of curvature) | K | A4 | A6 |
|---|---|---|---|---|
| 3 | 1.09439E−01 | 0.00000E+00 | −4.39546E−03 | 2.94241E−03 |
| 4 | 8.39842E−01 | −3.71100E+00 | 2.15910E−01 | −7.58275E−02 |
| 5 | −8.48248E−02 | 0.00000E+00 | −5.99821E−03 | 9.40179E−03 |
| 6 | −2.61938E−01 | 0.00000E+00 | 1.43606E−02 | 2.26240E−02 |
| 7 | −4.49438E−02 | 0.00000E+00 | 1.40010E−02 | 4.01310E−02 |
| 8 | −3.68664E−01 | 0.00000E+00 | 1.66786E−02 | 2.21644E−02 |
| 12 | −2.77778E−01 | 0.00000E+00 | −2.23667E−02 | 7.48072E−03 |
| 13 | 1.03842E+00 | −1.00000E+00 | 4.72309E−02 | −6.05266E−02 |
| 14 | −4.67071E−01 | 0.00000E+00 | 5.76337E−02 | −4.72421E−02 |

TABLE 14-2

| Surface | A8 | A10 | A12 | A14 | A16 |
|---|---|---|---|---|---|
| 3 | −1.15296E−03 | 1.63212E−04 | −7.75247E−06 | 0.00000E+00 | 0.00000E+00 |
| 4 | 5.61909E−02 | −1.28652E−02 | −3.10366E−04 | 0.00000E+00 | 0.00000E+00 |
| 5 | 3.12004E−03 | −6.74245E−03 | 0.00000E+00 | 0.00000E+00 | 0.00000E+00 |
| 6 | −3.16016E−03 | −9.85165E−03 | 2.97746E−03 | 0.00000E+00 | 0.00000E+00 |
| 7 | −1.96461E−02 | 8.38631E−03 | 0.00000E+00 | 0.00000E+00 | 0.00000E+00 |
| 8 | −1.03312E−02 | 1.03923E−02 | 0.00000E+00 | 0.00000E+00 | 0.00000E+00 |
| 12 | −8.59213E−03 | 1.81642E−02 | −1.67818E−02 | 5.17215E−03 | 0.00000E+00 |
| 13 | 5.15225E−02 | −2.02257E−02 | 1.88707E−03 | 3.30690E−04 | 0.00000E+00 |
| 14 | 4.13120E−02 | −1.76585E−02 | 3.69817E−03 | −2.61279E−04 | 0.00000E+00 |

In Table 14-1 and Table 14-2 above, in a case where a lens surface is a convex surface protruding toward the object side or a concave surface recessed toward the object side, its radius of curvature is set to a positive value; in a case where a lens surface is a convex surface protruding toward the image side or a concave surface recessed toward the image side, its radius of curvature is set to a negative value.

In addition, Table 14-1 and Table 14-2 above show the aspheric coefficients A4, A6, A8, A10, A12, A14 and A16 of each of the aspheric surfaces, which satisfy expression 1 above.

Here, as described above, the maximum HFOV co of the wide-angle lens 1000 as a whole is 108 degrees, that is, the following condition 7-1 is satisfied:

$$98° < \omega < 120° \qquad (7\text{-}1)$$

In condition 7-1, the maximum HFOV co is set to be greater than 98°, thereby expanding the maximum HFOV ω; the maximum HFOV co is set to be less than 120°, thereby avoiding a situation that a peripheral portion of an image becomes dark due to a light quantity ratio at the periphery of the wide-angle lens 1000 being smaller than a light quantity ratio at the center of the wide-angle lens 1000. Further, the wide-angle lens 1000 is able to be miniaturized as a whole while the maximum HFOV co of the wide-angle lens 1000 is expanded.

In addition, in the wide-angle lens 1000 as a whole, the effective focal length f is 1.019 mm and the entrance pupil diameter HEP is 0.505 mm. Therefore, the following condition 7-2 is satisfied:

$$f/HEP < 2.3 \qquad (7\text{-}2)$$

In condition 7-2, the ratio of the effective focal length f to the entrance pupil diameter HEP of the wide-angle lens 1000 as a whole is set as f/HEP<2.3, thereby ensuring the brightness of the wide-angle lens 1000, and enabling use of the wide-angle lens 1000 in a high pixel imaging element.

In addition, as is clear from Table 13, the effective radius sd12 of the image side lens surface (that is, the second surface 2) of the first lens 110 is 2.800 mm, and the radius of curvature R12 of the second surface 2 of the first lens 110 is 2.910 mm. Therefore, the following condition 7-3 is satisfied:

$$0.890 < sd12/R12 < 0.970 \qquad (7\text{-}3)$$

In condition 7-3, the ratio of the effective radius sd12 to the radius of curvature R12 of the second surface 2 of the first lens 110 is set to be greater than 0.890, thereby expanding the HFOV, in particular, to 98° or greater; the ratio of the effective radius sd12 to the radius of curvature R12 of the second surface 2 of the first lens 110 is set to be less than 0.970, thereby preventing the angle defined between the peripheral part of the second surface 2 of the first lens 110 made of glass and the tangent line from being excessively small, and further making it possible to perform a polishing process on the second surface 2 of the first lens 110.

In addition, as is clear from Table 13, the radius of curvature R11 of the object side lens surface (that is, the first surface 1) of the first lens 110 is 12.500 mm, and the radius of curvature R12 of the image side lens surface (that is, the second surface 2) of the first lens 110 is 2.910 mm. Therefore, the following condition 7-4 is satisfied:

$$1.300<(R11+R12)/(R11-R12)<1.900 \quad (7-4)$$

Moreover, the following condition 7-5 is satisfied:

$$1.600<(R11+R12)/(R11-R12)<1.850 \quad (7-5)$$

In condition 7-4, (R11+R12)/(R11−R12) is set to be greater than 1.300, thereby preventing the radius of curvature R12 of the image side lens surface (that is, the second surface 2) of the first lens 110 from being excessively small, thus facilitating the molding of the second surface 2 of the first lens 110. In another respect, the radius of curvature R11 of the object side lens surface (that is, the first surface 1) of the first lens 110 is able to be prevented from being excessively large, thereby avoiding an excessively large diameter of the first lens 110, thus miniaturizing the wide-angle lens 1000. In addition, (R11+R12)/(R11−R12) is set to be less than 1.900, thereby ensuring sufficient refractive power of the first lens 110, thus facilitating the expansion of the maximum HFOV co of the first lens 110. Moreover, a sufficient thickness of the first lens 110 is able to be ensured, so as to prevent the first lens 110 from being damaged due to impact or the like.

In condition 7-5, (R11+R12)/(R11−R12) is further set to be greater than 1.600, thereby further preventing the radius of curvature R12 of the image side lens surface (that is, the second surface 2) of the first lens 110 from being excessively small, thus further facilitating the molding of the second surface 2 of the first lens 110. In another respect, the radius of curvature R11 of the object side lens surface (that is, the first surface 1) of the first lens 110 is able to be further prevented from being excessively large, thereby further avoiding an excessively large diameter of the first lens 110, thus further miniaturizing the wide-angle lens 1000. In addition, (R11+R12)/(R11−R12) is further set to be less than 1.850, thereby further ensuring sufficient refractive power of the first lens 110, thus further facilitating the expansion of the maximum HFOV co of the first lens 110. Moreover, a sufficient thickness of the first lens 110 is able to be further ensured, so as to further prevent the first lens 110 from being damaged due to impact or the like.

In addition, as is clear from Table 13, the thickness T1 of the first lens 110 is 1.700 mm (the thickness T1 of the first lens 110 is defined as a distance between the object side lens surface (that is, the first surface 1) of the first lens 110 and the image side lens surface (that is, the second surface 2) of the first lens 110 in the optical axis direction), the sag Sag12 of the image side lens surface (that is, the second surface 2) of the first lens 110 is 2.117 mm. Therefore, the following condition 7-6 is satisfied:

$$0.700<T1/Sag12<1.100 \quad (7-6)$$

In condition 7-6, the ratio of the thickness T1 of the first lens 110 to the sag Sag12 of the image side lens surface (that is, the second surface 2) of the first lens 110 is set to be greater than 0.700, thereby ensuring a sufficient thickness of the first lens 110 to prevent the first lens 110 from being damaged due to impact or the like; the ratio of the thickness T1 of the first lens 110 to the sag Sag12 of the image side lens surface (that is, the second surface 2) of the first lens 110 is set to be less than 1.100, thereby avoiding an excessively large thickness of the first lens 110, thus making it possible to achieve desired negative refractive power.

In addition, in the wide-angle lens 1000 of this embodiment, the object-to-image distance d of the wide-angle lens 1000 is 13.381 mm, and the effective focal length f of the wide-angle lens 1000 as a whole is 1.019 mm. Therefore, the following condition 7-7 is satisfied:

$$11.000<d/f<15.000 \quad (7-7)$$

In condition 7-7, the ratio of the object-to-image distance d of the wide-angle lens 1000 to the effective focal length f of the wide-angle lens 1000 as a whole is set to be greater than 11.000, thereby enabling appropriate correction to be easily made for various aberrations, thus making it easy to achieve good optical characteristics; the ratio of the object-to-image distance d of the wide-angle lens 1000 to the effective focal length f of the wide-angle lens 1000 as a whole is set to be less than 15.000, thereby preventing the wide-angle lens 1000 from becoming excessively large while avoiding an excessively large overall length of the wide-angle lens 1000.

In summary, in this embodiment, by configuring the wide-angle lens 1000 as above, as shown in FIG. 26A to FIG. 28L, appropriate correction is enabled for various aberrations such as curvature of field, chromatic aberration of magnification, and coma. Moreover, the miniaturization is able to be achieved while the maximum HFOV co is expanded.

Figure 29:
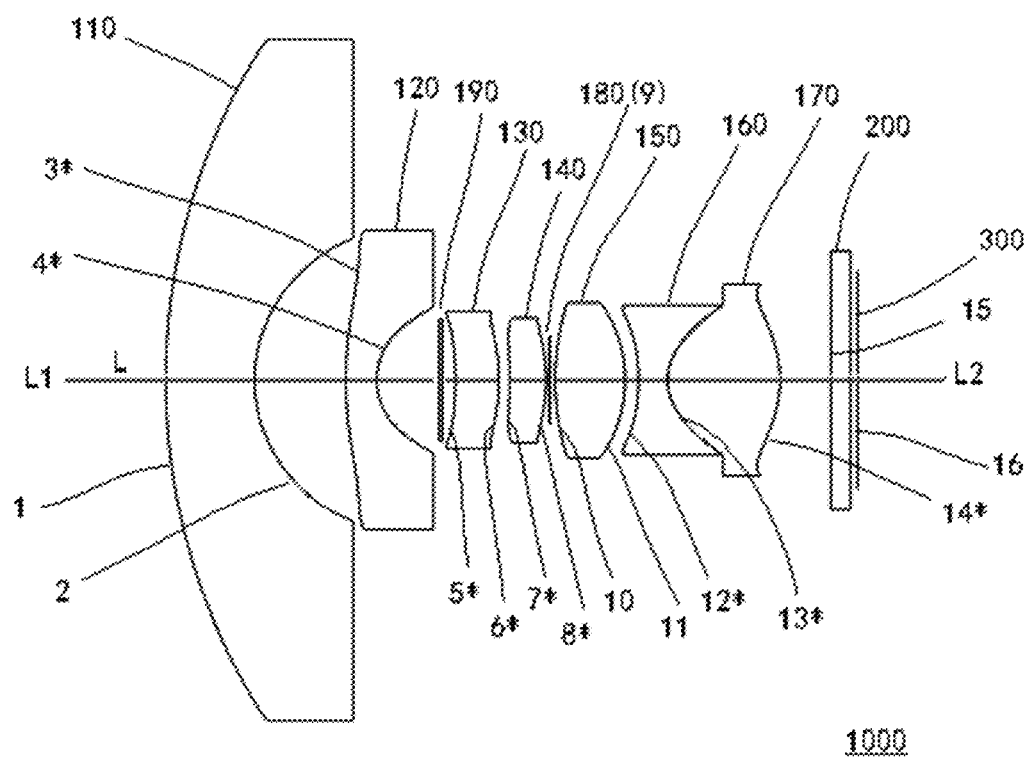
FIG. 29 illustrates a wide-angle lens according to Embodiment 8 of the disclosure.
Figure 30A:
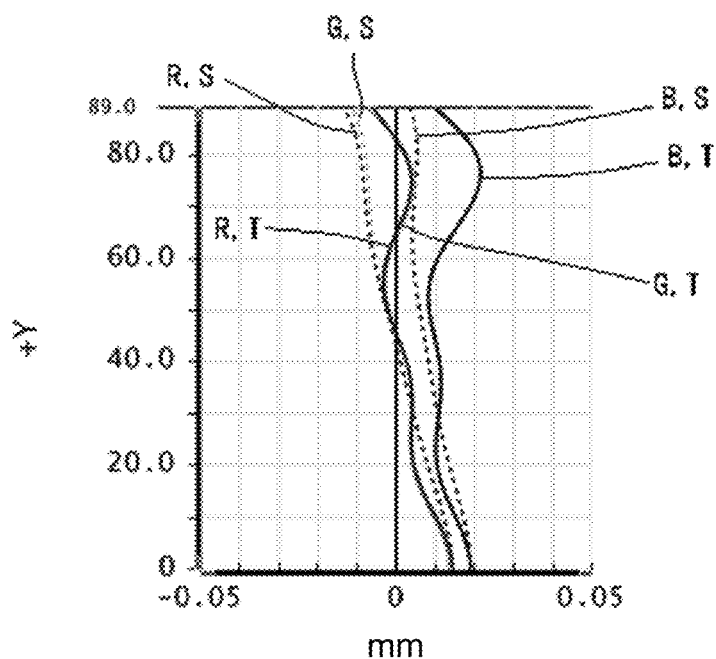
FIG. 30A illustrates curvature of field and distortion of the wide-angle lens according to Embodiment 8 of the disclosure.
Figure 30B:
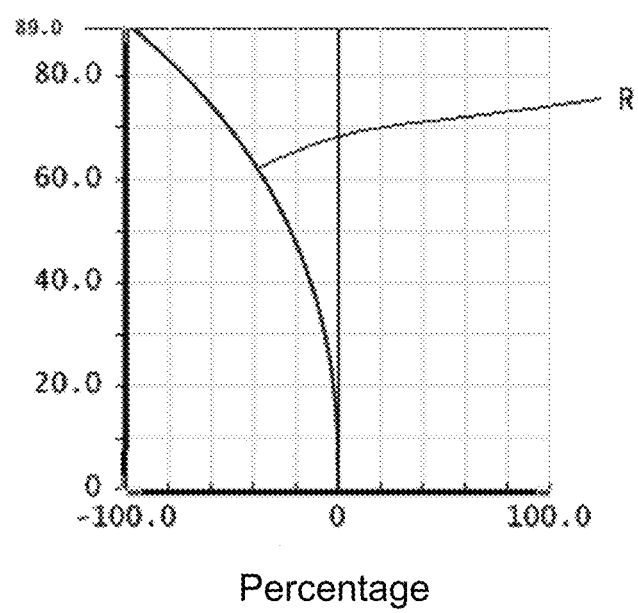
FIG. 30B illustrates curvature of field and distortion of the wide-angle lens according to Embodiment 8 of the disclosure.
Figure 31A:
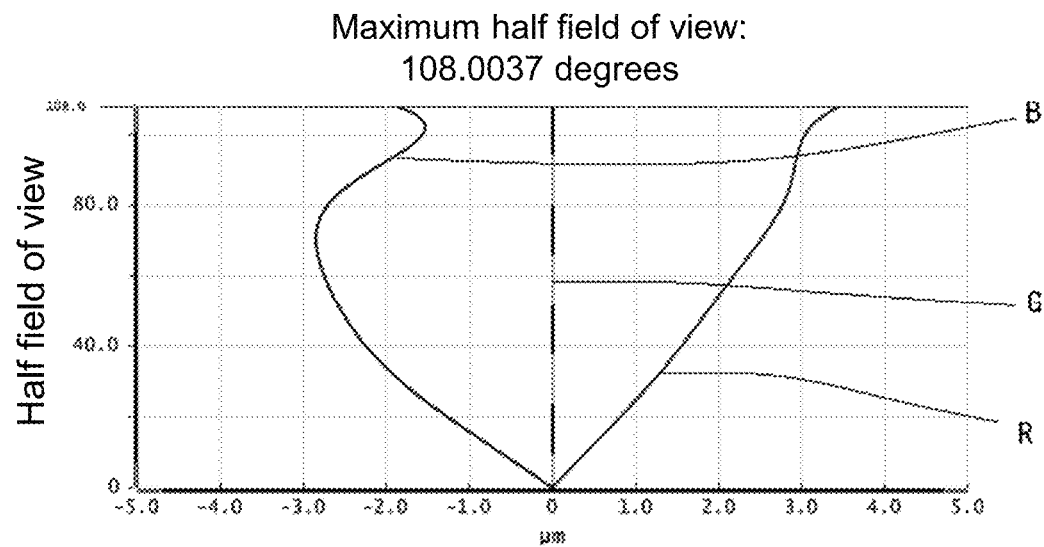
FIG. 31A illustrates lateral chromatic aberration (transverse chromatic aberration) of the wide-angle lens according to Embodiment 8 of the disclosure.
Figure 31B:
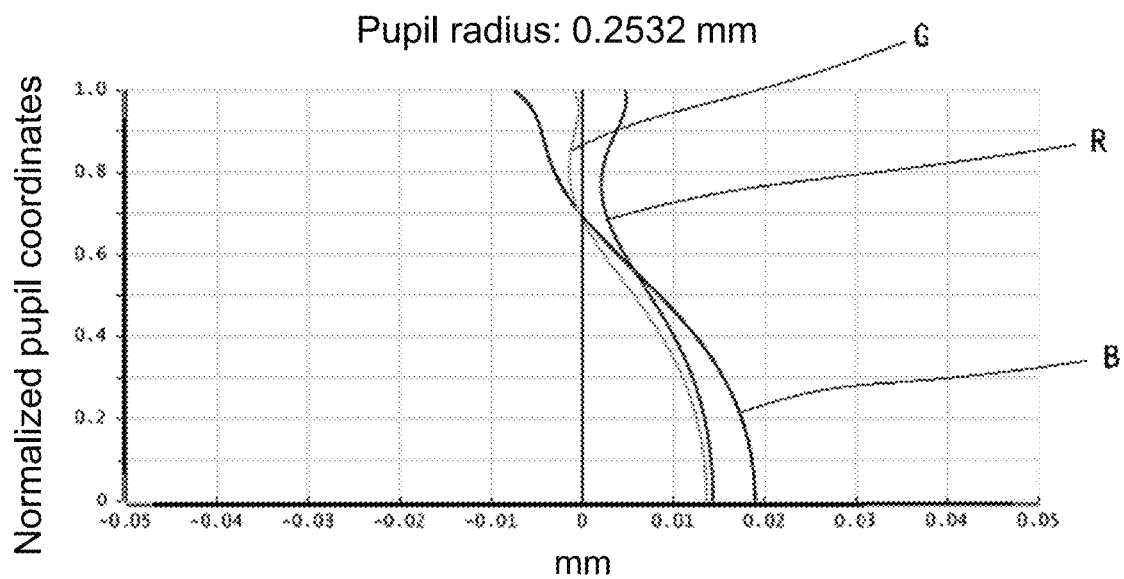
FIG. 31B illustrates spherical aberration (longitudinal aberration) of the wide-angle lens according to Embodiment 8 of the disclosure.
Figure 32A:
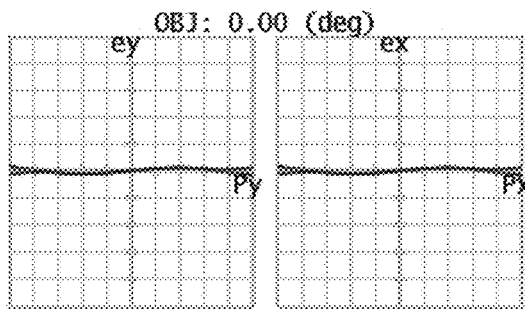
FIG. 32A to FIG. 32L illustrate transverse aberration of the wide-angle lens according to Embodiment 8 of the disclosure.
Figure 32B:
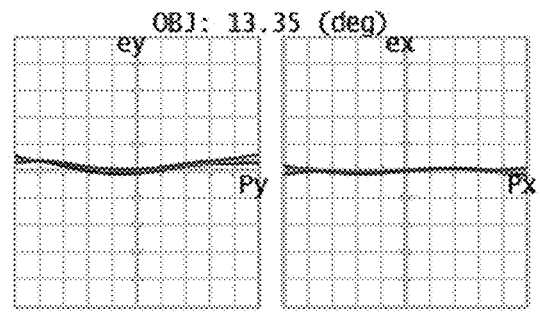
Figure 32C:
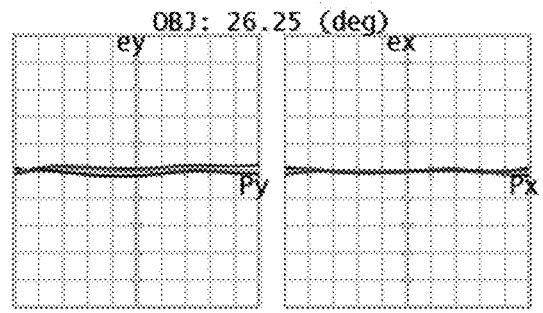
Figure 32D:
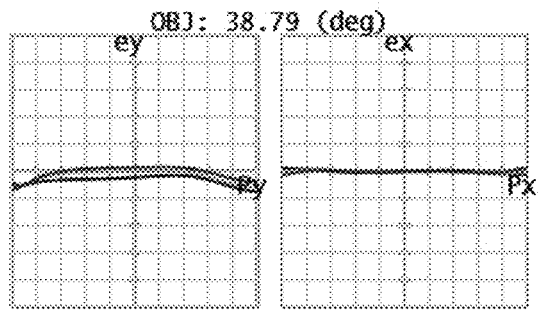
Figure 32E:
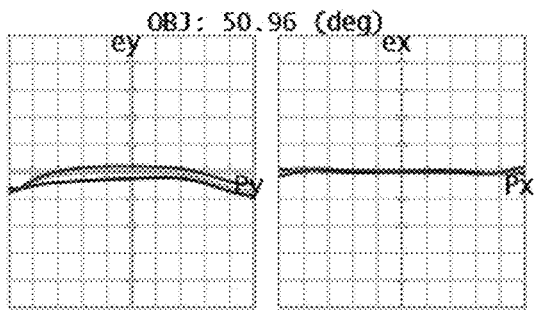
Figure 32F:
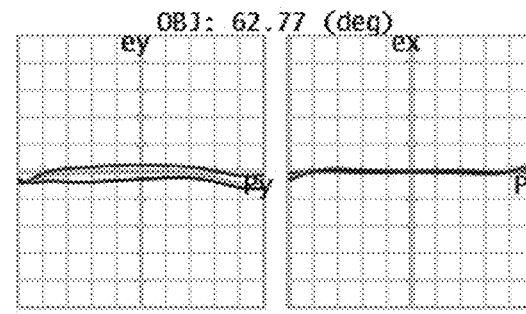
Figure 32G:
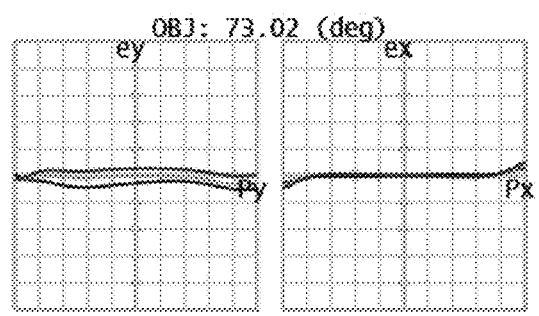
Figure 32H:
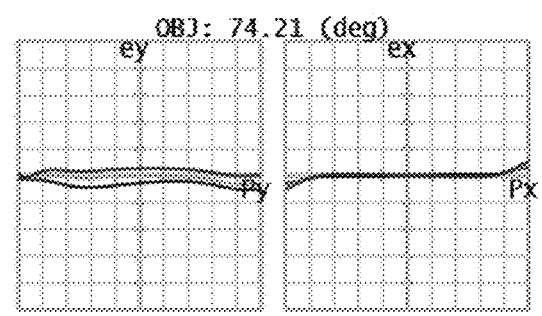
Figure 32I:
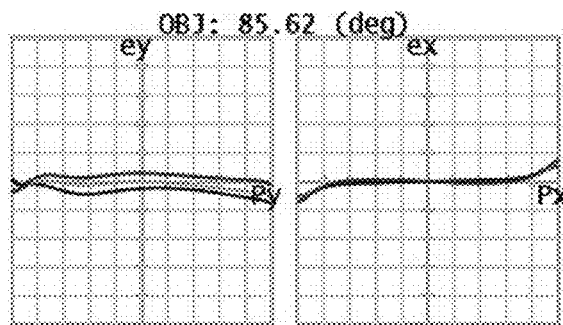
Figure 32J:
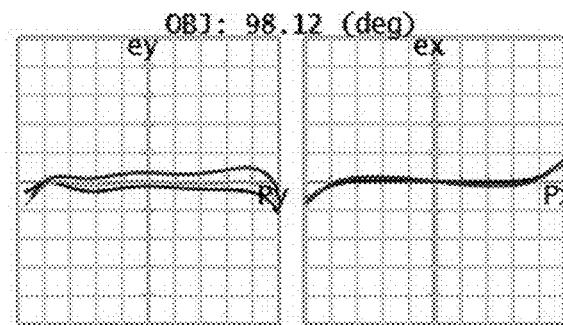
Figure 32K:
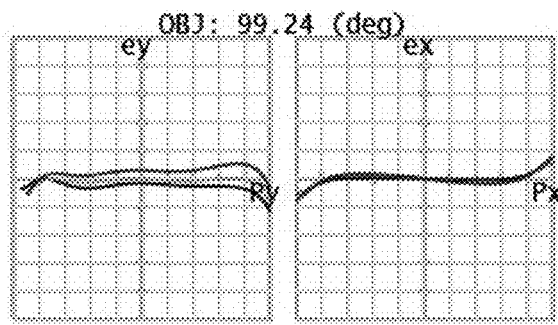
Figure 32L:
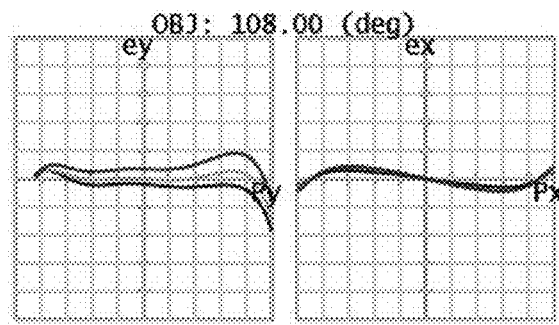

FIG. 29 illustrates a wide-angle lens according to Embodiment 8 of the disclosure. FIG. 30A illustrates curvature of field and distortion of the wide-angle lens according to Embodiment 8 of the disclosure. FIG. 30B illustrates curvature of field and distortion of the wide-angle lens according to Embodiment 8 of the disclosure. FIG. 31A illustrates lateral chromatic aberration (transverse chromatic aberration) of the wide-angle lens according to Embodiment 8 of the disclosure. FIG. 31B illustrates spherical aberration (longitudinal aberration) of the wide-angle lens according to Embodiment 8 of the disclosure. FIG. 32A to FIG. 32L illustrate transverse aberration of the wide-angle lens according to Embodiment 8 of the disclosure. Here, in FIG. 30A, FIG. 30B, FIG. 31A, FIG. 31B, and FIG. 32A to FIG. 32L, a correlation curve of red light R (having a wavelength of 656 nm) is denoted by R, a correlation curve of green light G (having a wavelength of 588 nm) is denoted by G, and a correlation curve of blue light B (having a wavelength of 486 nm) is denoted by B. T indicates being related to the meridian plane, and S indicates being related to the sagittal plane. Moreover, in FIG. 32A to FIG. 32L, the maximum scale of the longitudinal axis is ±50.000 μm.

As shown in FIG. 29, the wide-angle lens 1000 includes, sequentially arranged from the object side (L1 side), the first lens 110 (that is, the first lens 110 is located closest to the object side), the second lens 120 (that is, the second lens 120 is located on the image side of and adjacent to the first lens 110), the third lens 130, the fourth lens 140, the diaphragm 180, the fifth lens 150, the sixth lens 160 and the seventh lens 170. Among them, the sixth lens 160 and the seventh lens 170 are bonded together by an adhesive to constitute a cemented lens.

Here, the wide-angle lens 1000 in this embodiment has the same basic structure (that is, whether each of the first lens 110, the second lens 120, the third lens 130, the fourth lens 140, the fifth lens 150, the sixth lens 160 and the seventh lens 170 has positive refractive power or negative refractive power, whether each of these lenses is a glass lens or plastic lens, whether the object side surface and the image side surface of each of these lenses are convex surfaces or concave surfaces, and whether the object side surface and the image side surface are spherical surfaces or aspheric surfaces) as that of the wide-angle lens of Embodiment 1, and thus the details thereof will be omitted.

As shown in FIG. 29, similarly to Embodiment 1, the light-shielding sheet 190 is provided between the second lens 120 and the third lens 130, the filter 200 is arranged on the image side of the seventh lens 170, and the imaging element 300 is arranged on the image side of the filter 200.

In this embodiment, in the lens system as a whole, the effective focal length f is 1.019 mm, the object-to-image distance (total track) d is 13.397 mm, the F value (image space F/#) is 2.012, the maximum HFOV (maximum half field angle) is 108.004 degrees, and the entrance pupil diameter HEP is 0.506 mm.

Table 15 shows physical properties of each surface of the wide-angle lens 1000 of this embodiment. Table 16-1 and Table 16-2 show aspheric coefficients of each surface of the wide-angle lens 1000 of this embodiment.

TABLE 15

| Surface | Radius of curvature | Thickness | $N_d$ | $v_d$ | Effective focal length | Effective radius | Sag |
|---|---|---|---|---|---|---|---|
| 1 | 12.100 | 1.730 | 1.871 | 40.73 | −1.415 | 6.600 | 1.959 |
| 2 | 2.910 | 1.765 | | | | 2.731 | 1.905 |
| 3* | 7.693 | 0.600 | 1.544 | 56.4 | | 2.900 | 0.355 |
| 4* | 1.237 | 1.517 | | | | 1.419 | 1.095 |
| 5* | −6.607 | 0.850 | 1.544 | 56.4 | 4.381 | 1.288 | −0.185 |
| 6* | −3.507 | 0.202 | | | | 1.325 | −0.154 |
| 7* | −12.641 | 0.700 | 1.635 | 23.9 | | 1.201 | 0.040 |
| 8* | −3.228 | 0.050 | | | | 1.137 | −0.160 |
| 9 (diaphragm) | Infinite | 0.129 | | | | | |
| 10 | 5.000 | 1.360 | 1.697 | 55.46 | | 1.500 | 0.230 |
| 11 | −2.580 | 0.260 | | | | 1.500 | −0.481 |
| 12* | −3.864 | 0.550 | 1.635 | 23.9 | 10.147 | 1.326 | −0.300 |
| 13* | 0.980 | 2.190 | 1.544 | 56.4 | | 1.450 | 1.074 |
| 14* | −2.151 | 0.969 | | | | 1.856 | −0.370 |
| 15 | Infinite | 0.400 | | | | | |
| 16 | Infinite | 0.125 | | | | | |

In Table 15 above, the radius of curvature, thickness, effective focal length, effective radius, and sag are in units of mm. $N_d$ represents a refractive index for a ray of 587.56 nm. $V_d$ represents the Abbe number. * represents an aspheric surface.

TABLE 16-1

| Surface | c (1/radius of curvature) | K | A4 | A6 |
|---|---|---|---|---|
| 3 | 1.29990E−01 | 0.00000E+00 | 1.79733E−03 | −1.14149E−03 |
| 4 | 8.08669E−01 | −4.00000E+00 | 2.15100E−01 | −8.02378E−02 |
| 5 | −1.51355E−01 | 0.00000E+00 | −1.09624E−02 | −8.73052E−03 |
| 6 | −2.85185E−01 | 0.00000E+00 | 4.64269E−03 | 4.90763E−03 |
| 7 | −7.91052E−02 | 0.00000E+00 | 1.02155E−02 | 7.50888E−03 |
| 8 | −3.09828E−01 | 0.00000E+00 | 7.49234E−03 | 1.54584E−03 |
| 12 | −2.58792E−01 | 0.00000E+00 | −3.14257E−02 | 2.35226E−03 |
| 13 | 1.02041E+00 | −1.00000E+00 | 3.07479E−02 | −4.89661E−02 |
| 14 | −4.64857E−01 | 0.00000E+00 | 4.79842E−02 | −2.97957E−02 |

TABLE 16-2

| Surface | A8 | A10 | A12 | A14 | A16 |
|---|---|---|---|---|---|
| 3 | −6.11588E−05 | 1.50045E−05 | 3.90615E−08 | 0.00000E+00 | 0.00000E+00 |
| 4 | 4.96308E−02 | −1.37651E−02 | 1.87863E−04 | 0.00000E+00 | 0.00000E+00 |
| 5 | 2.50539E−03 | −1.94316E−04 | −2.18386E−04 | 0.00000E+00 | 0.00000E+00 |
| 6 | 2.37631E−03 | 4.68175E−04 | 1.19525E−03 | 0.00000E+00 | 0.00000E+00 |
| 7 | 1.14133E−02 | 6.53638E−04 | 0.00000E+00 | 0.00000E+00 | 0.00000E+00 |
| 8 | 1.36753E−02 | −1.98505E−03 | 0.00000E+00 | 0.00000E+00 | 0.00000E+00 |
| 12 | 3.38366E−03 | −2.00010E−03 | 6.86525E−04 | 0.00000E+00 | 0.00000E+00 |
| 13 | 2.79270E−02 | −5.22149E−03 | −1.20343E−04 | 0.00000E+00 | 0.00000E+00 |
| 14 | 2.26165E−02 | −7.19858E−03 | 9.87041E−04 | 0.00000E+00 | 0.00000E+00 |

In Table 16-1 and Table 16-2 above, in a case where a lens surface is a convex surface protruding toward the object side or a concave surface recessed toward the object side, its radius of curvature is set to a positive value; in a case where a lens surface is a convex surface protruding toward the image side or a concave surface recessed toward the image side, its radius of curvature is set to a negative value.

In addition, Table 16-1 and Table 16-2 above show the aspheric coefficients A4, A6, A8, A10, A12, A14 and A16 of each of the aspheric surfaces, which satisfy expression 1 above.

Here, as described above, the maximum HFOV ω of the wide-angle lens 1000 as a whole is 108.004 degrees, that is, the following condition 8-1 is satisfied:

$$98°<\omega<120° \tag{8-1}$$

In condition 8-1, the maximum HFOV ω is set to be greater than 98°, thereby expanding the maximum HFOV ω; the maximum HFOV ω is set to be less than 120°, thereby avoiding a situation that a peripheral portion of an image becomes dark due to a light quantity ratio at the periphery of the wide-angle lens 1000 being smaller than a light quantity ratio at the center of the wide-angle lens 1000. Further, the wide-angle lens 1000 is able to be miniaturized as a whole while the maximum HFOV ω of the wide-angle lens 1000 is expanded.

In addition, in the wide-angle lens 1000 as a whole, the effective focal length f is 1.019 mm and the entrance pupil diameter HEP is 0.506 mm. Therefore, the following condition 8-2 is satisfied:

$$f/HEP<2.3 \tag{8-2}$$

In condition 8-2, the ratio of the effective focal length f to the entrance pupil diameter HEP of the wide-angle lens 1000 as a whole is set as f/HEP<2.3, thereby ensuring the brightness of the wide-angle lens 1000, and enabling use of the wide-angle lens 1000 in a high pixel imaging element.

In addition, as is clear from Table 15, the effective radius sd12 of the image side lens surface (that is, the second surface 2) of the first lens 110 is 2.731 mm, and the radius of curvature R12 of the second surface 2 of the first lens 110 is 2.910 mm. Therefore, the following condition 8-3 is satisfied:

$$0.890<sd12/R12<0.970 \tag{8-3}$$

In condition 8-3, the ratio of the effective radius sd12 to the radius of curvature R12 of the second surface 2 of the first lens 110 is set to be greater than 0.890, thereby expanding the HFOV, in particular, to 98° or greater; the ratio of the effective radius sd12 to the radius of curvature R12 of the second surface 2 of the first lens 110 is set to be less than 0.970, thereby preventing the angle defined between the peripheral part of the second surface 2 of the first lens 110 made of glass and the tangent line from being excessively small, and further making it possible to perform a polishing process on the second surface 2 of the first lens 110.

In addition, as is clear from Table 15, the radius of curvature R11 of the object side lens surface (that is, the first surface 1) of the first lens 110 is 12.100 mm, and the radius of curvature R12 of the image side lens surface (that is, the second surface 2) of the first lens 110 is 2.910 mm. Therefore, the following condition 8-4 is satisfied:

$$1.300<(R11+R12)/(R11-R12)<1.900 \tag{8-4}$$

Moreover, the following condition 8-5 is satisfied:

$$1.600<(R11+R12)/(R11-R12)<1.850 \tag{8-5}$$

In condition 8-4, (R11+R12)/(R11−R12) is set to be greater than 1.300, thereby preventing the radius of curvature R12 of the image side lens surface (that is, the second surface 2) of the first lens 110 from being excessively small, thus facilitating the molding of the second surface 2 of the first lens 110. In another respect, the radius of curvature R11 of the object side lens surface (that is, the first surface 1) of the first lens 110 is able to be prevented from being excessively large, thereby avoiding an excessively large diameter of the first lens 110, thus miniaturizing the wide-angle lens 1000. In addition, (R11+R12)/(R11−R12) is set to be less than 1.900, thereby ensuring sufficient refractive power of the first lens 110, thus facilitating the expansion of the maximum HFOV ω of the first lens 110. Moreover, a sufficient thickness of the first lens 110 is able to be ensured, so as to prevent the first lens 110 from being damaged due to impact or the like.

In condition 8-5, (R11+R12)/(R11−R12) is further set to be greater than 1.600, thereby further preventing the radius of curvature R12 of the image side lens surface (that is, the second surface 2) of the first lens 110 from being excessively small, thus further facilitating the molding of the second surface 2 of the first lens 110. In another respect, the radius of curvature R11 of the object side lens surface (that is, the first surface 1) of the first lens 110 is able to be further prevented from being excessively large, thereby further avoiding an excessively large diameter of the first lens 110, thus further miniaturizing the wide-angle lens 1000. In addition, (R11+R12)/(R11−R12) is further set to be less than 1.850, thereby further ensuring sufficient refractive power of the first lens 110, thus further facilitating the expansion of the maximum HFOV ω of the first lens 110. Moreover, a sufficient thickness of the first lens 110 is able to be further ensured, so as to further prevent the first lens 110 from being damaged due to impact or the like.

In addition, as is clear from Table 15, the thickness T1 of the first lens 110 is 1.730 mm (the thickness T1 of the first lens 110 is defined as a distance between the object side lens surface (that is, the first surface 1) of the first lens 110 and the image side lens surface (that is, the second surface 2) of the first lens 110 in the optical axis direction), the sag Sag12 of the image side lens surface (that is, the second surface 2) of the first lens 110 is 1.905 mm. Therefore, the following condition 8-6 is satisfied:

$$0.700<T1/Sag12<1.100 \tag{8-6}$$

In condition 8-6, the ratio of the thickness T1 of the first lens 110 to the sag Sag12 of the image side lens surface (that is, the second surface 2) of the first lens 110 is set to be greater than 0.700, thereby ensuring a sufficient thickness of the first lens 110 to prevent the first lens 110 from being damaged due to impact or the like; the ratio of the thickness T1 of the first lens 110 to the sag Sag12 of the image side lens surface (that is, the second surface 2) of the first lens 110 is set to be less than 1.100, thereby avoiding an excessively large thickness of the first lens 110, thus making it possible to achieve desired negative refractive power.

In addition, in the wide-angle lens 1000 of this embodiment, the object-to-image distance d of the wide-angle lens 1000 is 13.397 mm, and the effective focal length f of the wide-angle lens 1000 as a whole is 1.019 mm. Therefore, the following condition 8-7 is satisfied:

$$11.000<d/f<15.000 \tag{8-7}$$

In condition 8-7, the ratio of the object-to-image distance d of the wide-angle lens 1000 to the effective focal length f of the wide-angle lens 1000 as a whole is set to be greater than 11.000, thereby enabling appropriate correction to be easily made for various aberrations, thus making it easy to achieve good optical characteristics; the ratio of the object-to-image distance d of the wide-angle lens 1000 to the effective focal length f of the wide-angle lens 1000 as a whole is set to be less than 15.000, thereby preventing the wide-angle lens 1000 from becoming excessively large while avoiding an excessively large overall length of the wide-angle lens 1000.

In summary, in this embodiment, by configuring the wide-angle lens 1000 as above, as shown in FIG. 30A to FIG. 32L, appropriate correction is enabled for various aberrations such as curvature of field, chromatic aberration of magnification, and coma. Moreover, the miniaturization is able to be achieved while the maximum HFOV co is expanded.

Figure 33:
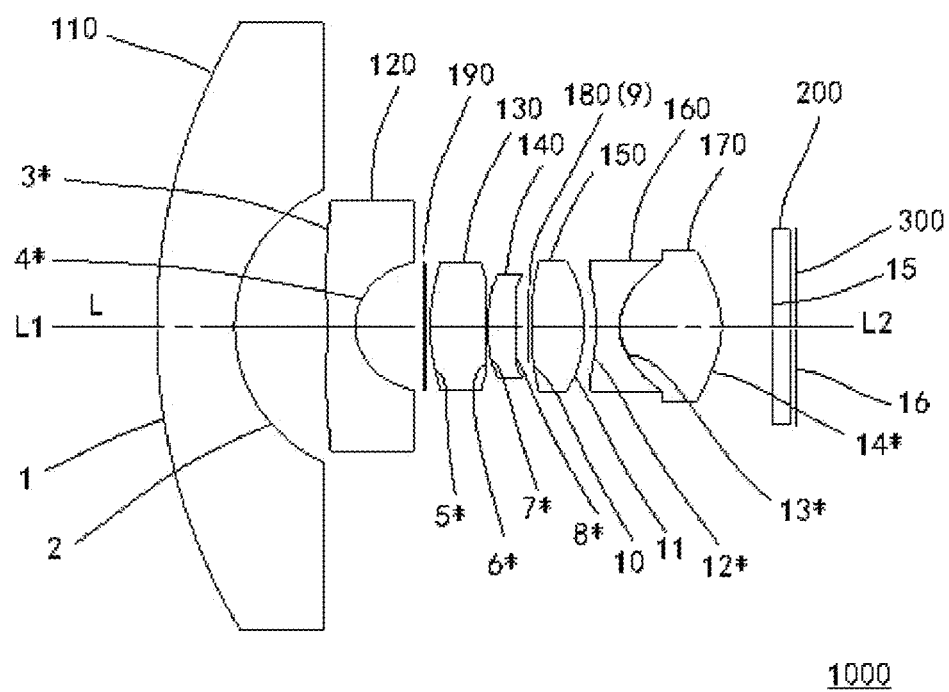
FIG. 33 illustrates a wide-angle lens according to Embodiment 9 of the disclosure.
Figure 34A:
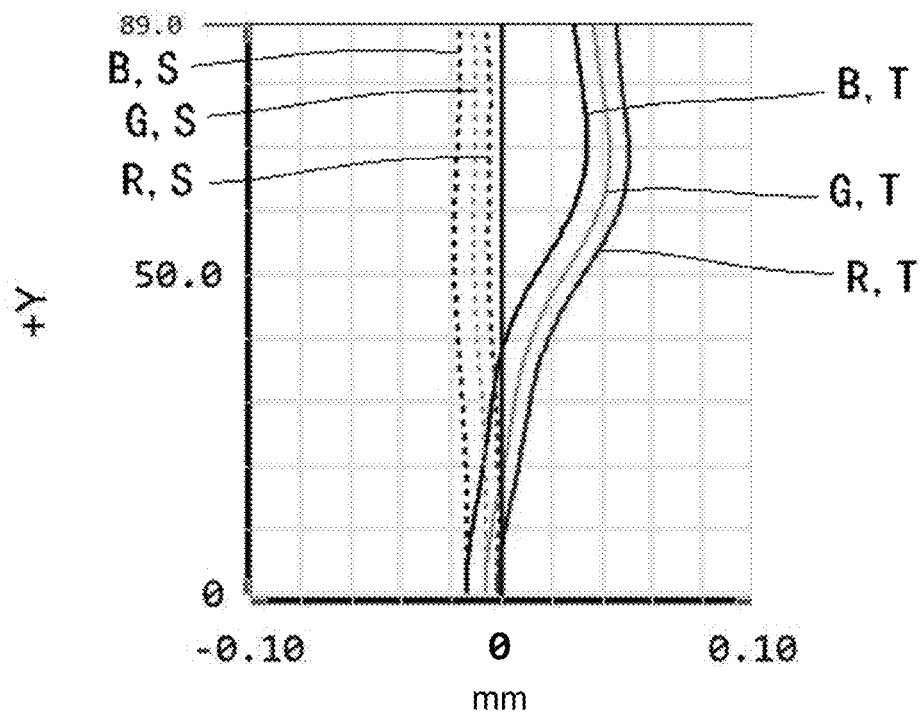
FIG. 34A illustrates curvature of field and distortion of the wide-angle lens according to Embodiment 9 of the disclosure.
Figure 34B:
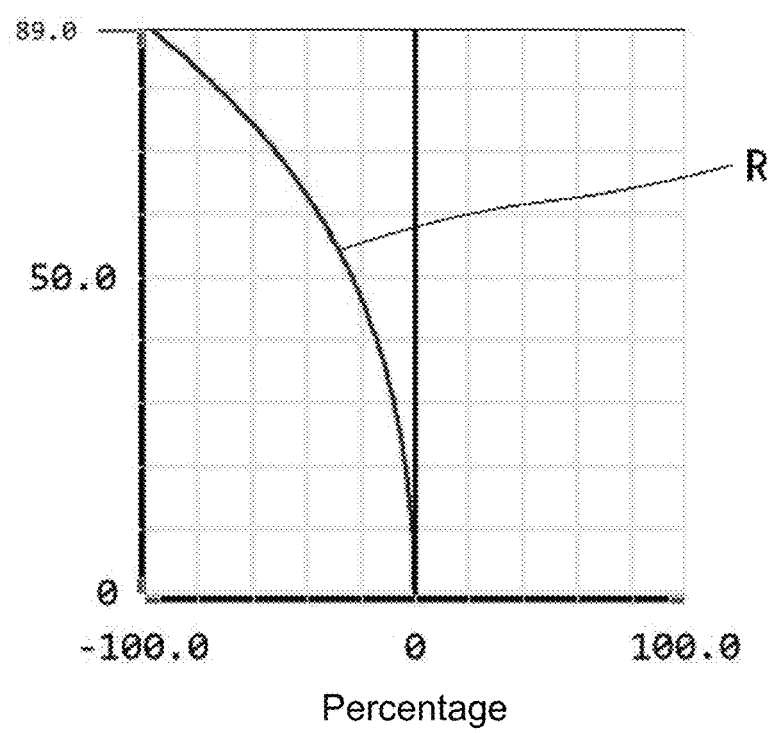
FIG. 34B illustrates curvature of field and distortion of the wide-angle lens according to Embodiment 9 of the disclosure.
Figure 35A:
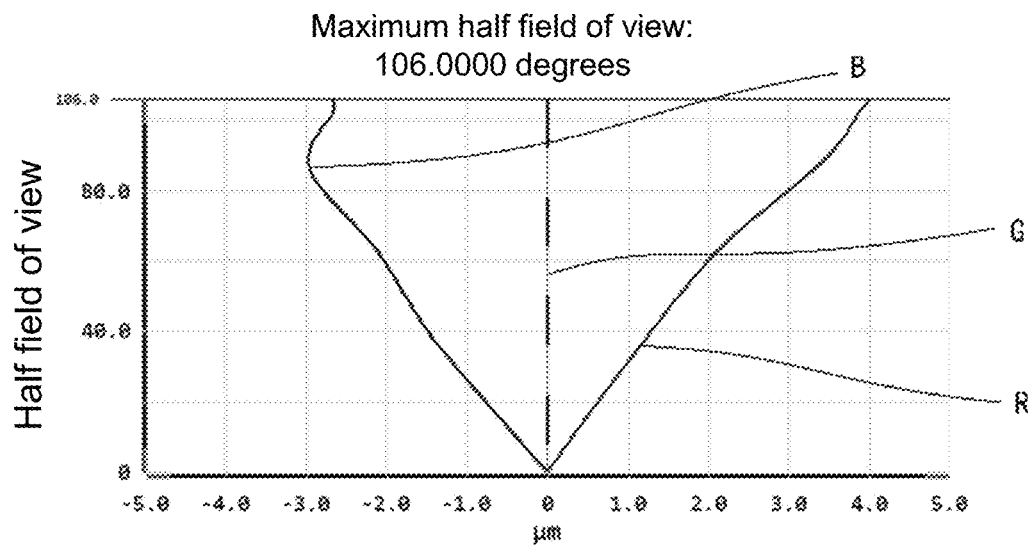
FIG. 35A illustrates lateral chromatic aberration (transverse chromatic aberration) of the wide-angle lens according to Embodiment 9 of the disclosure.
Figure 35B:
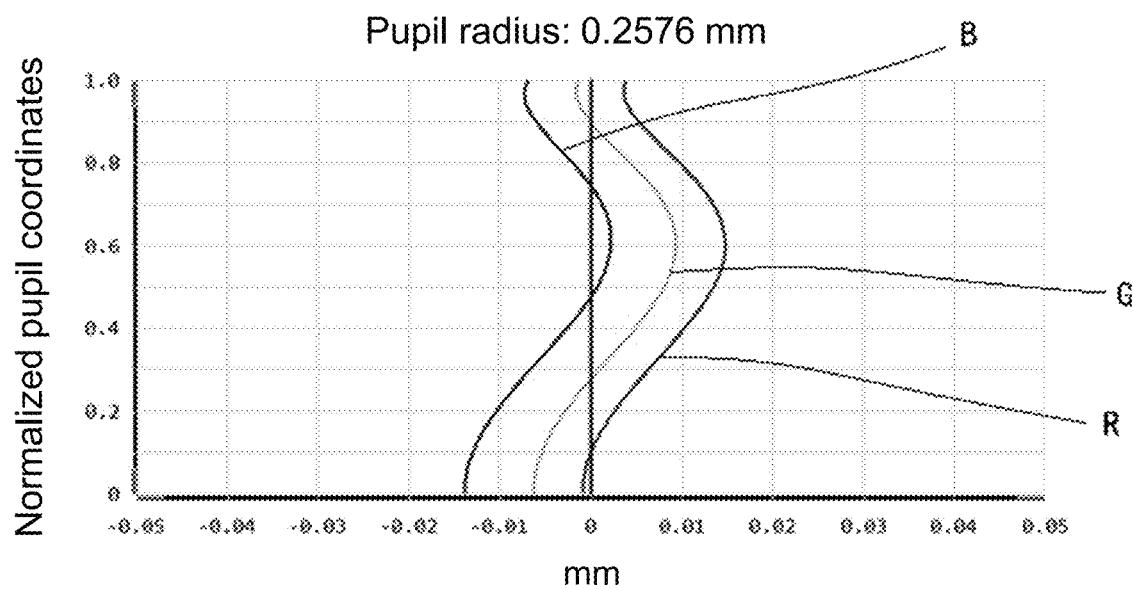
FIG. 35B illustrates spherical aberration (longitudinal aberration) of the wide-angle lens according to Embodiment 9 of the disclosure.
Figure 36A:
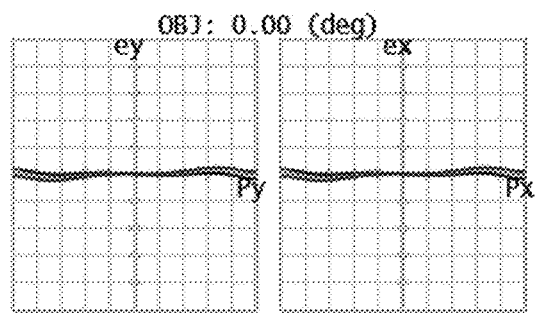
FIG. 36A to FIG. 36L illustrate transverse aberration of the wide-angle lens according to Embodiment 9 of the disclosure.
Figure 36B:
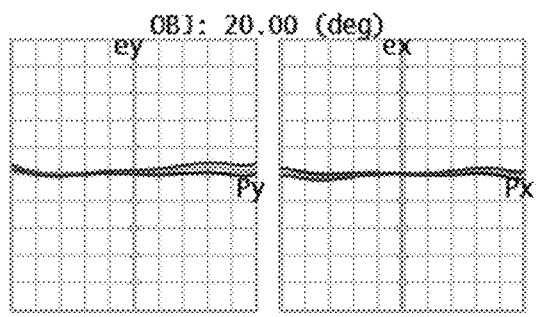
Figure 36C:
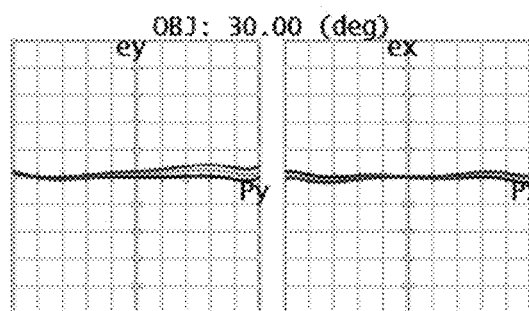
Figure 36D:
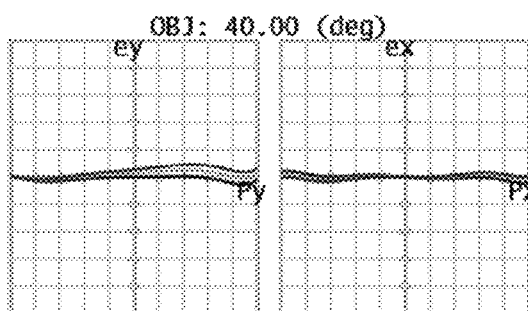
Figure 36E:
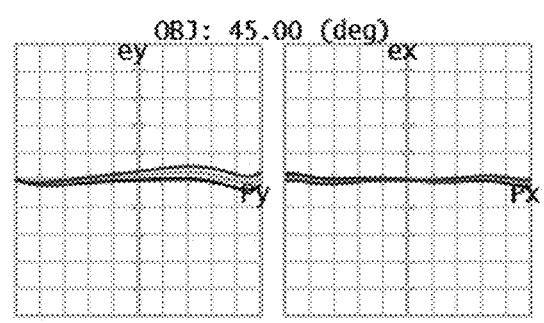
Figure 36F:
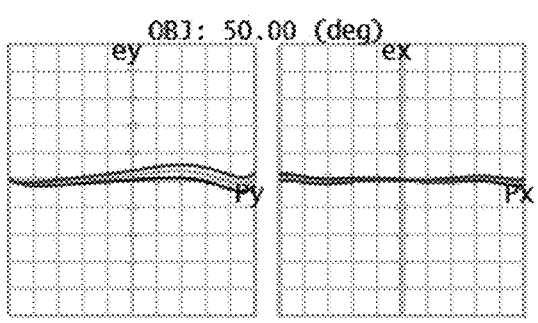
Figure 36G:
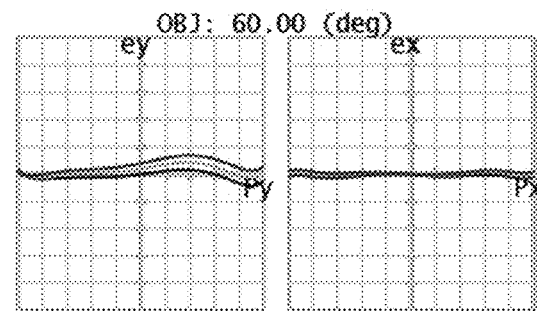
Figure 36H:
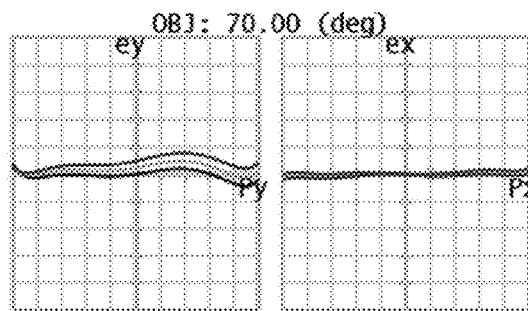
Figure 36I:
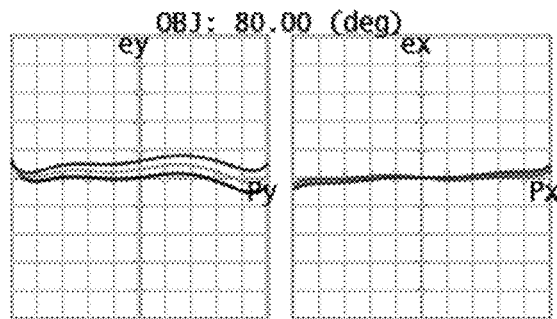
Figure 36J:
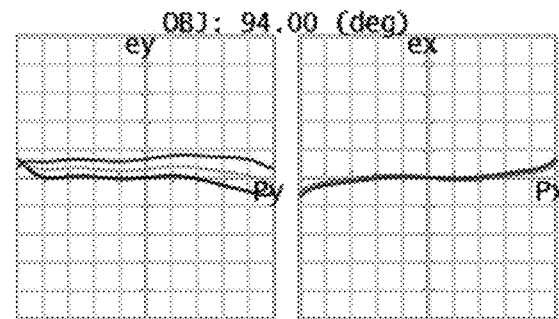
Figure 36K:
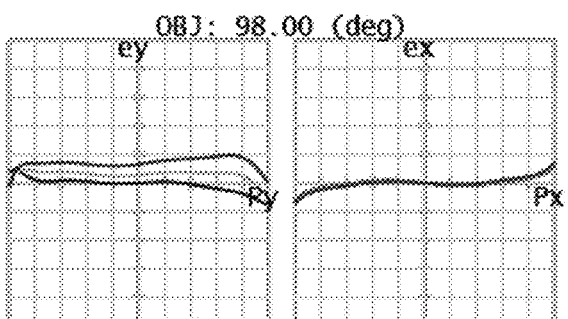
Figure 36L:
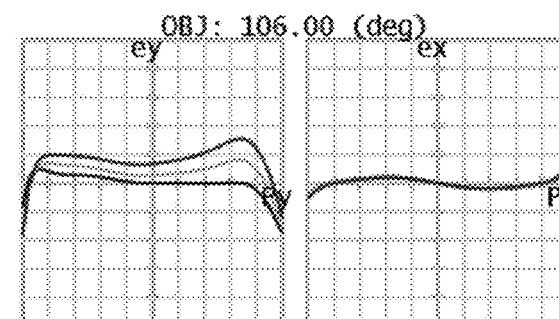

FIG. 33 illustrates a wide-angle lens according to Embodiment 9 of the disclosure. FIG. 34A illustrates curvature of field and distortion of the wide-angle lens according to Embodiment 9 of the disclosure. FIG. 34B illustrates curvature of field and distortion of the wide-angle lens according to Embodiment 9 of the disclosure. FIG. 35A illustrates lateral chromatic aberration (transverse chromatic aberration) of the wide-angle lens according to Embodiment 9 of the disclosure. FIG. 35B illustrates spherical aberration (longitudinal aberration) of the wide-angle lens according to Embodiment 9 of the disclosure. FIG. 36A to FIG. 36L illustrate transverse aberration of the wide-angle lens according to Embodiment 9 of the disclosure. Here, in FIG. 34A, FIG. 34B, FIG. 35A, FIG. 35B, and FIG. 36A to FIG. 36L, a correlation curve of red light R (having a wavelength of 656 nm) is denoted by R, a correlation curve of green light G (having a wavelength of 588 nm) is denoted by G, and a correlation curve of blue light B (having a wavelength of 486 nm) is denoted by B. T indicates being related to the meridian plane, and S indicates being related to the sagittal plane. Moreover, in FIG. 36A to FIG. 4L, a maximum scale of the longitudinal axis is ±50.000 μm.

As shown in FIG. 33, the wide-angle lens 1000 includes, sequentially arranged from the object side (L1 side), the first lens 110 (that is, the first lens 110 is located closest to the object side), the second lens 120 (that is, the second lens 120 is located on the image side of and adjacent to the first lens 110), the third lens 130, the fourth lens 140, the diaphragm 180, the fifth lens 150, the sixth lens 160 and the seventh lens 170. Among them, the sixth lens 160 and the seventh lens 170 are bonded together by an adhesive to constitute a cemented lens.

Here, the wide-angle lens 1000 in this embodiment has the same basic structure (that is, whether each of the first lens 110, the second lens 120, the third lens 130, the fourth lens 140, the fifth lens 150, the sixth lens 160 and the seventh lens 170 has positive refractive power or negative refractive power, whether each of these lenses is a glass lens or plastic lens, whether the object side surface and the image side surface of each of these lenses are convex surfaces or concave surfaces, and whether the object side surface and the image side surface are spherical surfaces or aspheric surfaces) as that of the wide-angle lens of Embodiment 1, and thus the details thereof will be omitted.

As shown in FIG. 33, similarly to Embodiment 1, the light-shielding sheet 190 is provided between the second lens 120 and the third lens 130, the filter 200 is arranged on the image side of the seventh lens 170, and the imaging element 300 is arranged on the image side of the filter 200.

In this embodiment, in the lens system as a whole, the effective focal length f is 1.030 mm, the object-to-image distance (total track) d is 13.609 mm, the F value (image space F/#) is 2, the maximum HFOV (maximum half field angle) is 106 degrees, and the entrance pupil diameter HEP is 0.515 mm.

Table 17 shows physical properties of each surface of the wide-angle lens 1000 of this embodiment. Table 18-1 and Table 18-2 show aspheric coefficients of each surface of the wide-angle lens 1000 of this embodiment.

TABLE 17

| Surface | Radius of curvature | Thickness | $N_d$ | $v_d$ | Effective focal length | Effective radius | Sag |
|---|---|---|---|---|---|---|---|
| 1 | 12.641 | 1.659 | 1.804 | 46.5 | −1.262 | 6.461 | 1.778 |
| 2 | 3.168 | 1.968 | | | | 2.907 | 1.908 |
| 3* | −22.811 | 0.600 | 1.544 | 56.4 | | 2.671 | 0.073 |
| 4* | 1.268 | 1.587 | | | | 1.367 | 1.223 |
| 5* | 3.542 | 1.200 | 1.544 | 56.4 | 3.623 | 1.366 | 0.226 |
| 6* | 8.543 | 0.036 | | | | 1.267 | −0.085 |
| 7* | 4.456 | 0.592 | 1.639 | 23.5 | | 1.111 | 0.209 |
| 8* | −9.668 | 0.248 | | | | 1.111 | 0.147 |
| 9 (diaphragm) | Infinite | 0.078 | | | | | |
| 10 | 6.001 | 1.129 | 1.697 | 55.46 | | 1.400 | 0.166 |
| 11 | −2.824 | 0.247 | | | | 1.400 | −0.371 |
| 12* | −5.445 | 0.500 | 1.639 | 23.5 | 6.310 | 1.124 | −0.130 |
| 13* | 1.090 | 2.170 | 1.544 | 56.4 | | 1.407 | 0.922 |
| 14* | −1.971 | 1.070 | | | | 1.634 | −0.537 |
| 15 | Infinite | 0.400 | | | | | |
| 16 | Infinite | 0.125 | | | | | |

In Table 17 above, the radius of curvature, thickness, effective focal length, effective radius, and sag are in units of mm. $N_d$ represents a refractive index for a ray of 587.56 nm. $V_d$ represents the Abbe number. * represents an aspheric surface.

TABLE 18-1

| Surface | c (1/radius of curvature) | K | A4 | A6 |
|---|---|---|---|---|
| 3 | −4.38390E−02 | 0.00000E+00 | 1.02948E−02 | −1.01140E−03 |
| 4 | 7.88668E−01 | −1.13571E+00 | 5.66499E−02 | 1.84231E−03 |
| 5 | 2.82343E−01 | 0.00000E+00 | −2.18543E−02 | 5.16357E−03 |
| 6 | 1.17050E−01 | 0.00000E+00 | −6.48711E−02 | −8.41810E−03 |
| 7 | 2.24418E−01 | 0.00000E+00 | 3.04785E−02 | 1.99197E−02 |
| 8 | −1.03429E−01 | 0.00000E+00 | 9.05286E−02 | 3.48783E−02 |
| 12 | −1.83670E−01 | 0.00000E+00 | −3.32106E−02 | 4.95833E−02 |
| 13 | 9.17180E−01 | −3.67711E+00 | 1.58393E−01 | −3.03404E−02 |
| 14 | −5.07238E−01 | −6.42125E−01 | 3.25791E−02 | −8.99922E−03 |

TABLE 18-2

| Surface | A8 | A10 | A12 | A14 | A16 |
|---|---|---|---|---|---|
| 3 | 2.82136E−05 | 8.57444E−16 | 0.00000E+00 | 0.00000E+00 | 0.00000E+00 |
| 4 | 3.99185E−02 | −2.56858E−02 | 9.68214E−03 | 0.00000E+00 | 0.00000E+00 |
| 5 | −3.88312E−04 | 0.00000E+00 | 0.00000E+00 | 0.00000E+00 | 0.00000E+00 |
| 6 | 3.26148E−03 | 0.00000E+00 | 0.00000E+00 | 0.00000E+00 | 0.00000E+00 |
| 7 | −6.50576E−03 | 0.00000E+00 | 0.00000E+00 | 0.00000E+00 | 0.00000E+00 |
| 8 | 4.33217E−03 | 0.00000E+00 | 0.00000E+00 | 0.00000E+00 | 0.00000E+00 |
| 12 | −4.63097E−02 | 2.53604E−02 | −5.68334E−03 | 0.00000E+00 | 0.00000E+00 |
| 13 | −2.77646E−02 | 2.45247E−02 | −5.43979E−03 | 0.00000E+00 | 0.00000E+00 |
| 14 | 4.06471E−03 | −7.04269E−04 | 4.21913E−05 | 0.00000E+00 | 0.00000E+00 |

In Table 18-1 and Table 18-2 above, in a case where a lens surface is a convex surface protruding toward the object side or a concave surface recessed toward the object side, its radius of curvature is set to a positive value; in a case where a lens surface is a convex surface protruding toward the image side or a concave surface recessed toward the image side, its radius of curvature is set to a negative value.

In addition, Table 18-1 and Table 18-2 above show the aspheric coefficients A4, A6, A8, A10, A12, A14 and A16 of each of the aspheric surfaces, which satisfy expression 1 above.

Here, as described above, the maximum HFOV ω of the wide-angle lens 1000 as a whole is 106 degrees, that is, the following condition 9-1 is satisfied:

$$98° < \omega < 120° \tag{9-1}$$

In condition 9-1, the maximum HFOV ω is set to be greater than 98°, thereby expanding the maximum HFOV ω; the maximum HFOV ω is set to be less than 120°, thereby avoiding a situation that a peripheral portion of an image becomes dark due to a light quantity ratio at the periphery of the wide-angle lens 1000 being smaller than a light quantity ratio at the center of the wide-angle lens 1000. Further, the wide-angle lens 1000 is able to be miniaturized as a whole while the maximum HFOV ω of the wide-angle lens 1000 is expanded.

In addition, in the wide-angle lens 1000 as a whole, the effective focal length f is 1.030 mm and the entrance pupil diameter HEP is 0.515 mm. Therefore, the following condition 9-2 is satisfied:

$$f/HEP < 2.3 \tag{9-2}$$

In condition 9-2, the ratio of the effective focal length f to the entrance pupil diameter HEP of the wide-angle lens 1000 as a whole is set as f/HEP<2.3, thereby ensuring the brightness of the wide-angle lens 1000, and enabling use of the wide-angle lens 1000 in a high pixel imaging element.

In addition, as is clear from Table 17, the effective radius sd12 of the image side lens surface (that is, the second surface 2) of the first lens 110 is 2.907 mm, and the radius of curvature R12 of the second surface 2 of the first lens 110 is 3.168 mm. Therefore, the following condition 9-3 is satisfied:

$$0.890 < sd12/R12 < 0.970 \tag{9-3}$$

In condition 9-3, the ratio of the effective radius sd12 to the radius of curvature R12 of the second surface 2 of the first lens 110 is set to be greater than 0.890, thereby expanding the HFOV, in particular, to 98° or greater; the ratio of the effective radius sd12 to the radius of curvature R12 of the second surface 2 of the first lens 110 is set to be less than 0.970, thereby preventing the angle defined between the peripheral part of the second surface 2 of the first lens 110 made of glass and the tangent line from being excessively small, and further making it possible to perform a polishing process on the second surface 2 of the first lens 110.

In addition, as is clear from Table 17, the radius of curvature R11 of the object side lens surface (that is, the first surface 1) of the first lens 110 is 12.641 mm, and the radius of curvature R12 of the image side lens surface (that is, the second surface 2) of the first lens 110 is 3.168 mm. Therefore, the following condition 9-4 is satisfied:

$$1.300 < (R11+R12)/(R11−R12) < 1.900 \tag{9-4}$$

Moreover, the following condition 9-5 is satisfied:

$$1.600 < (R11+R12)/(R11−R12) < 1.850 \tag{9-5}$$

In condition 9-4, (R11+R12)/(R11−R12) is set to be greater than 1.300, thereby preventing the radius of curvature R12 of the image side lens surface (that is, the second surface 2) of the first lens 110 from being excessively small, thus facilitating the molding of the second surface 2 of the first lens 110. In another respect, the radius of curvature R11 of the object side lens surface (that is, the first surface 1) of the first lens 110 is able to be prevented from being excessively large, thereby avoiding an excessively large diameter of the first lens 110, thus miniaturizing the wide-angle lens 1000. In addition, (R11+R12)/(R11−R12) is set to be less than 1.900, thereby ensuring sufficient refractive power of the first lens 110, thus facilitating the expansion of the maximum HFOV co of the first lens 110. Moreover, a sufficient thickness of the first lens 110 is able to be ensured, so as to prevent the first lens 110 from being damaged due to impact or the like.

In condition 9-5, (R11+R12)/(R11−R12) is further set to be greater than 1.600, thereby further preventing the radius of curvature R12 of the image side lens surface (that is, the second surface 2) of the first lens 110 from being excessively small, thus further facilitating the molding of the second surface 2 of the first lens 110. In another respect, the radius of curvature R11 of the object side lens surface (that is, the first surface 1) of the first lens 110 is able to be further prevented from being excessively large, thereby further avoiding an excessively large diameter of the first lens 110, thus further miniaturizing the wide-angle lens 1000. In addition, (R11+R12)/(R11−R12) is further set to be less than 1.850, thereby further ensuring sufficient refractive power of the first lens 110, thus further facilitating the expansion of the maximum HFOV co of the first lens 110. Moreover, a sufficient thickness of the first lens 110 is able to be further ensured, so as to further prevent the first lens 110 from being damaged due to impact or the like.

In addition, as is clear from Table 17, the thickness T1 of the first lens 110 is 1.659 mm (the thickness T1 of the first lens 110 is defined as a distance between the object side lens surface (that is, the first surface 1) of the first lens 110 and the image side lens surface (that is, the second surface 2) of the first lens 110 in the optical axis direction), the sag Sag12 of the image side lens surface (that is, the second surface 2) of the first lens 110 is 1.908 mm. Therefore, the following condition 9-6 is satisfied:

$$0.700 < T1/Sag12 < 1.100 \quad (9\text{-}6)$$

In condition 9-6, the ratio of the thickness T1 of the first lens 110 to the sag Sag12 of the image side lens surface (that is, the second surface 2) of the first lens 110 is set to be greater than 0.700, thereby ensuring a sufficient thickness of the first lens 110 to prevent the first lens 110 from being damaged due to impact or the like; the ratio of the thickness T1 of the first lens 110 to the sag Sag12 of the image side lens surface (that is, the second surface 2) of the first lens 110 is set to be less than 1.100, thereby avoiding an excessively large thickness of the first lens 110, thus making it possible to achieve desired negative refractive power.

In addition, in the wide-angle lens 1000 of this embodiment, the object-to-image distance d of the wide-angle lens 1000 is 13.609 mm, and the effective focal length f of the wide-angle lens 1000 as a whole is 1.030 mm. Therefore, the following condition 9-7 is satisfied:

$$11.000 < d/f < 15.000 \quad (9\text{-}7)$$

In condition 9-7, the ratio of the object-to-image distance d of the wide-angle lens 1000 to the effective focal length f of the wide-angle lens 1000 as a whole is set to be greater than 11.000, thereby enabling appropriate correction to be easily made for various aberrations, thus making it easy to achieve good optical characteristics; the ratio of the object-to-image distance d of the wide-angle lens 1000 to the effective focal length f of the wide-angle lens 1000 as a whole is set to be less than 15.000, thereby preventing the wide-angle lens 1000 from becoming excessively large while avoiding an excessively large overall length of the wide-angle lens 1000.

In summary, in this embodiment, by configuring the wide-angle lens 1000 as above, as shown in FIG. 34A to FIG. 36L, appropriate correction is enabled for various aberrations such as curvature of field, chromatic aberration of magnification, and coma. Moreover, the miniaturization is able to be achieved while the maximum HFOV co is expanded.

The disclosure has been exemplarily described above with reference to the accompanying drawings, and it is obvious that the specific implementation of the disclosure is not limited by the foregoing embodiments.

For example, in the foregoing embodiments, the form of the first surface 1 of the first lens 110, the form of the third surface 3 of the second lens 120, the form of the fifth surface 5 of the third lens 130, the form of the seventh surface 7 of the fourth lens 140, and the form of the twelfth surface 12 of the sixth lens 160 may be appropriately changed as needed.

In addition, in the foregoing embodiments, the first lens 110 and the fifth lens 150 may be composed of plastic lenses, and the second lens 120, the third lens 130, the fourth lens 140, the sixth lens 160 and the seventh lens 170 may be composed of glass lenses.

In addition, in the foregoing embodiments, a case has been described where the wide-angle lens 1000 has seven lenses as a lens group. However, the number of the lenses of the wide-angle lens 1000 is not limited to seven, and may be set to six or less or eight or more according to actual needs.

Features of the above-described preferred embodiments and the modifications thereof may be combined appropriately as long as no conflict arises.

While preferred embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. A wide-angle lens, comprising:
   a lens group; and
   a diaphragm, wherein
   a plurality of lenses in the lens group are sequentially arranged from an object side in a manner sandwiching the diaphragm,
   a maximum half field of view of the wide-angle lens as a whole is set to ω, and $98° < ω < 120°$ is satisfied,
   an effective focal length of the wide-angle lens as a whole is set to f, and an entrance pupil diameter of the wide-angle lens as a whole is set to HEP, and $f/HEP < 2.3$ is satisfied,
   the lens group comprises a first lens, the first lens is located closest to the object side, and the first lens is a negative lens with a concave surface facing an image side,
   an effective radius of an image side lens surface of the first lens is set to sd12, and a radius of curvature of the image side lens surface of the first lens is set to R12, and $0.890 < sd12/R12 < 0.970$ is satisfied,
   the lens group comprises seven lenses, the seven lenses and the diaphragm are sequentially arranged from the object side in the order of the first lens, a second lens, a third lens, a fourth lens, the diaphragm, a fifth lens, a sixth lens, and a seventh lens, the second lens is a negative lens with a concave surface facing the image side,
the third lens is a positive lens with a convex surface facing the image side,
the fourth lens is a positive lens with a convex surface facing the image side,
the fifth lens is a positive lens with a convex surface facing the object side and a convex surface facing the image side,
the sixth lens is a negative lens with a concave surface facing the image side,
the seventh lens is a positive lens with a convex surface facing the object side and a convex surface facing the image side, and
the sixth lens and the seventh lens constitute a cemented lens.

2. The wide-angle lens according to claim 1, wherein a radius of curvature of an object side lens surface of the first lens is set to R11, the radius of curvature of the image side lens surface of the first lens is set to R12, and $1.300<(R11+R12)/(R11-R12)<1.900$ is satisfied.

3. The wide-angle lens according to claim 2, wherein $1.600<(R11+R12)/(R11-R12)<1.850$.

4. The wide-angle lens according to claim 1, wherein a thickness of the first lens is set to T1, a sag of the image side lens surface of the first lens is set to Sag12, and $0.700<T1/Sag12<1.100$ is satisfied.

5. The wide-angle lens according to claim 1, wherein the first lens and the fifth lens are each a glass lens, and the second lens, the third lens, the fourth lens, the sixth lens, and the seventh lens are each a plastic lens.

6. The wide-angle lens according to claim 2, wherein the first lens and the fifth lens are each a glass lens, and the second lens, the third lens, the fourth lens, the sixth lens, and the seventh lens are each a plastic lens.

7. The wide-angle lens according to claim 2, wherein a thickness of the first lens is set to T1, a sag of the image side lens surface of the first lens is set to Sag12, and $0.700<T1/Sag12<1.100$ is satisfied.

8. The wide-angle lens according to claim 3, wherein a thickness of the first lens is set to T1, a sag of the image side lens surface of the first lens is set to Sag12, and $0.700<T1/Sag12<1.100$ is satisfied.

9. The wide-angle lens according to claim 3, wherein the first lens and the fifth lens are each a glass lens, and the second lens, the third lens, the fourth lens, the sixth lens, and the seventh lens are each a plastic lens.

10. The wide-angle lens according to claim 4, wherein the first lens and the fifth lens are each a glass lens, and the second lens, the third lens, the fourth lens, the sixth lens, and the seventh lens are each a plastic lens.

* * * * *